United States Patent
Tsuchiya et al.

(10) Patent No.: US 9,612,488 B2
(45) Date of Patent: Apr. 4, 2017

(54) LIQUID CRYSTAL DISPLAY DEVICE

(71) Applicant: Sharp Kabushiki Kaisha, Osaka (JP)

(72) Inventors: Hiroshi Tsuchiya, Osaka (JP); Tsuyoshi Okazaki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 74 days.

(21) Appl. No.: 14/424,006

(22) PCT Filed: Aug. 22, 2013

(86) PCT No.: PCT/JP2013/072369
§ 371 (c)(1),
(2) Date: Feb. 25, 2015

(87) PCT Pub. No.: WO2014/034511
PCT Pub. Date: Mar. 6, 2014

(65) Prior Publication Data
US 2015/0253633 A1 Sep. 10, 2015

(30) Foreign Application Priority Data

Aug. 30, 2012 (JP) .................................. 2012-190644

(51) Int. Cl.
*G02F 1/1343* (2006.01)
*G02F 1/1335* (2006.01)
*G02F 1/1368* (2006.01)

(52) U.S. Cl.
CPC ...... *G02F 1/134309* (2013.01); *G02F 1/1368* (2013.01); *G02F 1/133528* (2013.01);
(Continued)

(58) Field of Classification Search
CPC ............. G02F 1/134309; G02F 1/1368; G02F 1/133528; G02F 1/134363; G02F 2001/134381; G02F 2001/133531
(Continued)

(56) References Cited

U.S. PATENT DOCUMENTS 6,266,116 B1 7/2001 Ohta et al.
6,549,258 B1 4/2003 Shin et al.
(Continued)

FOREIGN PATENT DOCUMENTS

JP H11-231344 A 8/1999
JP 3427611 B2 7/2003
JP 4287514 B2 7/2009

*Primary Examiner* — Charles Chang
(74) *Attorney, Agent, or Firm* — Chen Yoshimura LLP

(57) ABSTRACT

The present invention provides a liquid crystal display device by which it is possible to attain both high transmittance and wide viewing angle even if the pixels are small. The liquid crystal display device of the present invention is provided with a first substrate, a second substrate, and a liquid crystal layer sandwiched between the first substrate and second substrate, the first substrate having a plurality of electrode pairs that each include a first linear electrode and a second linear electrode independent of each other, the first linear electrode and second linear electrode included in each of two electrode pairs adjacent to each other being arranged to exhibit line symmetry about a reference axis that is a line passing between the electrode pairs, the linear electrode positioned farther from the reference axis being the first linear electrode, the linear electrode positioned closer to the reference axis being the second linear electrode, the second substrate having third linear electrodes formed along the first linear electrodes or the second linear electrodes.

14 Claims, 66 Drawing Sheets

(52) U.S. Cl.
CPC ............... *G02F 1/134363* (2013.01); *G02F 2001/133531* (2013.01); *G02F 2001/134381* (2013.01)

(58) Field of Classification Search
USPC ........................................... 349/141
See application file for complete search history.

(56) References Cited

U.S. PATENT DOCUMENTS

| | | | | |
|---|---|---|---|---|
| 8,339,555 B2* | 12/2012 | Hwang | ............ | G02F 1/134363 349/141 |
| 2007/0159586 A1* | 7/2007 | Kim | ................. | G02F 1/133707 349/143 |
| 2009/0109391 A1* | 4/2009 | Ito | .................... | G02F 1/134363 349/141 |

* cited by examiner

LIQUID CRYSTAL DISPLAY DEVICE

TECHNICAL FIELD

The present invention relates to a liquid crystal display device. More specifically, the present invention relates to a transverse field liquid crystal display device.

BACKGROUND ART

Liquid crystal display devices are devices that control the transmission or blockage of light (turning ON/OFF the display) by controlling the orientation of liquid crystal molecules having birefringence. Examples of liquid crystal orientation modes of LCDs include the twisted nematic (TN) mode in which liquid crystal molecules having positive dielectric anisotropy are oriented so as to be twisted at 90° when viewed from a direction normal to the substrate, vertical alignment (VA) mode in which liquid crystal molecules having negative dielectric anisotropy are oriented vertically with respect to the substrate surface, and in-plane switching (IPS) mode and fringe field switching (FFS) mode in which a horizontal electric field is applied to liquid crystal layer to orient liquid crystal molecules having positive or negative dielectric anisotropy horizontally with respect to the substrate surface.

As a method of driving a liquid crystal display device, the active matrix driving method, in which active elements such as thin film transistors (TFTs) are disposed for each pixel and a high image qualities is attained, is popular. On an array substrate including a plurality of TFTs and pixel electrodes, a plurality of scan signal lines and a plurality of data signal lines are formed to intersect each other, and a TFT is provided at each intersection. The TFT is connected to the pixel electrode, and the switching function of the TFT controls the supply of an image signal to the pixel electrode. A common electrode is further provided on the array substrate or an opposite substrate, and a voltage is applied to the liquid crystal layer through the pair of electrodes.

In IPS mode, which is a mode in which the orientation of liquid crystal molecules is controlled by a horizontal electric field, the pixel electrodes and the common electrodes are formed on the same substrate, and both electrodes have a plurality of teeth. The teeth of the pixel electrodes and the teeth of the common electrode are parallel to each other, and the orientation of the liquid crystal molecules is controlled on the basis of a potential difference between the teeth of the pixel electrode and the teeth of the common electrode (see Patent Document 1, for example).

In the IPS mode described above, the pixel electrodes and the common electrodes are typically formed on only one of the pair of substrates, but another electrode may be formed on the opposite substrate, and in some cases, the orientation of the liquid crystal molecules is controlled not only by a horizontal electric field but also by a vertical electric field or an oblique electric field (see Patent Documents 2 to 4, for example).

RELATED ART DOCUMENTS

Patent Documents

Patent Document 1: Japanese Patent No. 3427611 Specification
Patent Document 2: Japanese Patent No. 4287514 Specification
Patent Document 3: Japanese Patent Application Laid-Open Publication No. H11-231344
Patent Document 4: US Patent Application Publication No. 2007/0159586

SUMMARY OF THE INVENTION

Problems to be Solved by the Invention

The inventors of the present invention have considered the fact that currently, the resolution of pixels is increasing, and upon studying various designs to decrease the size of the pixels, they found that there are cases in which it is not possible to ensure a sufficient transmittance using a conventional electrode structure used in horizontal electric field driving methods (such as IPS mode and FFS mode). FIG. 116 is a schematic plan view showing an example of an arrangement of electrodes in a conventional IPS mode liquid crystal display device. As shown in FIG. 116, in a conventional IPS mode liquid crystal display device, a pixel electrode 111 and a common electrode 115 are disposed in one pixel, and both have a plurality of teeth having a V shape whereby a portion thereof is bent. By arranging the teeth of the respective electrodes 111 and 115 such that the lengthwise directions thereof are inclined with respect to the wiring lines, it is possible to attain a wide viewing angle.

However, when using such V-shaped teeth, as the pixels become smaller, the number of teeth that can be formed is limited, which causes a reduction in transmittance in each pixel. This is due to the fact that the electric field is not strong enough for the liquid crystal molecules in areas away from the electrodes, which means that the liquid crystal molecules cannot attain a prescribed orientation. As a result, regions corresponding to the recesses of the pixels become dark areas (dotted line regions in the rightmost drawing of FIG. 116). If the pixel is sufficiently large, then even if a dark area were to form in a portion thereof, the brightness of other areas compensates for this, which allows a bright image to be displayed overall, but as the pixels are made smaller, dark areas take up a greater proportion of the whole pixel, which means that when increasing the resolution of the pixels, the transmittance markedly decreases.

On the other hand, if the teeth of the pixel electrodes 111 and common electrodes 115 are formed in a straight line instead of a V-shape in order to match the shape of the pixel, an improvement in viewing angle, which is the advantage of IPS mode, cannot be sufficiently attained.

Other modes besides IPS mode can be adopted, but only TN mode can attain a high transmittance with a small pixel size, and TN mode does not have a wide viewing angle. Currently, there are no methods of attaining both high transmittance and a wide viewing angle.

The present invention takes into account the above-mentioned situation, and an object thereof is to provide a liquid crystal display device by which it is possible to attain both high transmittance and a wide viewing angle even if the pixels are small.

Means for Solving the Problems

The inventors of the present invention focused on the structures of the pixel electrodes and the common electrodes, and determined that it is difficult to attain both high transmittance and a wide viewing angle simply by changing the shape of the teeth of the pixel electrodes and the common electrodes as in conventional configurations. The inventors of the present invention focused on the fact that one pixel was constituted of a combination of a pixel electrode and a common electrode, each of which had a plurality of teeth, and upon diligent study, arrived at a structure in which both the pixel electrodes and the common electrodes are linear electrodes with the orientation of the liquid crystal molecules being controlled by the pair of linear electrodes, and in which the pair of linear electrodes and an adjacent pair of linear electrodes exhibit line symmetry with respect to each other. Furthermore, the inventors of the present invention found that by providing linear electrodes on a substrate across the liquid crystal layer from the above-mentioned linear electrodes and therealong, when applying a voltage to these electrodes, it is possible to attain a wide viewing angle by orienting the liquid crystal molecules at multiple azimuths while ensuring high transmittance.

Thus, the inventors of the present invention have arrived at a solution that elegantly solves the above-mentioned problem, and have arrived at the present invention.

In other words, one aspect of the present invention is a liquid crystal display device, including: a first substrate; a second substrate; and a liquid crystal layer sandwiched between the first substrate and the second substrate, wherein the first substrate has a plurality of pairs of electrodes, each including a first linear electrode and a second linear electrode that are independent of each other, wherein the first linear electrodes and the second linear electrodes included in two adjacent pairs of electrodes are disposed to exhibit line symmetry about a reference axis that is a line passing between the pairs of electrodes, wherein the linear electrodes positioned farther from the reference axis are the first linear electrodes, wherein the linear electrodes positioned closer to the reference axis are the second linear electrodes, and wherein the second substrate has third linear electrodes formed along the first linear electrodes or the second linear electrodes.

The liquid crystal display device includes a first substrate, a second substrate, and a liquid crystal layer sandwiched between the first substrate and the second substrate. The first substrate has a plurality of pairs of electrodes, each including a first linear electrode and a second linear electrode that are independent of each other, and the second substrate has third linear electrodes. An electric field is formed in the liquid crystal layer on the basis of the potential difference between the first to third linear electrodes. The orientation of the liquid crystal molecules is changed in response to the strength of the electric field, which adjusts the transmittance of light therethrough, thereby adjusting whether the display is ON or OFF. There is no special limitation on the size of the potential supplied to the first to third linear electrodes, and this can be adjusted as appropriate depending on design.

Of the plurality of pairs of electrodes formed on the first substrate, the first linear electrodes and the second linear electrodes included in two adjacent pairs of electrodes are disposed to exhibit line symmetry about a reference axis that is a line passing between the pairs of electrodes. The linear electrodes farther away from the reference axis of line symmetry are the "first linear electrodes" and the linear electrodes closer to this reference axis are the "second linear electrodes." Signals having the same potential are supplied to the first linear electrodes and the second linear electrodes respectively included in two adjacent pairs of electrodes. With such an arrangement of electrodes, even if the pixel size were made smaller, it is possible to orient the liquid crystal molecules at a uniform regularity over a large area, and a wide viewing angle can be attained without a decrease in transmittance.

The third linear electrodes are formed along the first linear electrodes or the second linear electrodes. As a result, the electrode field between the third linear electrodes, and the first linear electrodes or the second linear electrodes can be partitioned in a uniform manner, which increases the ability to control the orientation of the liquid crystal molecules and stabilizes display performance (transmittance, viewing angle characteristics, etc.).

As long as such components are formed as necessary parts, there is no special limitation on other components in the configuration of the liquid crystal display device. For example, other electrodes besides the first to third linear electrodes (fourth, fifth, or higher number electrodes, for example), and such other electrodes may or may not be linear electrodes.

Below, preferable aspects of the liquid crystal display device will be described. Aspects combining two or more of the individual preferable aspects of the liquid crystal display device disclosed below are also considered to be preferable aspects of the liquid crystal display device.

In order to further improve the ability to control the orientation of the liquid crystal molecules, it is preferable that a potential supplied to the third linear electrodes be equal to a potential supplied to the first linear electrodes or the second linear electrodes formed along the third linear electrodes. In this manner, it is possible to form a reference potential wall between the first or second linear electrodes and the third linear electrodes, thereby stabilizing display performance. It is more preferable that the potential supplied to the third linear electrodes and the potential supplied to the first linear electrodes or the second linear electrodes formed along the third linear electrodes be a common potential. As a result, the wall to be the common potential can be formed with greater ease. By connecting the third linear electrodes to the first or second linear electrodes through an external wiring line, for example, to electrically connect these to each other, the potential thereof is made the same. There is no special limitation on the method to electrically connect the third linear electrodes to the first or second linear electrodes.

In order to improve the ability to control the orientation of the liquid crystal molecules, it is preferable that the third linear electrodes be formed along the linear electrodes farther away from the reference axis of line symmetry, or in other words, the first linear electrodes. As a result, it is possible to form an electric field wall to surround an electric field region of a certain range formed by adjacent pairs of electrodes, which further stabilizes display performance.

It is preferable that the first linear electrodes and the second linear electrodes be formed in the same layer. It is possible to form a horizontal electric field even if the first linear electrodes and the second linear electrodes are formed in different layers, but in this case, some vertical components are included, which means that in reality, an oblique electric field is formed. In such a case, a few liquid crystal molecules rotate to an oblique orientation with the electric field, which sometimes reduces transmittance and viewing angle. By disposing the first linear electrodes in the same layer as the second linear electrodes, it is difficult for oblique components to be formed in the electric field, which allows for a more even horizontal electric field to be formed, thereby preventing a decrease in transmittance and viewing angle.

It is preferable that the above-mentioned liquid crystal display device further include: a scan signal line passing between the second linear electrodes of the two adjacent pairs of electrodes. No potential difference occurs in the area between the second linear electrodes in adjacent pairs of electrodes, and thus, this area cannot be used for display.

Thus, an efficient configuration can be attained by disposing a scan signal line in this area.

It is preferable that the above-mentioned liquid crystal display device further include: switching elements connected respectively to the second linear electrodes of the two adjacent pairs of electrodes. The same potential is supplied to these two second linear electrodes, and thus, an efficient configuration can be attained in this manner. In particular, when decreasing the size of the pixels, the size of the switching element directly relates to the aperture ratio, and thus, this has a major effect.

It is preferable that the first substrate further have a first polarizing plate and the second substrate further has a second polarizing plate, that a polarizing axis of the first polarizing plate be perpendicular to a polarizing axis of the second polarizing plate, that the first linear electrode be disposed to be parallel or perpendicular to the polarizing axis of the first polarizing plate and the polarizing axis of the second polarizing plate, and that the second linear electrode be disposed to be parallel or perpendicular to the polarizing axis of the first polarizing plate and the polarizing axis of the second polarizing plate. In other words, in this aspect, the first polarizing plate and the second polarizing plate are in a crossed Nicols state. An even electric field can be formed between the first linear electrode and the second linear electrode, and thus, by adjusting the axes of the polarizing plates to be parallel or perpendicular to the electric field, an excellent grayscale or white display can be attained.

The first linear electrode and the second linear electrode may have the same or different lengths, but from the perspective of attaining a more uniform orientation of liquid crystal molecules, it is preferable that the first and second linear electrodes have the same length.

It is preferable that, when viewing the first substrate in a plan view, a region surrounded by two lines respectively connecting closer respective ends of the first linear electrode and the second linear electrode, a side of the first linear electrode closer to the second linear electrode, and a side of the second linear electrode closer to the first linear electrode be a rectangle, and that an aspect ratio of the rectangle be greater than or equal to 0.75 and less than 1.00.

If the first linear electrode and the second linear electrode differ in length, then it is preferable that, when viewing the first substrate in a plan view, a region surrounded by two lines respectively drawn vertically downward from ends of whichever of the first linear electrode and the second linear electrode is shorter towards whichever of the first linear electrode and the second linear electrode is longer, a side of the first linear electrode closer to the second linear electrode, and a side of the second linear electrode closer to the first linear electrode be a rectangle, and that an aspect ratio of the rectangle be greater than or equal to 0.75 and less than 1.00.

Depending on the shape of the imaginary region of a certain range formed by the first linear electrode and the second linear electrode, the viewing angle characteristics differ. The design with the best viewing angle characteristics is one in which this region is square, or in other words, when the aspect ratio of the shape of the region is 1:1. As the aspect ratio deviates from 1.00, the viewing angle characteristics gradually decrease, but as long as the aspect ratio is 0.75 or greater, then even if the pixels are made small, sufficient viewing angle characteristics can be attained. In the present specification "rectangle" and "square" refer to shapes in which four perpendicular or parallel sides can be seen in reality, and there may be minor recesses and protrusions therein.

Effects of the Invention

According to the present invention it is possible to obtain a liquid crystal display device by which it is possible to attain both high transmittance and wide viewing angle even if the pixels are small.

DETAILED DESCRIPTION OF EMBODIMENTS

Embodiments are shown below and the present invention is described in further detail with reference to the drawings, but the present invention is not limited to these embodiments.

The liquid crystal display devices of Embodiments 1 to 7 below can specifically be applied to devices such as televisions, personal computers, mobile phones, car navigation systems, and information displays.

In the present invention, a region where the orientation of liquid crystal molecules is controlled by a pixel electrode controlled by one switching element and a common electrode facing this pixel electrode is defined as one "pixel." If one switching element simultaneously controls a plurality of pixel electrodes, then the entire region where the orientation of the liquid crystal molecules is controlled by the plurality of pixel electrodes and the common electrodes facing the respective plurality of pixel electrodes is defined as one "pixel."

The effects of the present invention are marked when the pixels are small, but the present invention may be applied to cases in which the pixels are large as in Embodiment 5 or 6. However, one guideline for the size of pixels whereby effects of the present invention can be efficiently attained is that at least one side of the pixel is 20 μm or less, or more preferably 17 μm or less.

Embodiment 1

Figure 1:
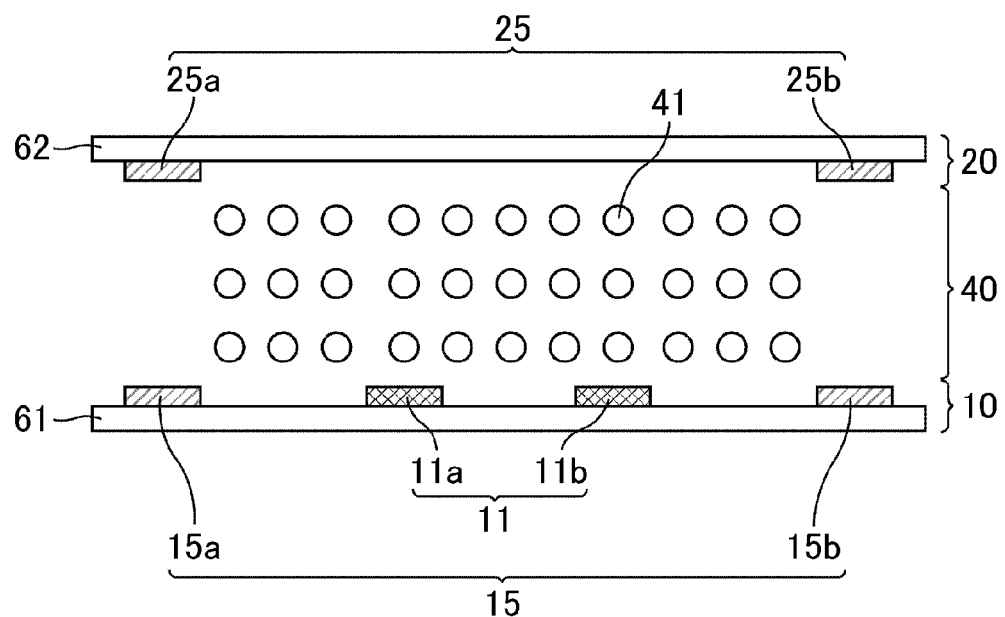
FIG. 1 is a schematic cross-sectional view of a liquid crystal display device of Embodiment 1 when no voltage is applied.
Figure 2:
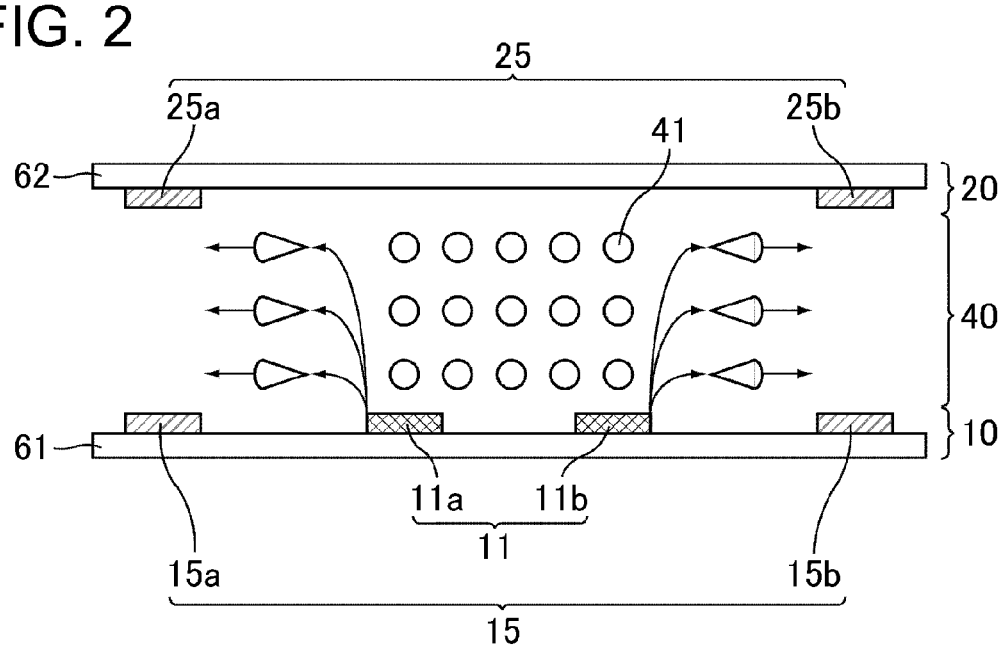
FIG. 2 is a schematic cross-sectional view of the liquid crystal display device of Embodiment 1 when a white voltage is applied.

FIGS. 1 and 2 are schematic cross-sectional views of a liquid crystal display device of Embodiment 1. FIG. 1 shows a state when no voltage is applied and FIG. 2 shows a state when a white voltage is applied. The liquid crystal display device of Embodiment 1 has a TFT substrate 10 (first substrate), an opposite substrate 20 (second substrate), and a liquid crystal layer 40 sandwiched between the TFT substrate 10 and the opposite substrate 20. The liquid crystal layer 40 contains liquid crystal molecules 41 having positive dielectric anisotropy, and the liquid crystal molecules 41 are oriented in a direction horizontal with respect to the substrates 10 and 20 whether or not voltage is applied. The TFT substrate 10 includes a support substrate 61, TFTs (switching elements), scan signal lines, data signal lines, common signal lines, pixel electrodes 11 (second linear electrodes), TFT common electrodes 15 (first linear electrodes), an insulating film that keeps the pixel electrodes 11 and the TFT common electrodes 15 in different layers, alignment films, and the like. The opposite substrate 20 is provided with a supporting substrate 62, color filters, a black matrix, opposite common electrodes 25 (third linear electrodes), an alignment film, and the like. The pixel electrodes 11 and the TFT common electrodes 15 are separate from each other, and signals of different potentials are supplied to the respective electrodes. This makes it possible for a voltage to be applied to the liquid crystal layer 40.

The pixel electrodes 11 are further subdivided between first pixel electrodes 11a and second pixel electrodes 11b. The first pixel electrodes 11a and the second pixel electrodes 11b are disposed in the same layer and are supplied image signals having the same potential (pixel potential). In Embodiment 1, one TFT 53 is connected to the first pixel electrode 11a and the second pixel electrode 11b. The first pixel electrode 11a and the second pixel electrode 11b may be connected to each other through a member other than the TFT or not connected to each other.

The TFT common electrodes 15 are common electrodes provided on the TFT substrate 10, and are further subdivided between first TFT common electrodes 15a and second TFT common electrodes 15b. The first TFT common electrodes 15a and the second TFT common electrodes 15b are disposed in the same layer and are supplied a common signal having the same potential. The first TFT common electrode 15a and the second TFT common electrode 15b may be connected to each other through another member or not connected to each other.

The first pixel electrodes 11a, the second pixel electrodes 11b, the first TFT common electrodes 15a, and the second TFT common electrodes 15b are all formed in the same layer. As a result, an electric field component inclined with respect to the substrate surface is not easily formed, which makes it possible to form an even horizontal electric field, thereby preventing a decrease in transmittance or viewing angle characteristics. An insulating film formed on the support substrate 61 is a member located below these electrodes, and the insulating film may be formed of an organic material or an inorganic material, and may be a single layer film or a multilayer film.

The opposite common electrodes 25 are common electrodes provided on the opposite substrate 20, and are further subdivided between first opposite common electrodes 25a and second opposite common electrodes 25b. The first opposite common electrodes 25a and the second opposite common electrodes 25b are disposed in the same layer and are supplied a common signal having the same potential. The first opposite common electrode 25a and the second opposite common electrode 25b may be connected to each other through wiring lines disposed inside or outside the opposite substrate 20 or not connected to each other.

The opposite common electrode 25 is formed along the TFT common electrode 15 across the liquid crystal layer 40, or in other words, the TFT common electrode 15 and the opposite common electrode 25 correspond in position to each other with the liquid crystal layer 40 therebetween. The TFT common electrode 15 and the opposite common electrode 25 are supplied common signals having the same potential (common potential). As a result, it is possible to form virtual walls at a reference potential to divide the liquid crystal layer 40 into a plurality of regions. The TFT common electrode 15 and the opposite common electrode 25 may be electrically connected to each other through an external wiring line, for example, or not connected to each other.

On the surface of the TFT substrate 10 opposite to the liquid crystal layer 40, a polarizing plate (first polarizing plate) is bonded. On the surface of the opposite substrate 20 opposite to the liquid crystal layer 40, a polarizing plate (second polarizing plate) is bonded.

The first polarizing plate bonded to the surface of the TFT substrate 10 and the second polarizing plate bonded to the surface of the opposite substrate 20 are disposed such that the polarizing axes thereof are perpendicular to each other. Additionally, the first polarizing plate and the second polarizing plate are disposed such that the polarizing axes thereof are respectively parallel or perpendicular to the first pixel electrodes 11a, the second pixel electrodes 11b, the first TFT common electrodes 15a, and the second TFT common electrodes 15b. Furthermore, the alignment films formed on the substrates undergo alignment treatment in directions parallel or perpendicular to the polarizing axes of the first polarizing plate and the second polarizing plate. As a result, when no voltage is applied, the light transmitted through the liquid crystal molecules 41 is blocked by the polarizing plates, resulting in a black image being displayed, but by applying a voltage at or above a threshold and additionally adjusting the voltage, it is possible to change the orientation azimuths of the liquid crystal molecules to adjust the amount of light transmitted, allowing for a grayscale image or a white image to be displayed. Here, "parallel" and "perpendicular" refer not only to cases of being perfectly parallel or perpendicular, but also cases of being substantially parallel or perpendicular; in fact, performing the alignment treatment in directions respectively inclined a few degrees with respect to the polarizing axes of the polarizing plates yields the advantage of being able to make the orientation directions of the liquid crystal molecules uniform, and the like. With regard to the directions of the polarizing axes with respect to the directions of alignment treatment, "parallel" and "perpendicular" in reality includes a margin of error of 7.5° or less.

Figure 3:
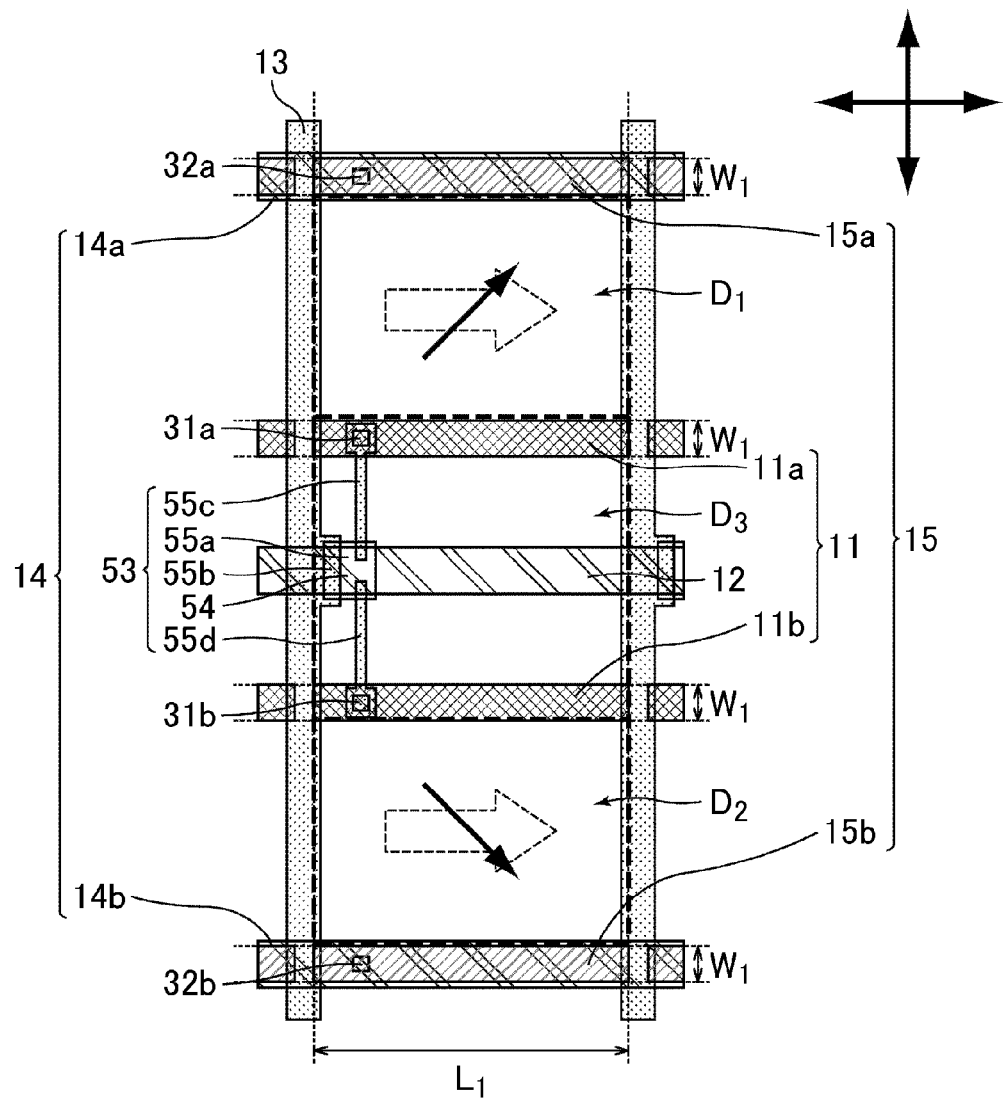
FIG. 3 is a schematic plan view of a TFT substrate of the liquid crystal display device of Embodiment 1.
Figure 4:
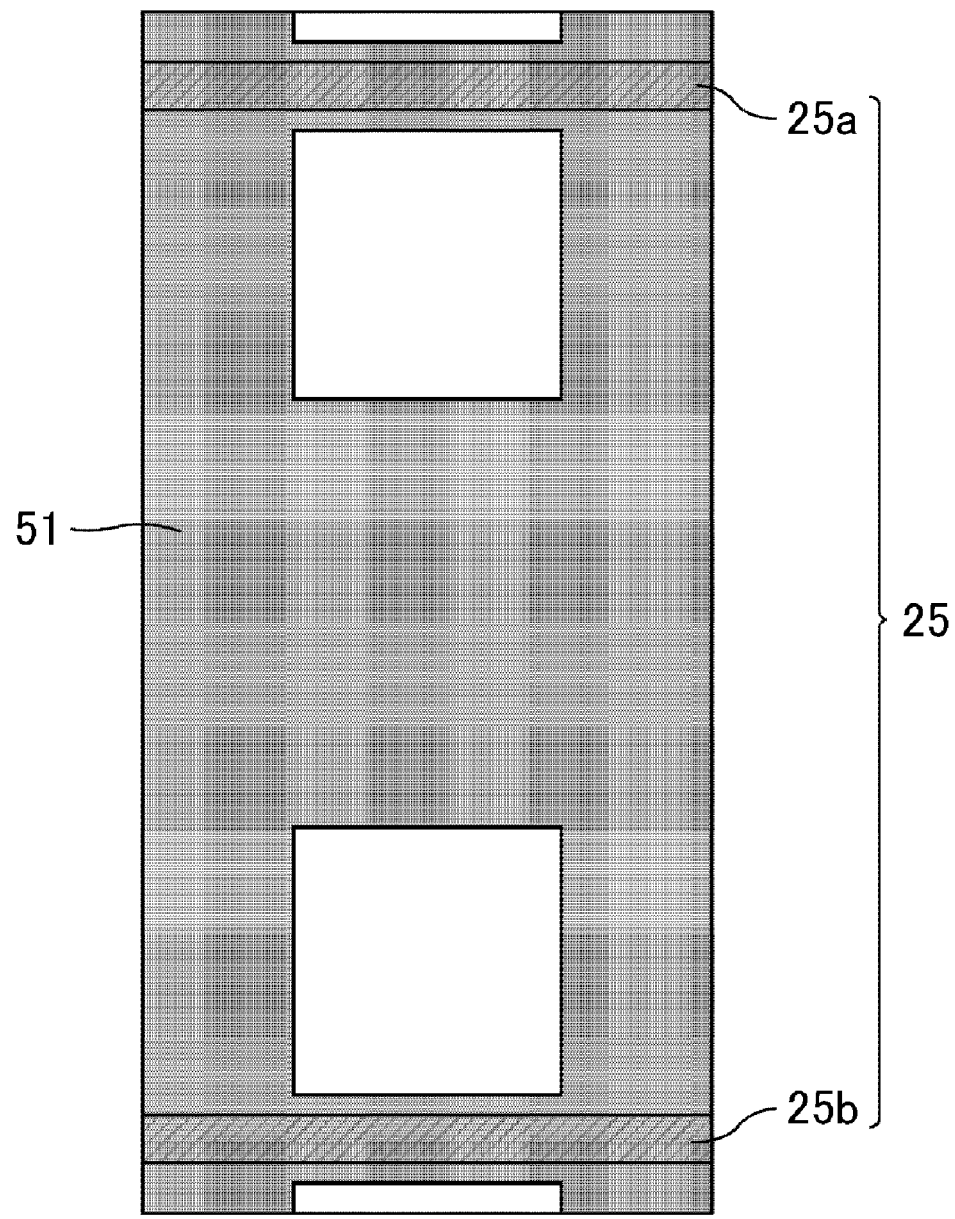
FIG. 4 is a schematic plan view of an opposite substrate of the liquid crystal display device of Embodiment 1.
Figure 5:
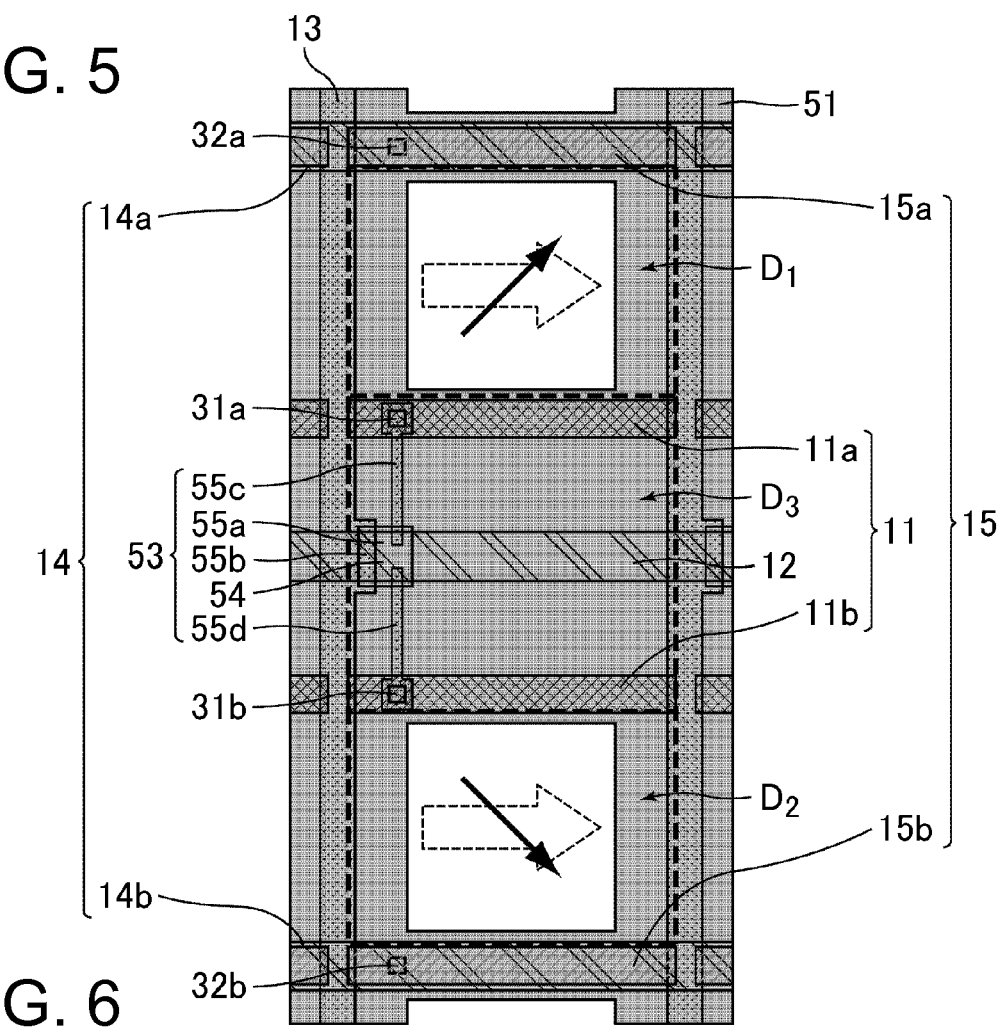
FIG. 5 is a schematic plan view in which the position of a black matrix is overlaid onto the plan view of the TFT substrate of Embodiment 1.

FIGS. 3 to 5 are schematic plan views of the liquid crystal display device of Embodiment 1. FIG. 3 is a schematic plan view of the TFT substrate and FIG. 4 is a schematic plan view of the opposite substrate. FIG. 5 is a view in which the position of a black matrix is overlaid onto the plan view of the TFT substrate. As shown in FIG. 3, when the TFT substrate 10 of Embodiment 1 is seen in a plan view, the scan signal lines 12 and the data signal lines 13 intersect each other. The TFT 53 (thin film transistor) is provided in the vicinity of each connecting point of the data signal lines 12 and the scan signal lines 13. Between the scan signal lines 12, a common signal line 14 extends in parallel with the scan signal lines 12. In the present specification, the term "parallel" used in reference to the electrodes and the wiring lines includes the state of being substantially parallel, and in reality includes a margin of error of 7.5°. The double-headed arrows in FIG. 3 show the direction of the polarizing axes of the polarizing plates.

The TFT 53 is a switching element including a semiconductor layer 54, a gate electrode 55a, a source electrode 55b, a first drain electrode 55c, and a second drain electrode 55d. The gate electrode 55a is simply a portion of the scan signal line 12. The source electrode 55b branches off from the data signal line 13. The drain electrodes include a first drain electrode 55c extending towards the first pixel electrode 11a and a second drain electrode 55d extending towards the second pixel electrode 11b. The first drain electrode 55c is formed to be wider in a position corresponding to the first pixel electrode 11a, and is connected to the first pixel electrode 11a through a first contact section 31a that penetrates the insulating film. The second drain electrode 55d is formed to be wider in a position corresponding to the second pixel electrode 11b, and is connected thereto through a second contact section 31b that penetrates the insulating film. The gate electrode 55a and the semiconductor layer 54 overlap each other through a gate insulating film. The source electrode 55b is connected to the drain electrodes 55c and 55d through the semiconductor layer 54, and the amount of current flowing through the semiconductor layer 54 is adjusted on the basis of the scan signal inputted to the gate electrode through the scan signal line 12, thereby controlling the transmission of the image signal inputted through the data signal line 13 to the source electrode 55b, the semiconductor layer 54, the first drain electrode 55c or the second drain electrode 55d, and the first pixel electrode 11a or the second pixel electrode 11b.

As shown in FIG. 3, the first pixel electrode 11a and the second pixel electrode 11b both have a linear shape and are parallel to each other. The scan signal line 12 is formed in parallel with the first pixel electrode 11a and the second pixel electrode 11b while passing through the area therebetween.

As shown in FIG. 3, the first TFT common electrode 15a and the second TFT common electrode 15b both have a linear shape and are parallel to each other. The first TFT common electrode 15a and a first common signal line 14a are formed in parallel with each other while overlapping across an insulating film. The first TFT common electrode 15a is connected to the first common signal line 14a through a first contact section 32a penetrating the insulating film. The second TFT common electrode 15b and a second common signal line 14b are formed in parallel with each other while overlapping across an insulating film. The second TFT common electrode 15b is connected to the second common signal line 14b through a second contact section 32b penetrating the insulating film. The first common signal line 14a and the second common signal line 14b may be connected to each other through a common bus line, for example, but they need not be connected to each other as long as the same potential is supplied to both. In Embodiment 1, a common signal line need not necessarily be provided separately from the TFT common electrode, and the first TFT common electrode and the second TFT common electrode themselves may be formed to extend regardless of the bounds of the pixels.

As shown in FIG. 4, the first opposite common electrode 25a and the second opposite common electrode 25b both have a linear shape and are parallel to each other. No common signal line is provided on the opposite substrate 20, and the first opposite common electrode 25a and the second opposite common electrode 25b themselves extend beyond the bounds of the first pixel. In Embodiment 1, the first opposite common electrode 25a and the second opposite common electrode 25b may be cut to respectively match the lengths of the first TFT common electrode and the second TFT common electrode across the liquid crystal layer therefrom while providing a separate common signal line.

As shown in FIG. 3, the combination of the first pixel electrode 11a and the first TFT common electrode 15a and the combination of the second pixel electrode 11b and the second TFT common electrode 15b respectively form pairs of electrodes, and a plurality of such pairs of electrodes are formed on the TFT substrate 10. As for the pairs of electrodes, the first pixel electrode 11a, the second pixel electrode 11b, the first TFT common electrode 15a, and the second TFT common electrode 15b are positioned so as to be in line symmetry with each other with the reference axis being a line parallel to the first pixel electrode 11a and the second pixel electrode 11b while passing therebetween. In Embodiment 1, the first pixel electrode 11a, the second pixel electrode 11b, the first TFT common electrode 15a, and the second TFT common electrode 15b are all the same length and width, and all are parallel to each other.

The length of the first pixel electrode 11a, the second pixel electrode 11b, the first TFT common electrode 15a, and the second TFT common electrode 15b can vary depending on the size of the pixel, but is set within the range of 10 to 15 µm, for example. The width of the first pixel electrode 11a, the second pixel electrode 11b, the first TFT common electrode 15a, and the second TFT common electrode 15b can vary depending on the size of the pixel, but is set within the range of 2 to 4 µm, for example.

The line vertically bisecting the first pixel electrode 11a corresponds to the line vertically bisecting the first TFT common electrode 15a. In other words, the first pixel electrode 11a and the first TFT common electrode 15a have line symmetry, with the line vertically bisecting these as the reference axis. Also, the line vertically bisecting the second pixel electrode 11b corresponds to the line vertically bisecting the second TFT common electrode 15b, with these vertically bisecting lines as the reference axis. In other words, the second pixel electrode 11b and the second TFT common electrode 15b also have line symmetry, with these vertically bisecting lines as the reference axis. Furthermore, the lines vertically bisecting the respective electrodes match.

In other words, the pairs of electrodes have line symmetry with the line vertically bisecting the pairs of electrodes as the reference axis.

As shown in FIGS. 4 and 5, a black matrix 51 is provided with openings matching areas where the orientation of the liquid crystal molecules is controlled by the respective electrodes. In other words, the black matrix 51 is formed along the outer edges of the openings along each region surrounded by the first pixel electrode 11a, the first TFT common electrode 15a, and two lines connecting the closer ends of these electrodes (also referred to below as a first partitioned region D1), and a region surrounded by the second pixel electrode 11b, the second TFT common electrode 15b, and two lines connecting the closer ends of these electrodes (also referred to below as a second partitioned region D2). As a result, the black matrix 51 is overall formed in a grid pattern. Meanwhile, the region surrounded by the first pixel electrode 11a, the second pixel electrode 11b, and two lines connecting closer ends of these electrodes (also referred to below as a middle region D3) is covered by the black matrix 51.

The plurality of openings surrounded in this manner by the black matrix 51 have the role of allowing through display light.

In this example shown in FIGS. 3 to 5, the length L1 is the same for the first pixel electrode 11a, the second pixel electrode 11b, the first TFT common electrode 15a, and the second TFT common electrode 15b, and is set to be slightly greater than the length of one side of the opening along which these electrodes are formed. In other words, it is preferable that the length L1 of the first pixel electrode 11a, the second pixel electrode 11b, the first TFT common electrode 15a, and the second TFT common electrode 15b be greater than or equal to the length of one side of the opening along which these electrodes are formed, and less than or equal to 110% thereof. The first pixel electrodes 11a, the second pixel electrodes 11b, the first TFT common electrodes 15a, and the second TFT common electrodes 15b all have the same width W1.

As shown in FIGS. 3 and 5, when no voltage is applied, the liquid crystal molecules 41 are respectively oriented substantially in parallel (specifically including a margin of error of 7.5° or less) with the first pixel electrode 11a, the second pixel electrode 11b, the first TFT common electrode 15a, and the second TFT common electrode 15b. The orientation of the liquid crystal molecules 41 can be set by the alignment films on which alignment treatment has been performed, for example. The hollow dotted arrows in FIGS. 3 and 5 indicate the orientation azimuths (long axis directions) of the liquid crystal molecules when no voltage is applied.

On the other hand, as shown in FIGS. 3 and 5, when a voltage at or above a threshold is applied, the liquid crystal molecules 41 are respectively oriented in a direction inclined with respect to the first pixel electrode 11a, the second pixel electrode 11b, the first TFT common electrode 15a, and the second TFT common electrode 15b. The angle of incline varies depending on the voltage applied to the liquid crystal layer 40. The black arrows in FIGS. 3 and 5 indicate the orientation azimuth (long axis direction) of the liquid crystal molecules when a white voltage is applied.

In Embodiment 1, both the first partitioned region D1 and the second partitioned region D2 are rectangular or square. This makes it possible to achieve excellent transmittance and a wide viewing angle.

When conducting a simulation of the liquid crystal display device of Embodiment 1, the following results were attained (Working Example 1). The conditions of the simulation of Working Example 1 were set as follows. The pixel size was 15 μm×45 μm. The width of one pixel electrode and TFT common electrode was set to 2 μm with the length thereof being 11 μm. The length and width of the opposite common electrode was set to be the same as the length and width of the TFT common electrode. The distance between the first pixel electrode 11a and the first TFT common electrode 15a and the distance between the second pixel electrode 11b and the second TFT common electrode 15b were both set to 11 μm. In other words, the aspect ratio of the first partitioned region D1 and the second partitioned region D2 is 1:1. The openings of the black matrix were set to be 10 μm×10 μm. In other words, the aspect ratio of the openings of the black matrix is 1:1.

Figure 6:
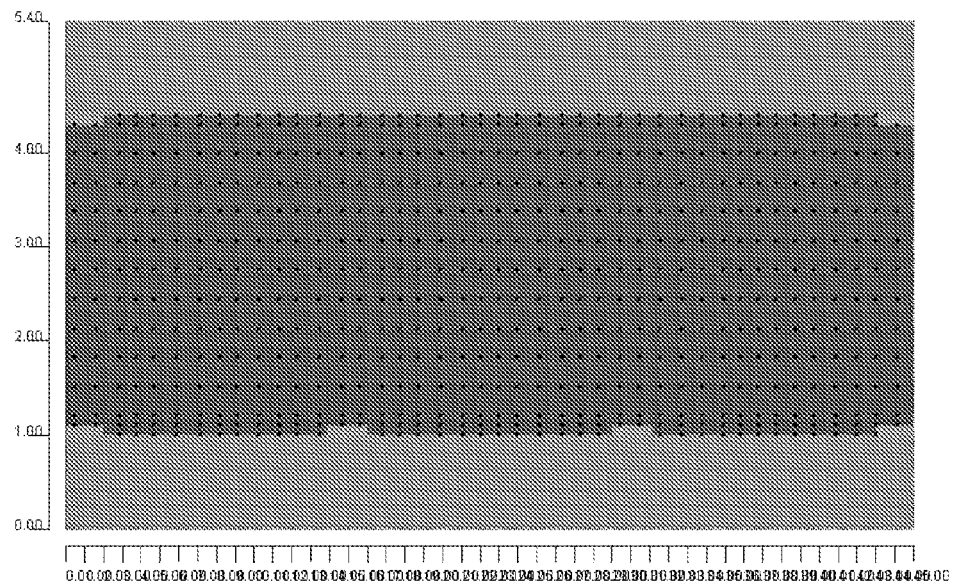
FIG. 6 is a simulation image showing the behavior of liquid crystal molecules in Working Example 1, and is a cross-sectional view shown when no voltage is applied (0V).
Figure 7:
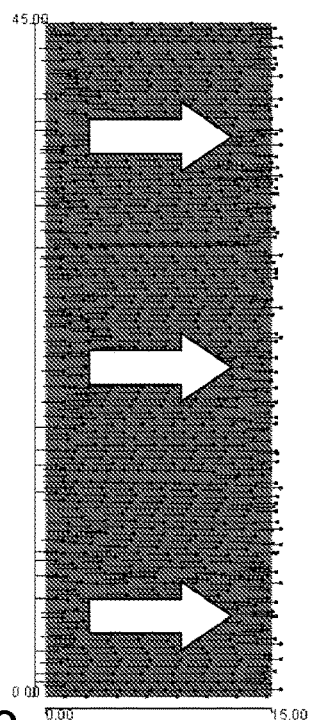
FIG. 7 is a simulation image showing the behavior of liquid crystal molecules in Working Example 1, and is a plan view shown when no voltage is applied (0V).
Figure 8:
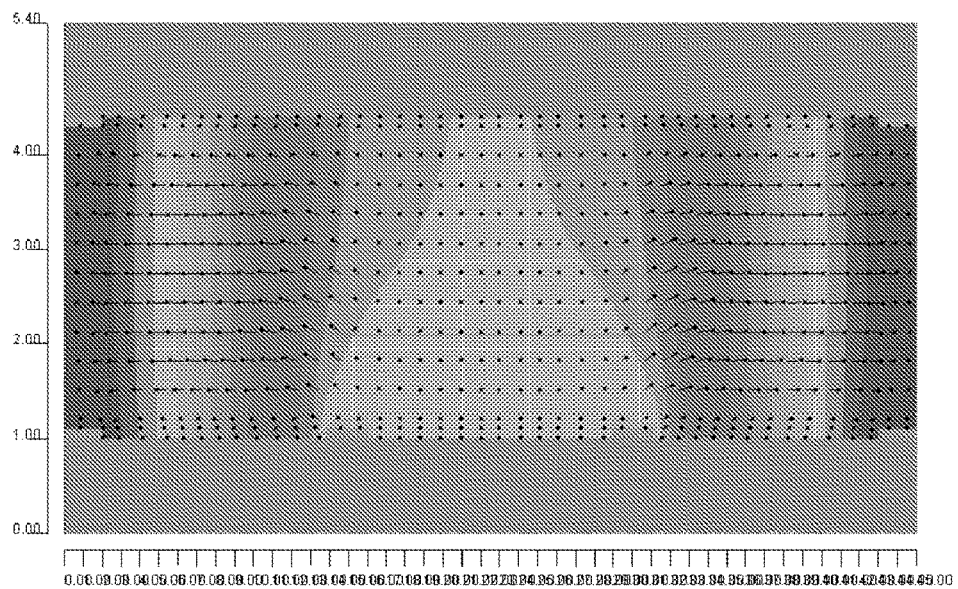
FIG. 8 is a simulation image showing the behavior of liquid crystal molecules in Working Example 1, and is a plan view shown when a white voltage is applied (5.5V).
Figure 9:
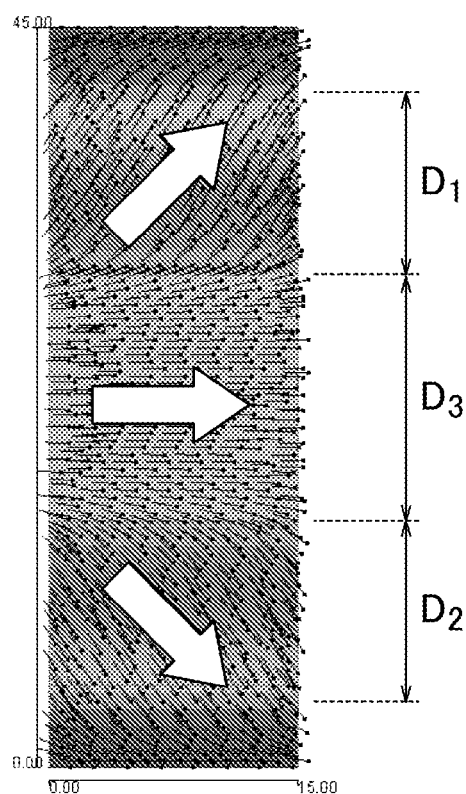
FIG. 9 is a simulation image showing the behavior of liquid crystal molecules in Working Example 1, and is a plan view shown when a white voltage is applied (5.5V).
Figure 10:
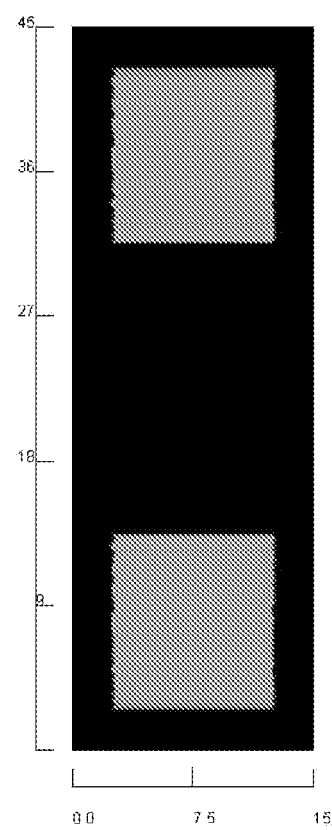
FIG. 10 is a plan view image showing the transmittance of light at a monochromatic gradation in Working Example 1.
Figure 11:
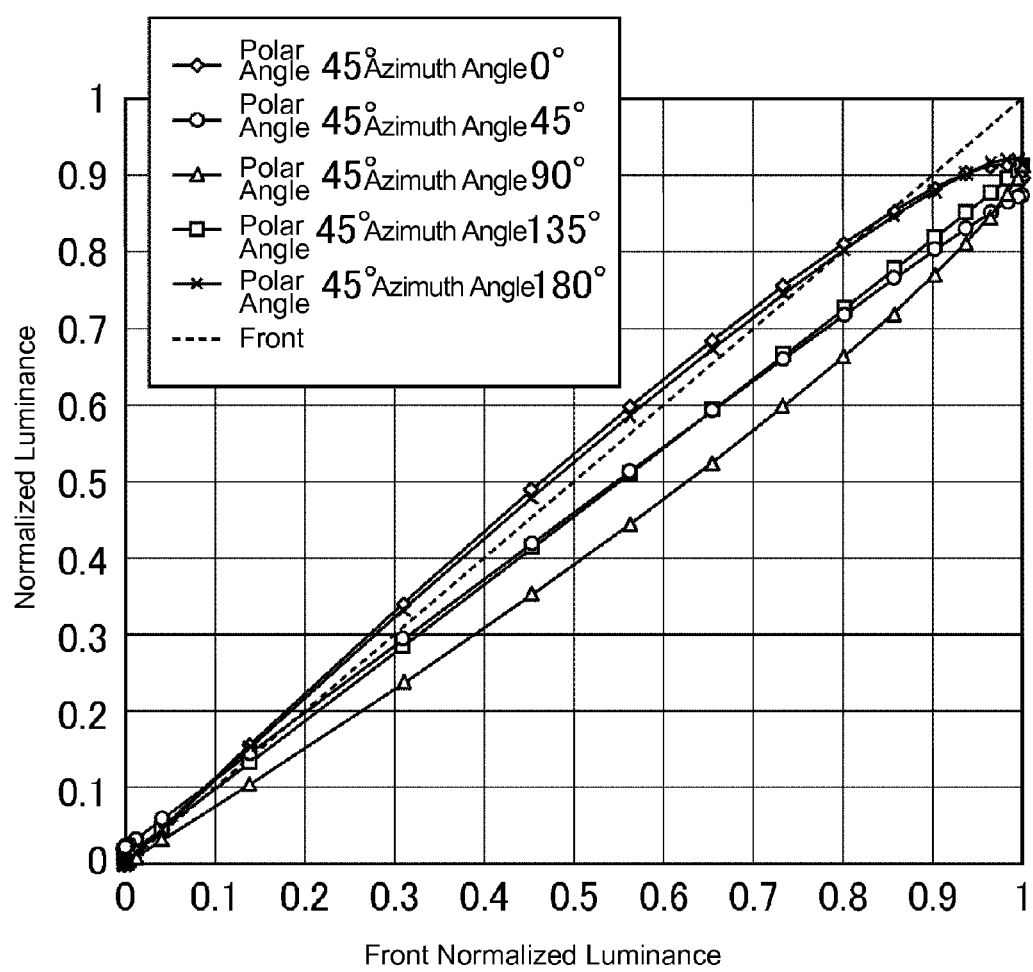
FIG. 11 is a graph showing respective luminances at various azimuth angles when the polar is fixed at 45° with the display surface being the reference surface in Working Example 1.

FIGS. 6 to 9 are plan view simulation images showing the behavior of liquid crystal molecules in Working Example 1. FIGS. 6 and 7 show a state when no voltage (0V) is applied and FIGS. 8 and 9 show a state when a white voltage (5.5V) is applied. FIGS. 6 and 8 are cross-sectional views and FIGS. 7 and 9 are plan views. FIG. 10 is a plan view showing the transmittance of light at a monochromatic gradation in Working Example 1, and FIG. 11 is a graph showing respective luminances at various azimuths with the polar angle fixed at 45° in Working Example 1, the display surface being the reference surface.

As shown in FIGS. 6 and 7, when no voltage is applied, the liquid crystal molecules 41 are all oriented in the same direction (direction parallel to the respective electrodes). On the other hand, as shown in FIGS. 8 and 9, when a voltage at or above a threshold is applied, the liquid crystal molecules 41 in the region between the first pixel electrode 11a and the second pixel electrode 11b maintain the initial orientation in the vicinity of the TFT substrate 10 where the first pixel electrode 11a and the second pixel electrode 11b are disposed, but undergo orientation change in the vicinity of the opposite substrate 20. Also, the liquid crystal molecules 41 between the pixel electrodes 11 and the common electrodes 15 and 25 respectively facing the pixel electrodes ((i) the first TFT common electrode 15a and the first opposite common electrode 25a correspond to the first pixel electrode 11a, and (ii) the second TFT common electrode 15b and the second opposite common electrode 25b correspond to the second pixel electrode 11b, for example) have angles that differ depending on the distance from the electrodes, but are at an angle inclined with respect to these electrodes. FIG. 8 shows respective regions at different gradations depending on the strength of the electric field. As shown in FIG. 8, the region surrounded by the first pixel electrode 11a, the second pixel electrode 11b, and areas of the opposite substrate 20 facing these pixel electrodes 11a and 11b includes an equipotential region having a narrowing form (bottleneck shape), and the electric field distribution is not the same between the vicinity of the TFT substrate 10 and the vicinity of the opposite substrate 20. However, in the region surrounded by the first pixel electrode 11a, the first TFT common electrode 15a, the first opposite common electrode 25a, and the portions of opposite substrate 20 facing the first pixel electrodes, and the region surrounded by the second pixel electrode 11b, the second TFT common electrode 15b, the second opposite common electrode 25b, and portions of the opposite substrate 20 facing the second pixel electrodes 11b, the electric field distribution is the same between the vicinity of the TFT substrate 10 and the opposite substrate 20, and the change in potential is stable.

When seeing this state in a plan view, as shown in FIGS. 7 and 9, most of the liquid crystal molecules 41 included in the middle region D3 are oriented parallel to the electrodes 11a and 11b while some of the liquid crystal molecules 41 are oriented in a direction inclined with respect to the electrodes 11a and 11b, the middle region D3 being a region surrounded by the first pixel electrode 11a, the second pixel electrode 11b, and two lines drawn from the tips thereof. On the other hand, the liquid crystal molecules 41 included in the first partitioned region D1 are oriented at approximately 45° with respect to the electrodes 11a and 15a although this angle differs depending on the area, and the change in angle is smooth and even, the first partitioned region D1 being a region surrounded by the side of the first pixel electrode 11a proximal to the first TFT common electrode 15a, the side of the first TFT common electrode 15a proximal to the first pixel electrode 11a, and two lines drawn from closer tips thereof. Similarly, the liquid crystal molecules 41 included in the second partitioned region D2 are oriented at approximately 45° with respect to the electrodes 11b and 15b although this angle differs depending on the area, and the change in angle is smooth and even, the second partitioned region D2 being a region surrounded by the side of the second pixel electrode 11b proximal to the second TFT common electrode 15b, the side of the second TFT common electrode 15b proximal to the second pixel electrode 11b, and two lines drawn from closer tips thereof.

What is characteristic here is that the orientation distribution of the liquid crystal molecules (director distribution) exhibits line symmetry about a line passing between the first pixel electrode 11a and the second pixel electrode 11b, and more specifically, the line bisecting one pixel. As a result, it is possible to form two regions (multi-domain) including a plurality of liquid crystal molecules having orientation azimuths in different directions in the region of the liquid crystal layer corresponding to one pixel while exhibiting an orientation patter that is symmetrical about a fixed reference axis.

In this manner, according to the configuration of Embodiment 1, it is possible to have a uniform orientation of liquid crystal molecules in the portion to be used as the display region, and furthermore, by forming two regions with orientation azimuths in different directions, it is possible to have excellent viewing angle characteristics while efficiently using light. Also, according to the configuration of Embodiment 1, it is possible to exhibit an effect whereby characteristics of pixels do not deteriorate even if the pixels are designed to be small.

As shown in FIG. 10, light is transmitted uniformly throughout the entire region corresponding to the opening of the black matrix 51, thereby ensuring high transmittance. As shown in FIG. 11, there is no great variation in luminance depending on the viewing angle, and thus, a substantially uniform image can be displayed no matter the angle from which the display is viewed.

In Embodiment 1, the aspect ratio of the first partitioned region D1 and the second partitioned region D2, and the aspect ratio of the opening of the black matrix 51 need not necessarily be the same as shown in Working Example 1. The shape of the opening of the black matrix 51 needs only to be determined on the basis of the region suited to display, and is not limited to being rectangular or square. Also, there is no special limitation on the relation between the size of the first partitioned region D1 and the second partitioned region D2, and the size of the opening of the black matrix 51.

Materials of other members and a manufacturing method will be described below.

A transparent material such as glass or plastic is suitable for the support substrates 61 and 62. A transparent material such as silicon nitride, silicon oxide, or a photosensitive acrylic resin is suitable for the insulating film. The insulating film is formed by forming a silicon nitride film by plasma enhanced chemical vapor deposition (PECVD), and a photosensitive acrylic resin film is formed by die coating on the silicon nitride film. Holes provided in the insulating film to form the contact sections 31 and 32 can be formed by dry etching (channel etching).

The scan signal line 12, the data signal line 13, and the respective electrodes constituting the TFT 53 are formed by sputtering a single layer or multiple layers of a metal such as titanium, chromium, aluminum, and molybdenum, or an alloy thereof, and then patterning the metal or alloy by photolithography or the like. Manufacturing is made more efficient by forming the respective wiring lines and electrodes in the same layer of the same material.

The semiconductor layer 54 of the TFT 53 can be made of a material formed by layering a high resistance semiconductor layer (i layer) made of amorphous silicon, polysilicon, or the like, and a low resistance semiconductor layer ($n^+$ layer) made of $n^+$ amorphous silicon formed by doping amorphous silicon film with an impurity such as phosphorus, or the like, but besides this, an oxide semiconductor such as IGZO (indium gallium zinc oxide) can be suitably used.

By using an oxide semiconductor such as IGZO as the semiconductor layer 54, the electron mobility can be made high and the TFT size can be made small, which ensures a greater aperture ratio. Thus, an oxide semiconductor made of IGZO is useful when making the pixel smaller. Also, the OFF leakage current is low and a charge can be stored for a long period of time, which presents the advantage of allowing low frequency driving.

The pixel electrode 11, the TFT common electrode 15, and the opposite common electrode 25 can be patterned by depositing a transparent conductive film such as indium tin oxide (ITO), indium zinc oxide (IZO), zinc oxide (ZnO), tin oxide (SnO), or the like, or an alloy of these by sputtering a single layer or multiple layers thereof, for example, and then patterning by photolithography or the like.

A photosensitive resin that transmits light corresponding to the respective colors (color resist) is suitable for use in the color filters. There is no special limitation on the material for the black matrix 51 as long as it has light-shielding properties, and a resin containing black pigment or a light-shielding metal is suitable for use therein. The color filters and the black matrix 51 may be provided on the TFT substrate 10 instead of the opposite substrate 20.

The TFT substrate 10 and the opposite substrate 20 manufactured in this manner are provided with a plurality of columnar spacers made of an insulating material and then bonded together by a sealing member. The liquid crystal layer 40 is formed between the TFT substrate 10 and the opposite substrate 20, but when using the dripping method, the liquid crystal is dripped onto a substrate prior to the substrates being bonded, and when using the vacuum injection method, the liquid crystal is injected after the substrates have been bonded. Liquid crystal having positive dielectric anisotropy is suitable for the liquid crystal material.

By bonding polarizing plates, phase contrast films, or the like onto the surfaces of the substrates opposite to the liquid crystal layer 40, the liquid crystal display device is completed. Furthermore, by mounting a gate driver, a source driver, a display control circuit, and the like and adding a backlight or the like, a liquid crystal display device suited to a given application is completed.

Embodiment 2

Embodiment 2 is similar to Embodiment 1 except that the length of the pixel electrode and the length of the common electrode opposite thereto differ from each other ((i) the first TFT common electrode corresponds to the first pixel electrode, and (ii) the second TFT common electrode corresponds to the second pixel electrode, for example). In Embodiment 2, the length of the pixel electrode is greater than the length of the opposing common electrode.

Figure 12:
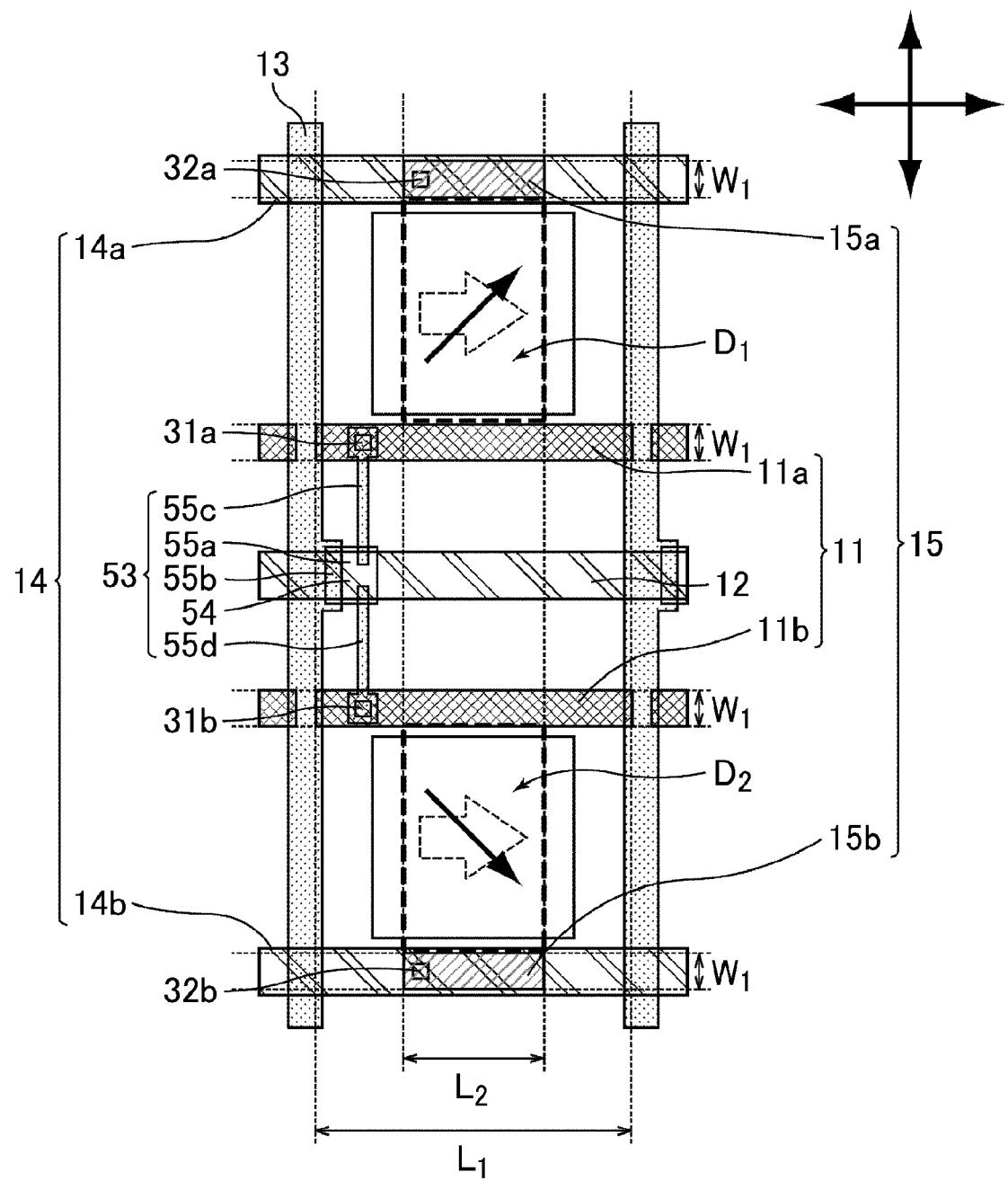
FIG. 12 is a schematic plan view of a TFT substrate of the liquid crystal display device of Embodiment 2.
Figure 13:
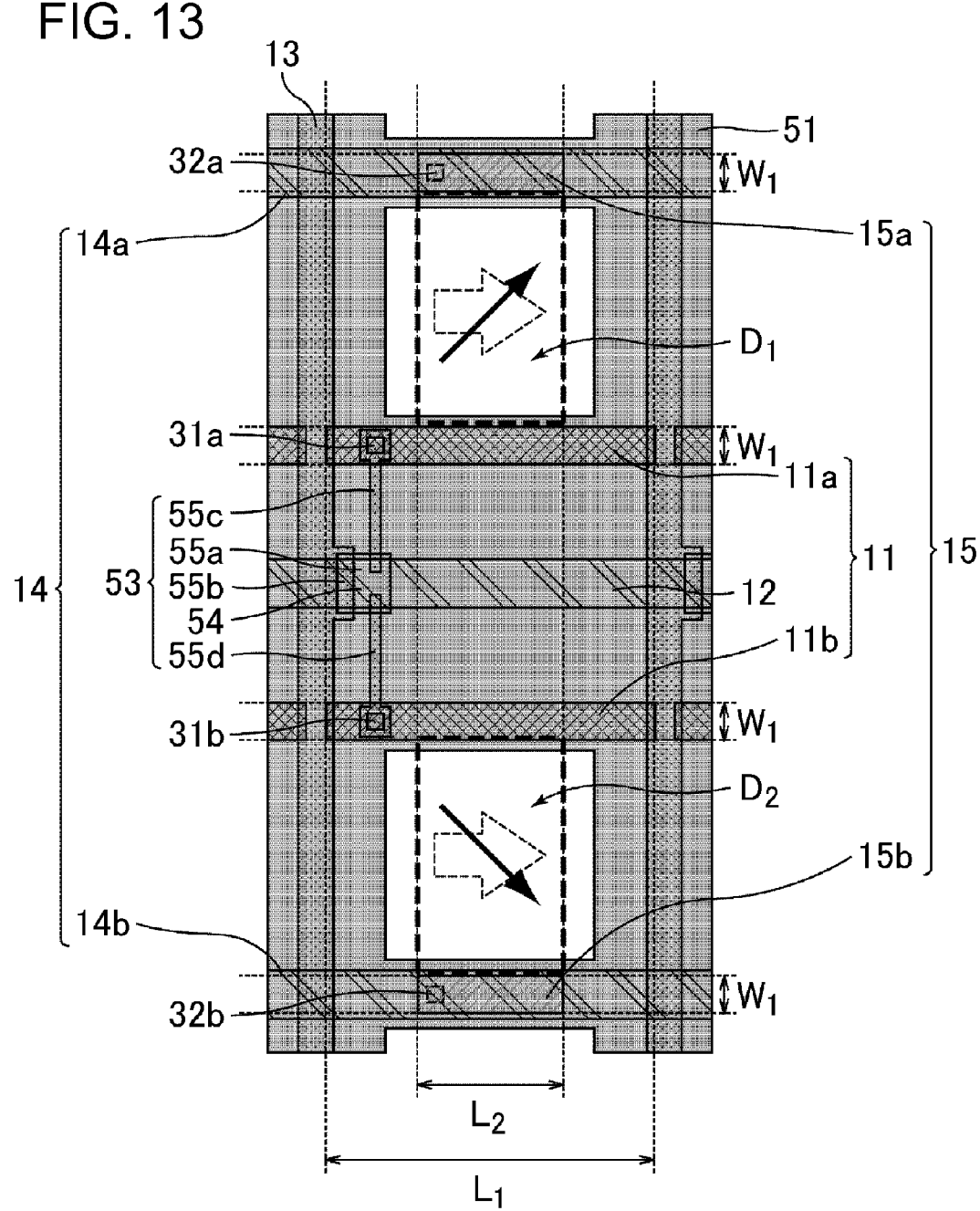
FIG. 13 is a schematic plan view in which the position of a black matrix is overlaid onto the plan view of the TFT substrate of Embodiment 2.

FIG. 12 is a schematic plan view of the TFT substrate of the liquid crystal display device of Embodiment 2, and FIG. 13 additionally shows the position of the black matrix. As shown in FIG. 12, the first pixel electrode 11a and the first TFT common electrode 15a are parallel to each other, but the length of the first pixel electrode 11a is 1.0 to 1.7 times that of the first TFT common electrode 15a. Similarly, the second pixel electrode 11b and the second TFT common electrode 15b are parallel to each other, but the length of the second pixel electrode 11b is 1.0 to 1.7 times that of the second TFT common electrode 15b. The first pixel electrode 11a and the second pixel electrode 11b have the same length, and the first TFT common electrode 15a and the second TFT common electrode 15b have the same length. Also, the first pixel electrode 11a, the second pixel electrode 11b, the first TFT common electrode 15a, and the second TFT common electrode 15b have the same width.

As shown in FIG. 13, in Embodiment 2, the length L2 of the first TFT common electrode 15a and the second TFT common electrode 15b is set to be less than the length of one side of the opening of the black matrix 51 formed for each of these electrodes, whereas the length L1 of the first pixel electrode 11a and the second pixel electrode 11b is set to be greater than the length of one side of the opening of the black matrix 51 formed for each of these electrodes.

Specifically, the length of the first TFT common electrode 15a and the second TFT common electrode 15b is set to be 0.9 to 1.5 times the length of one side of the opening of the black matrix 51 formed for each of these electrodes, and the length of the first pixel electrode 11a and the second pixel electrode 11b is set to be 0.9 to 1.5 times the length of one side of the opening of the black matrix 51 formed for each of these electrodes.

When conducting a simulation of the liquid crystal display device of Embodiment 2, the following results were attained (Working Example 2). The conditions of the simulation of Working Example 2 were set as follows. The pixel size was 15 μm×45 μm. The width of each of the pixel electrodes 11a and 11b is set to be 2 μm and the length of each of the pixel electrodes 11a and 11b is set to be 15 μm. The width of each of the common electrodes 15a and 15b is set to be 2 μm and the length of each of the common electrodes 15a and 15b is set to be 9 μm. The length and width of the opposite common electrode was set to be the same as the length and width of the TFT common electrode. The distance between the first pixel electrode 11a and the first TFT common electrode 15a and the distance between the second pixel electrode 11b and the second TFT common electrode 15b were both set to 11 μm. In other words, the aspect ratio of the first partitioned region D1 and the second partitioned region D2 is 9:11. The openings of the black matrix were set to be 10 μm×10 μm. In other words, the aspect ratio of the openings of the black matrix is 1:1.

Figure 14:
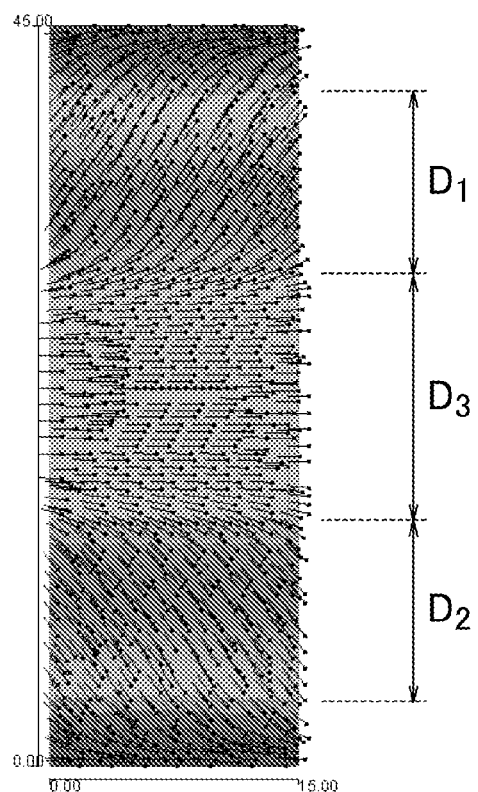
FIG. 14 is a plan view simulation image showing the behavior of liquid crystal molecules in Working Example 2.
Figure 15:
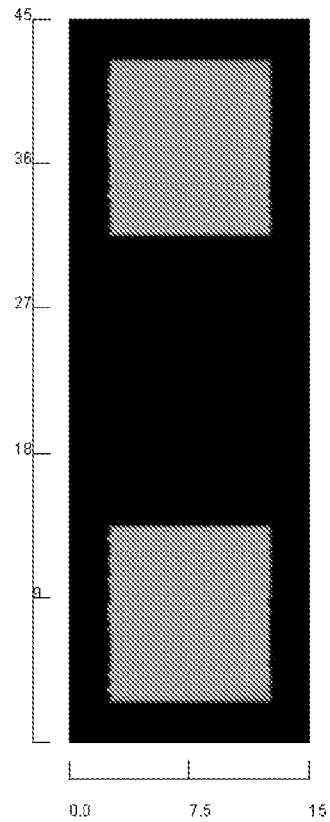
FIG. 15 is a plan view image showing the transmittance of light at a monochromatic gradation in Working Example 2.

FIG. 14 is a plan view simulation image showing the behavior of liquid crystal molecules in Working Example 2. FIG. 15 is a plan view image showing the transmittance of light at a monochromatic gradation in Working Example 2. Based on FIGS. 14 and 15, it can be seen from the orientation distribution of the liquid crystal molecules and the transmittance in each opening region in Working Example 2 that orientation characteristics and transmittances that are almost identical to those of Working Example 1 can be attained, and it was confirmed in Embodiment 2 also that excellent transmittance and viewing angle characteristics can be attained.

Embodiment 3

Embodiment 3 is similar to Embodiment 1 except that the length of the pixel electrode and the length of the common electrode opposite thereto are both less than the length of each side of a black matrix formed along these electrodes ((i) the first TFT common electrode corresponds to the first pixel electrode, and (ii) the second TFT common electrode corresponds to the second pixel electrode, for example). Embodiment 3 has in common with Embodiment 1 the fact that the length of the pixel electrode is the same as the length of the common electrode opposite thereto.

Figure 16:
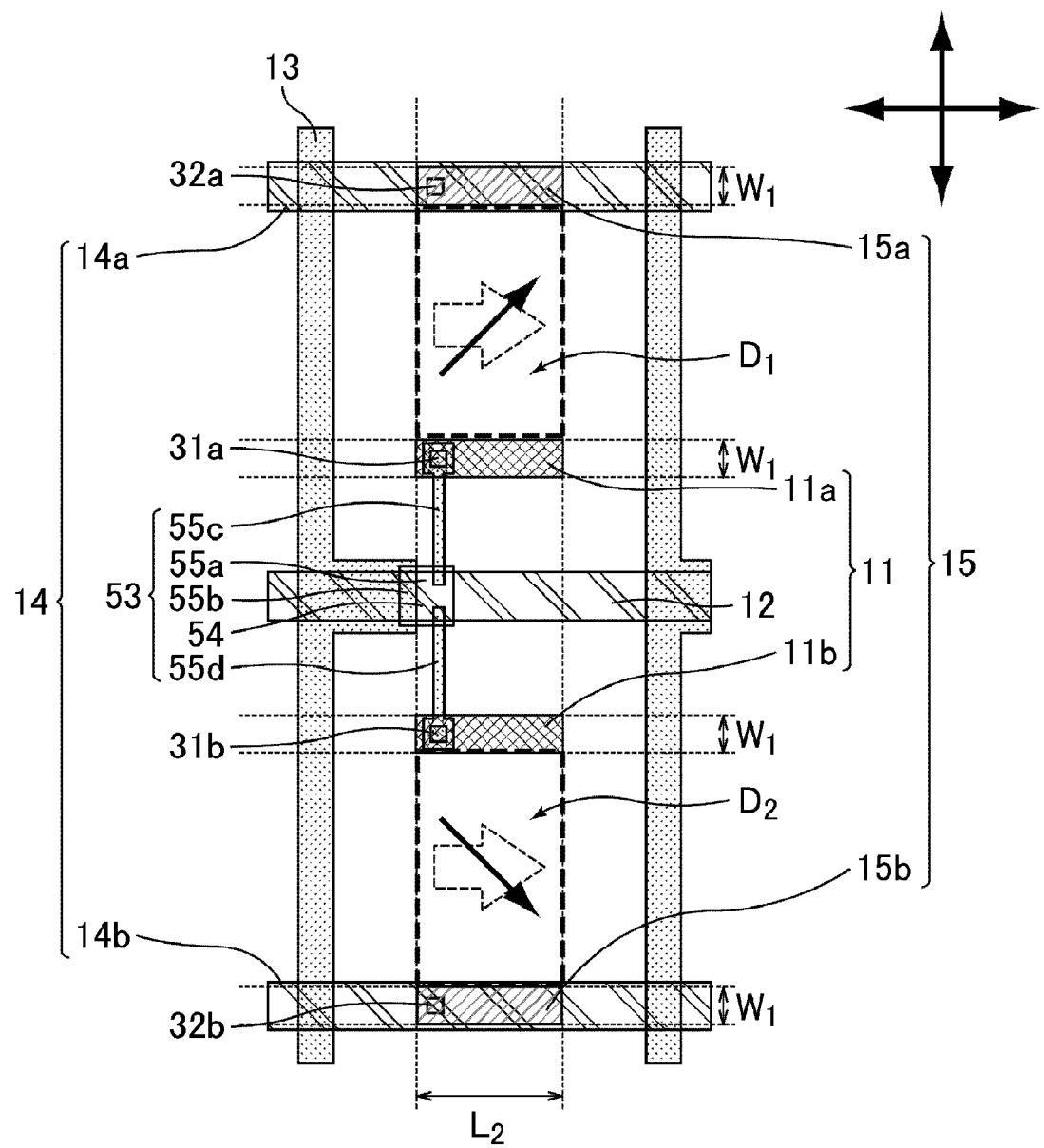
FIG. 16 is a schematic plan view of a TFT substrate of the liquid crystal display device of Embodiment 3.
Figure 17:
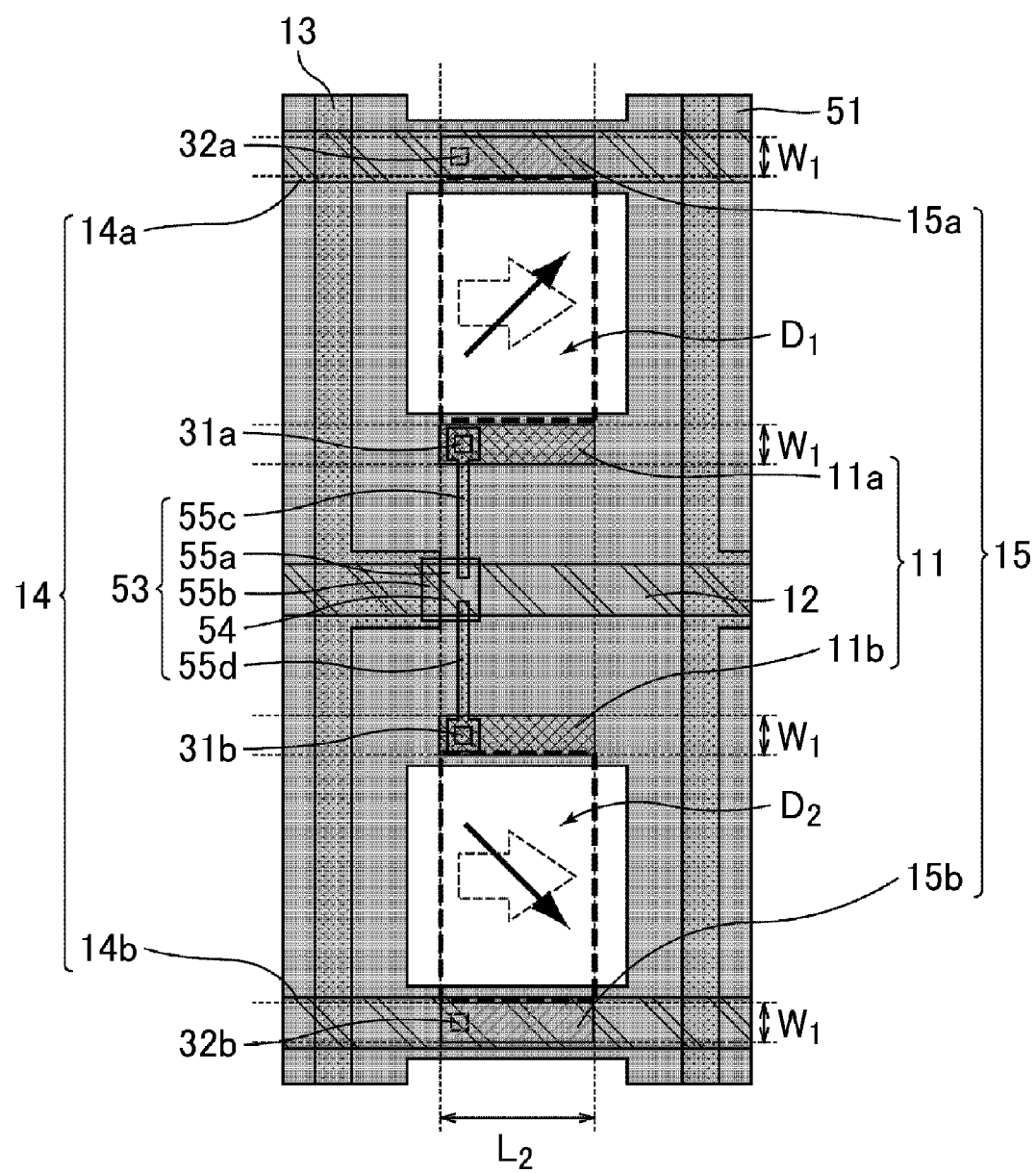
FIG. 17 is a schematic plan view in which the position of a black matrix is overlaid onto the plan view of the TFT substrate of Embodiment 3.

FIG. 16 is a schematic plan view of the TFT substrate of the liquid crystal display device of Embodiment 3, and FIG. 17 additionally shows the position of the black matrix. As shown in FIG. 17, in Embodiment 3, the length L2 of the first pixel electrode 11a, the second pixel electrode 11b, the first TFT common electrode 15a, and the second TFT common electrode 15b is less than the length of one side of the opening of the black matrix 51 formed therealong.

Specifically, the length L2 and the width W1 of the first pixel electrode 11a, the second pixel electrode 11b, the first TFT common electrode 15a, and the second TFT common electrode 15b are the same, and are 0.7 to 0.9 times the length of one side of the opening of the black matrix 51 formed therealong.

When conducting a simulation of the liquid crystal display device of Embodiment 3, the following results were attained (Working Example 3). The conditions of the simulation of Working Example 3 were set as follows. The pixel size was 15 μm×45 μm. The width of each of the pixel electrodes 11a and 11b and the common electrodes 15a and 15b is set to be 2 μm and the length of each of the pixel electrodes 11a and 11b and the common electrodes 15a and 15b is set to be 7 μm. The length and width of the opposite common electrode was set to be the same as the length and width of the TFT common electrode. The distance between the first pixel electrode 11a and the first TFT common electrode 15a and the distance between the second pixel electrode 11b and the second TFT common electrode 15b were both set to 11 μm. In other words, the aspect ratio of the first partitioned region D1 and the second partitioned region D2 is 7:11. The openings of the black matrix were set to be 10 μm×10 μm. In other words, the aspect ratio of the openings of the black matrix is 1:1.

Figure 18:
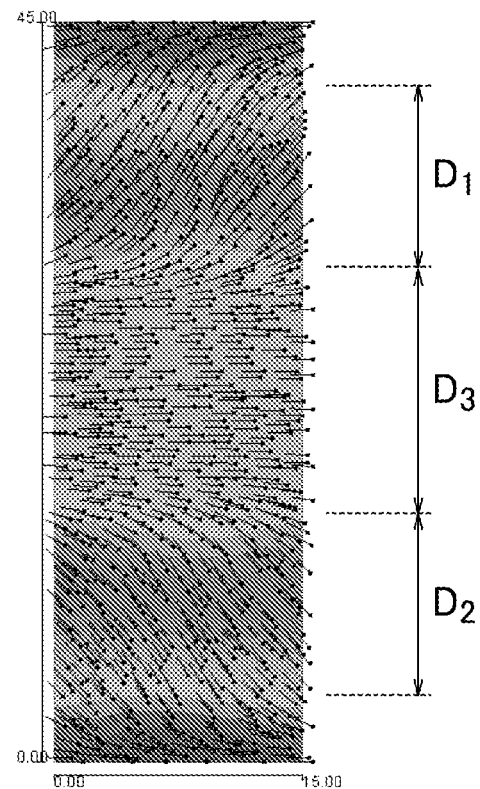
FIG. 18 is a plan view simulation image showing the behavior of liquid crystal molecules in Working Example 3.
Figure 19:
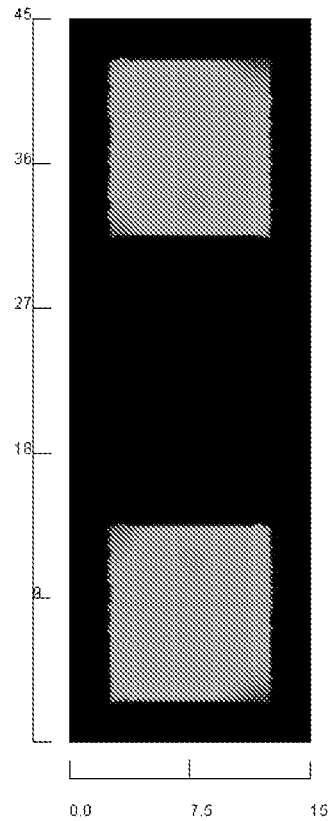
FIG. 19 is a plan view image showing the transmittance of light at a monochromatic gradation in Working Example 3.

FIG. 18 is a plan view simulation image showing the behavior of liquid crystal molecules in Working Example 3. FIG. 19 is a plan view image showing the transmittance of light at a monochromatic gradation in Working Example 3. As shown in FIGS. 18 and 19, based on the orientation distribution of the liquid crystal molecules in Working Example 3, it is possible to attain almost identical orientation characteristics as in Working Example 1. While the transmittance in the vicinity of the corners of the opening of the black matrix is slightly reduced due to the shorter electrodes and slightly worse than in Working Examples 1 and 2, a sufficient transmittance could be achieved for the display characteristics. Thus, according to Embodiment 3, excellent viewing angle characteristics and sufficient transmittance can be attained.

Embodiment 4

Embodiment 4 is similar to Embodiment 1 except that the width of the pixel electrode and the width of the common electrode opposite thereto differ from each other ((i) the first TFT common electrode corresponds to the first pixel electrode, and (ii) the second TFT common electrode corresponds to the second pixel electrode, for example). In Embodiment 4, the width of the pixel electrode is less than the width of the opposing common electrode.

Figure 20:
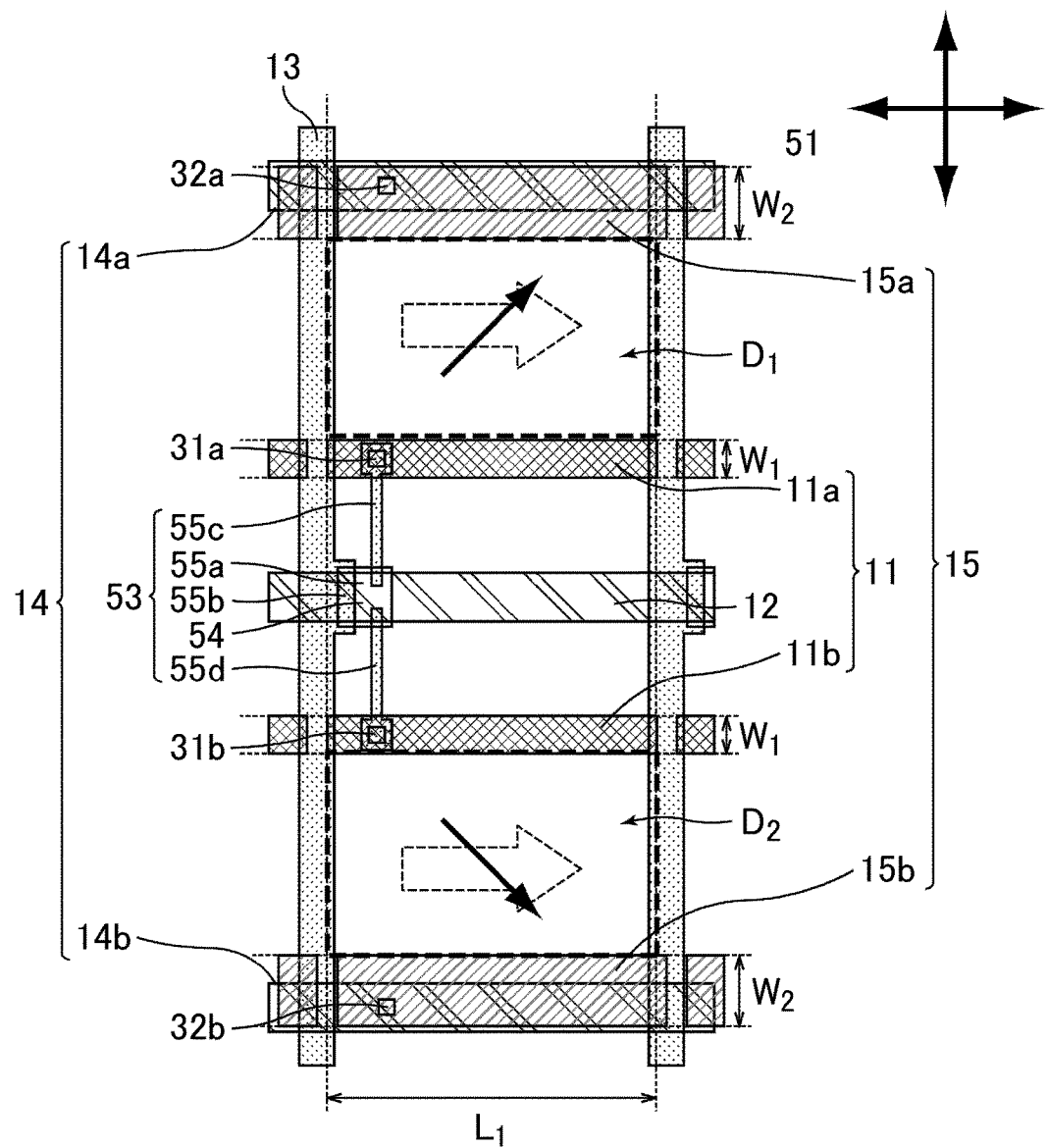
FIG. 20 is a schematic plan view of a TFT substrate of the liquid crystal display device of Embodiment 4.
Figure 21:
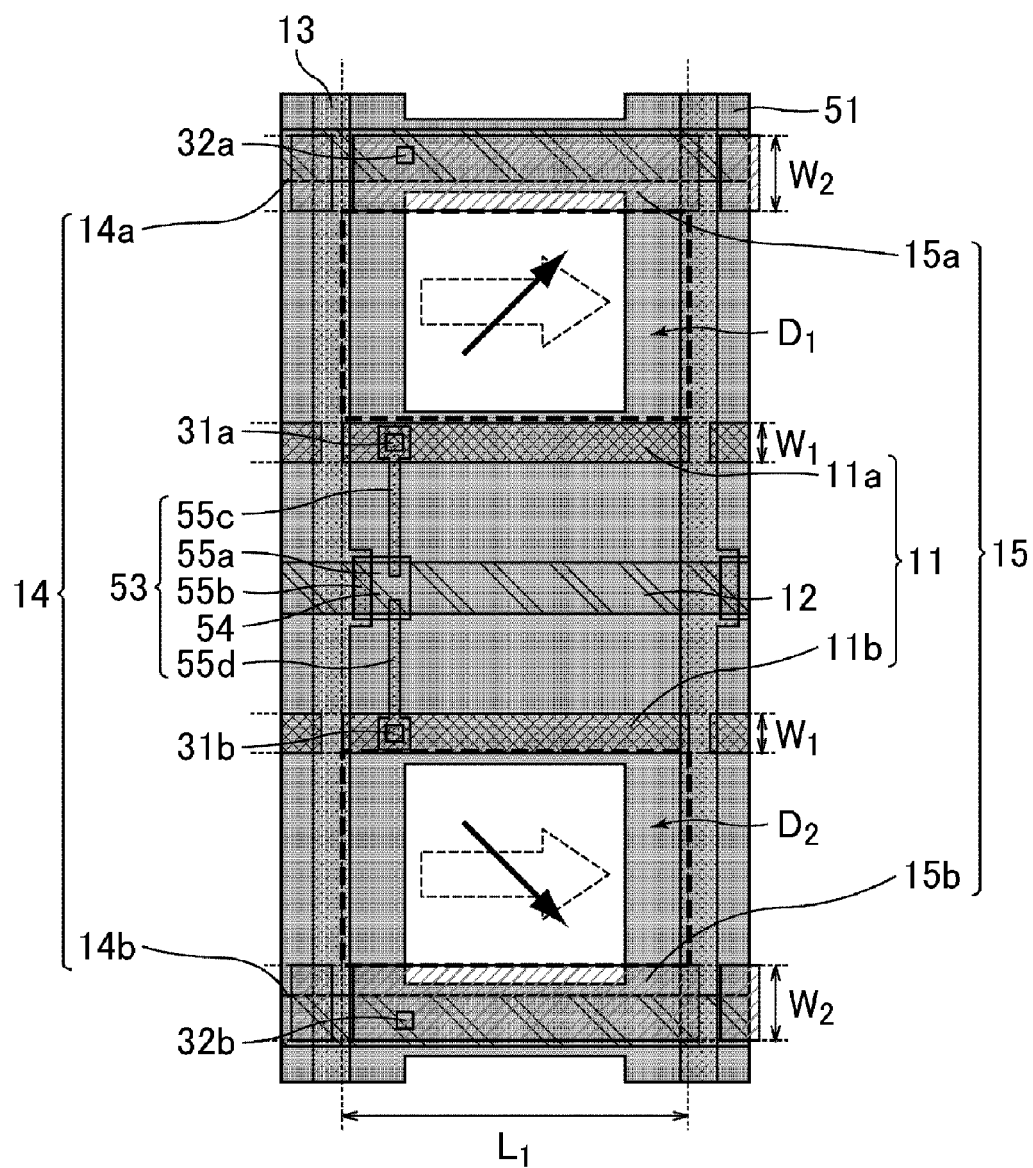
FIG. 21 is a schematic plan view in which the position of a black matrix is overlaid onto the plan view of the TFT substrate of Embodiment 4.

FIG. 20 is a schematic plan view of the TFT substrate of the liquid crystal display device of Embodiment 4, and FIG. 21 additionally shows the position of the black matrix. As shown in FIG. 20, the first pixel electrode 11a and the first TFT common electrode 15a are parallel to each other, but the width of the first pixel electrode 11a is 0.75 to 1.0 times that of the first TFT common electrode 15a. Similarly, the second pixel electrode 11b and the second TFT common electrode 15b are parallel to each other, but the width of the second pixel electrode 11b is 0.75 to 1.0 times that of the second TFT common electrode 15b. The first pixel electrode 11a and the second pixel electrode 11b have the same width W1, and the first TFT common electrode 15a and the second TFT common electrode 15b have the same width W2. Also, the first pixel electrode 11a, the second pixel electrode 11b, the first TFT common electrode 15a, and the second TFT common electrode 15b have the same length L1.

As shown in FIG. 21, in Embodiment 4, because the first TFT common electrode 15a and the second TFT common electrode 15b are formed to be wide, a portion of the first TFT common electrode 15a and a portion of the second TFT common electrode 15b spread slightly inside the opening of the black matrix 51 formed along these electrodes.

When conducting a simulation of the liquid crystal display device of Embodiment 4, the following results were attained (Working Example 4). The conditions of the simulation of Working Example 4 were set as follows. The pixel size was 15 μm×45 μm. The width of each of the pixel electrodes 11a and 11b is set to be 2 μm and the length of each of the pixel electrodes 11a and 11b is set to be 11 μm. The width of each of the common electrodes 15a and 15b is set to be 3 μm and the length of each of the common electrodes 15a and 15b is set to be 11 μm. The length and width of the opposite common electrode was set to be the same as the length and width of the TFT common electrode. The distance between the first pixel electrode 11a and the first TFT common electrode 15a and the distance between the second pixel electrode 11b and the second TFT common electrode 15b were both set to 10 μm. In other words, the aspect ratio of the first partitioned region D1 and the second partitioned region D2 is 11:10. The openings of the black matrix were set to be 10 μm×10 μm. In other words, the aspect ratio of the openings of the black matrix is 1:1.

Figure 22:
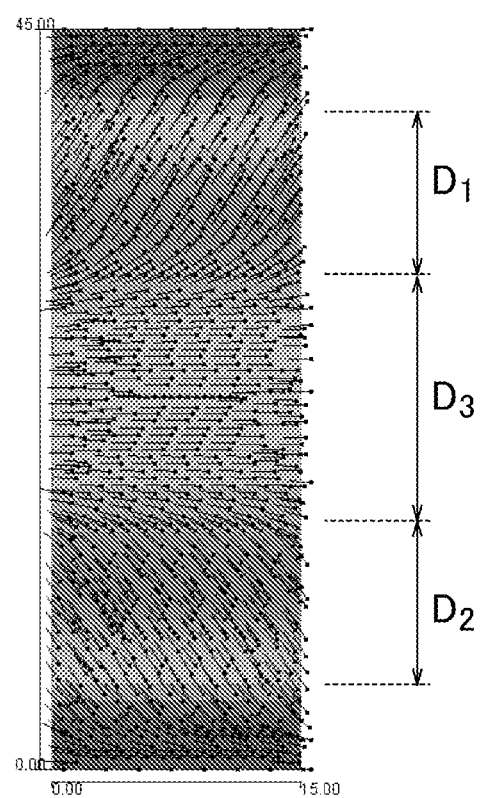
FIG. 22 is a plan view simulation image showing the behavior of liquid crystal molecules in Working Example 4.
Figure 23:
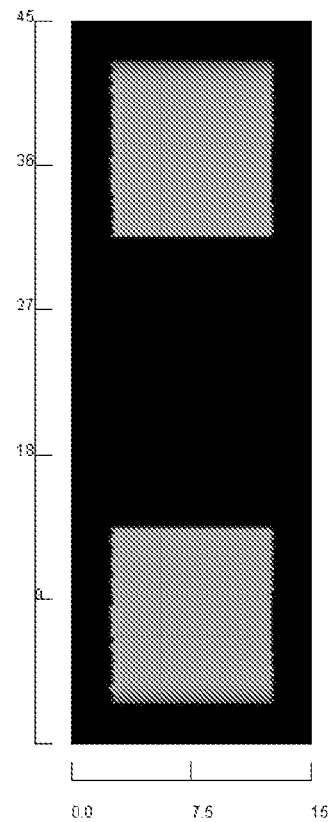
FIG. 23 is a plan view image showing the transmittance of light at a monochromatic gradation in Working Example 4.

FIG. 22 is a plan view simulation image showing the behavior of liquid crystal molecules in Working Example 4. FIG. 23 is a plan view image showing the transmittance of light at a monochromatic gradation in Working Example 4. As shown in FIGS. 22 and 23, based on the orientation distribution of the liquid crystal molecules in Working Example 4, it is possible to attain almost identical orientation characteristics as in Working Example 1. While the transmittance in the vicinity of the upper side or lower side of the openings of the black matrix is slightly reduced due to the electrodes spreading into the opening and slightly worse than in Working Examples 1 and 2, a sufficient transmittance could be achieved for the display characteristics. Thus, according to Embodiment 4, excellent viewing angle characteristics and sufficient transmittance can be attained.

Below, a table indicating the transmittance and voltage during white display for Working Examples 1 to 4 is provided.

TABLE 1

|  | Working Example 1 | Working Example 2 | Working Example 3 | Working Example 4 |
|---|---|---|---|---|
| Transmittance | 10.8% | 10.8% | 10.6% | 10.7% |
| Voltage (during white image display) | 5.5 V | 5.6 V | 6.2 V | 5.4 V |

Embodiment 5

Embodiment 5 is similar to Embodiment 1 except that one pixel is not constituted of two electrode pairs, each of which includes one pixel electrode and a common electrode opposing the pixel electrode, but rather, one pixel is constituted of two electrode pairs, each of which includes two pixel electrodes and one common electrode disposed therebetween. Embodiment 5 is suited to a case in which the pixels are larger than in Embodiment 1.

Figure 24:
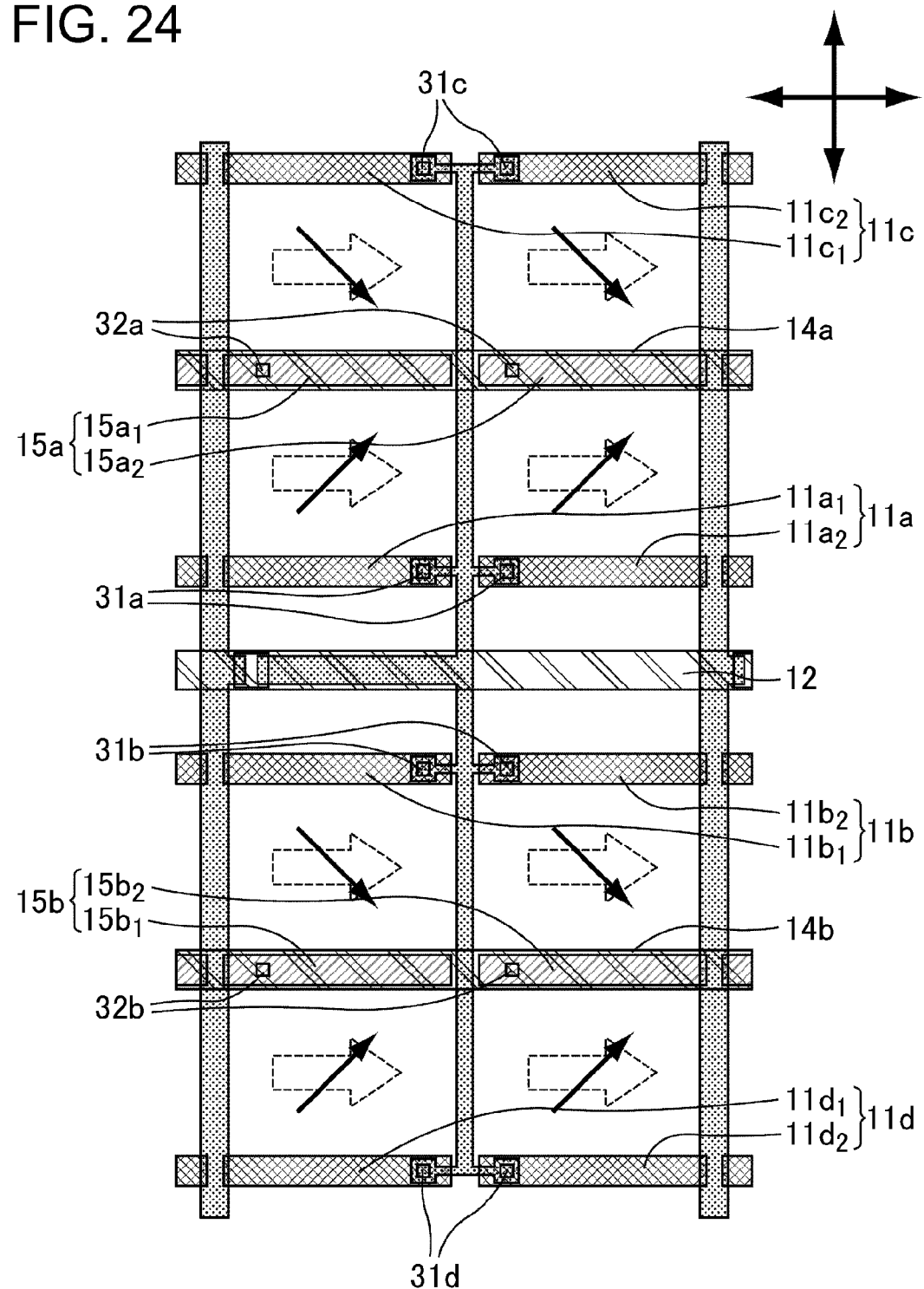
FIG. 24 is a schematic plan view of a TFT substrate of the liquid crystal display device of Embodiment 5.
Figure 25:
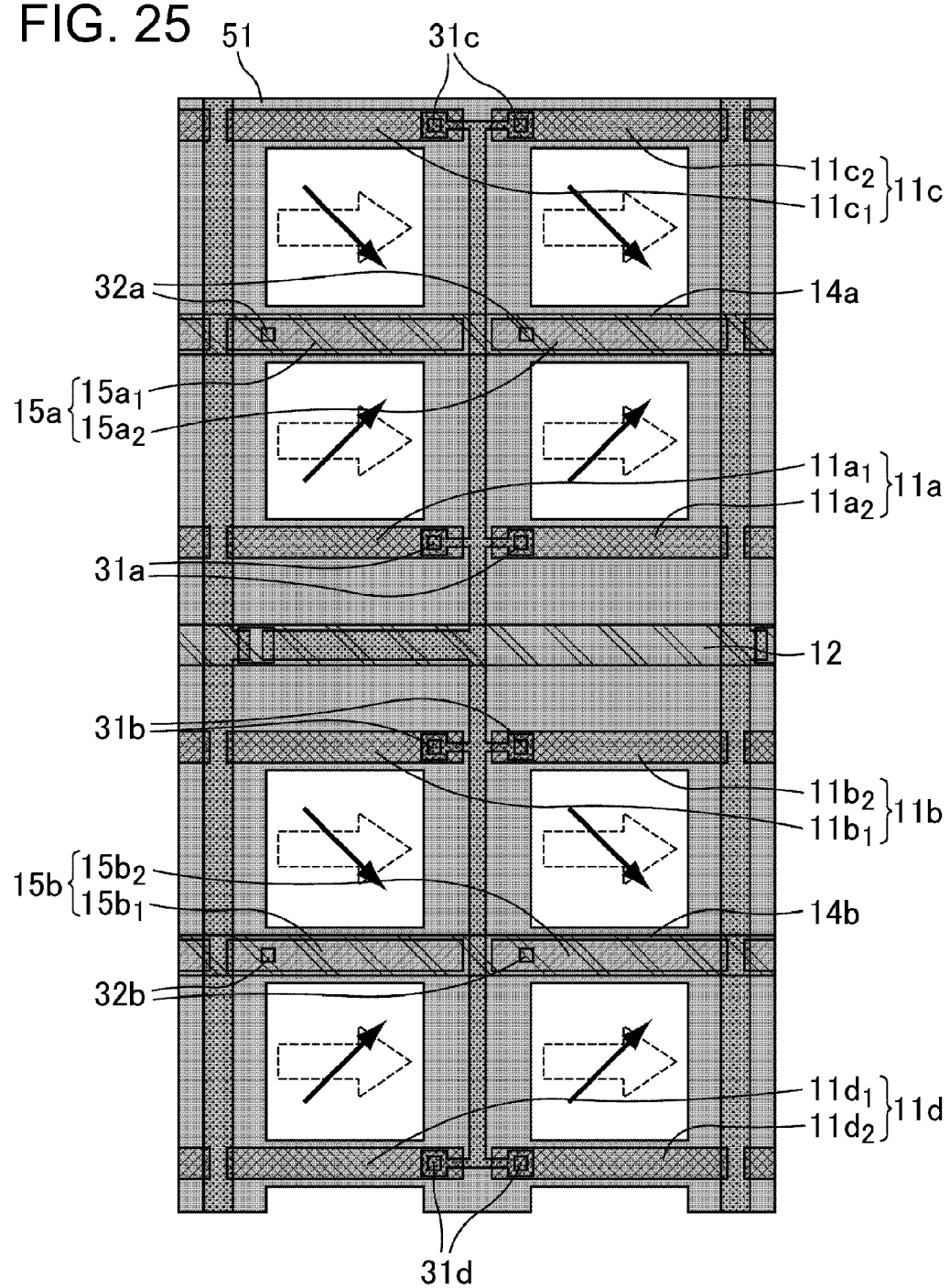
FIG. 25 is a schematic plan view in which the position of a black matrix is overlaid onto the plan view of the TFT substrate of Embodiment 5.

FIG. 24 is a schematic plan view of the TFT substrate of the liquid crystal display device of Embodiment 5, and FIG. 25 additionally shows the position of the black matrix. As shown in FIG. 24, the combination of the first pixel electrode 11a, the first TFT common electrode 15a, and a third pixel electrode 11c and the combination of the second pixel electrode 11b, the second TFT common electrode 15b, and a fourth pixel electrode 11d respectively form pairs of electrodes, and a plurality of such pairs of electrodes are formed on the TFT substrate. The first pixel electrode 11a is further subdivided into two component units 11a1 and 11a2, the first TFT common electrode 15a is further subdivided into two component units 15a1 and 15a2, and the third pixel electrode 11c is further subdivided into two component units 11c1 and 11c2. Similarly, the second pixel electrode 11b is further subdivided into two component units 11b1 and 11b2, the second TFT common electrode 15b is further subdivided into two component units 15b1 and 15b2, and the fourth pixel electrode 11d is further subdivided into two component units 11d1 and 11d2.

The component units 11a1 and 11a2 of the first pixel electrode, the component units 11b1 and 11b2 of the second pixel electrode, the component units 11c1 and 11c2 of the third pixel electrode, and the component units 11d1 and 11d2 of the fourth pixel electrode are all connected to one TFT 53, and image signals having the same potential (pixel potential) are supplied to all of the component units.

Also, the component units 11a1 and 11a2 of the first pixel electrode, the component units 11b1 and 11b2 of the second pixel electrode, the component units 11c1 and 11c2 of the third pixel electrode, the component units 11d1 and 11d2 of the fourth pixel electrode, the component units 15a1 and 15a2 of the first TFT common electrode, and the component units 15b1 and 15b2 of the second TFT common electrode are arranged to exhibit line symmetry about a line passing between the component units 11a1 and 11a2 of the first pixel electrode and the component units 11b1 and 11b2 of the second pixel electrode, the line being parallel thereto.

In Embodiment 5, the component units 11a1 and 11a2 of the first pixel electrode, the component units 11b1 and 11b2 of the second pixel electrode, the component units 11c1 and 11c2 of the third pixel electrode, the component units 11d1 and 11d2 of the fourth pixel electrode, the component units 15a1 and 15a2 of the first TFT common electrode, and the component units 15b1 and 15b2 of the second TFT common electrode are all the same length and width, and are all parallel to each other.

As shown in FIG. 25, a black matrix 51 is provided with openings matching areas where the orientation of the liquid crystal molecules is controlled by the respective electrodes. In other words, the black matrix 51 is formed such that outer edges of the openings are formed in the partitioned regions formed by the component units 11a1 and 11a2 of the first pixel electrode 11a, the component units 15a1 and 15a2 of the first TFT common electrode 15a, the component units 11c1 and 11c2 of the third pixel electrode 11c, the component units 11b1 and 11b2 of the second pixel electrode 11b, the component units 15b1 and 15b2 of the second TFT common electrode 15b, and the component units 11d1 and 11d2 of the fourth pixel electrode 11d.

In Embodiment 5, a third partitioned region D4 and a fourth partitioned region D5 are formed by the first pixel electrode 11a, the first TFT common electrode 15a, the third pixel electrode 11c, the second pixel electrode 11b, the second TFT common electrode 15b, and the fourth pixel electrode 11d, the third partitioned region D4 including third sub-partitioned regions d1 and d2, the fourth partitioned region D5 including fourth sub-partitioned regions d3 and d4. Unlike Embodiment 1, the first partitioned region D1 and the second partitioned region D2 are each further subdivided into four regions, but the size of each sub-partitioned region d1 and d2 is equal to the size of the first partitioned region D1 and the second partitioned region D2 in Embodiment 1.

The plurality of openings formed in the black matrix 51 have the role of allowing through display light.

When conducting a simulation of the liquid crystal display device of Embodiment 5, the following results were attained (Working Example 5). The conditions of the simulation of Working Example 5 were set as follows. The pixel size was 30 μm×90 μm. The width of each component unit of the pixel electrode and TFT common electrode was set to 2 μm with the length thereof being 11 μm. The length and width of each component unit of the opposite common electrode were set to be the same as the length and width of each component unit of the TFT common electrode. The distance between the component units 15a1 and 15a2 of the first TFT common electrode and the component units 11a1 and 11a2 of the first pixel electrode, the distance between the component units 15a1 and 15a2 of the first TFT common electrode and the component units 11c1 and 11c2 of the third pixel electrode, the distance between the component units 15b1 and 15b2 of the second TFT common electrode and the component units 11b1 and 11b2 of the second pixel electrode, and the distance between the component units 15b1 and 15b2 of the second TFT common electrode and the component units 11d1 and 11d2 of the fourth pixel electrode are all set to be 11 μm. In other words, the aspect ratio of each of the partitioned regions is 1:1. The openings of the black matrix were set to be 10 μm×10 μm. In other words, the aspect ratio of the openings of the black matrix is 1:1.

Figure 26:
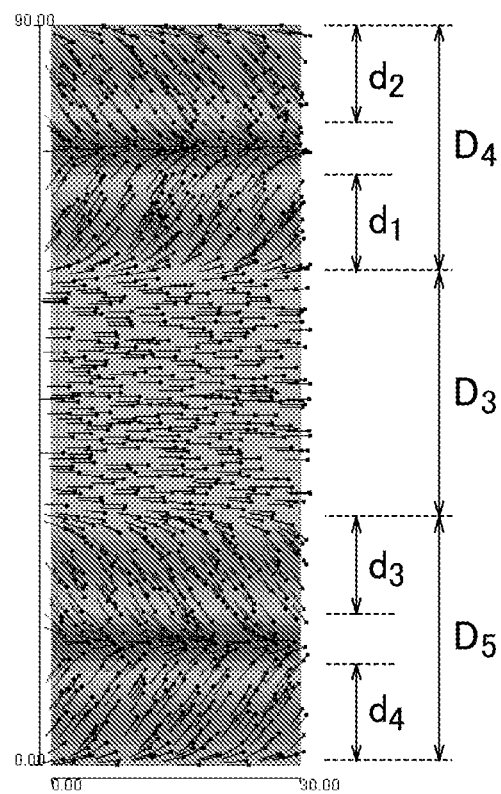
FIG. 26 is a plan view simulation image showing the behavior of liquid crystal molecules in Working Example 5.
Figure 27:
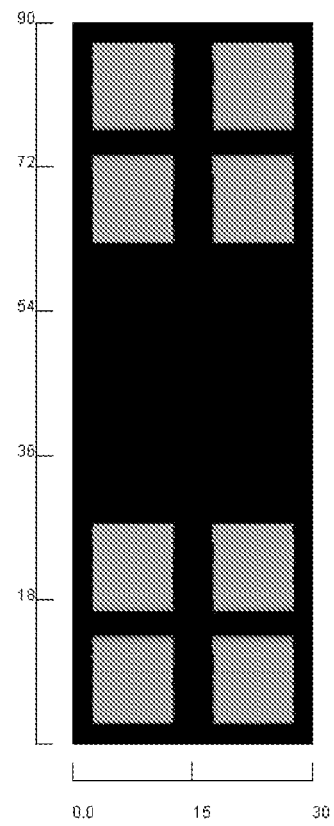
FIG. 27 is a plan view image showing the transmittance of light at a monochromatic gradation in Working Example 5.

FIG. 26 is a plan view simulation image showing the behavior of liquid crystal molecules in Working Example 5. FIG. 27 is a plan view image showing the transmittance of light at a monochromatic gradation in Working Example 5. When confirming the orientation distribution of liquid crystal molecules in Working Example 5 as shown in FIG. 26, a well-balanced diagonal orientation can be attained in a manner similar to Working Example 1 although the orientation distribution of the liquid crystal molecules differs therefrom. When confirming the transmittance in Working Example 5 as shown in FIG. 27, it can be seen that a uniform transmittance is attained for the respective partitioned regions. However, there are many regions that need to be shielded from light by the black matrix, and in reality, an equal transmittance to Working Example 1, which has a smaller pixel size, was attained. Thus, while the present invention can be applied even to a case in which the pixel size is large, when considering light usage efficiency, it can be seen that Embodiment 1 made more efficient use of light.

Thus, according to Embodiment 5, excellent viewing angle characteristics and transmittance can be attained.

Embodiment 6

Embodiment 6 is similar to Embodiment 5 except that one pixel is not constituted of two electrode pairs, each of which includes one pixel electrode and a common electrode opposing the pixel electrode, but rather, one pixel is constituted of two electrode pairs, each of which includes two common electrodes and one pixel electrode disposed therebetween. In other words, in Embodiment 6, the positions of the pixel electrodes are interchanged with the positions of the common electrode as compared to Embodiment 5. Similar to Embodiment 5, Embodiment 6 is suited to a case in which the pixels are larger than in Embodiment 1.

Figure 28:
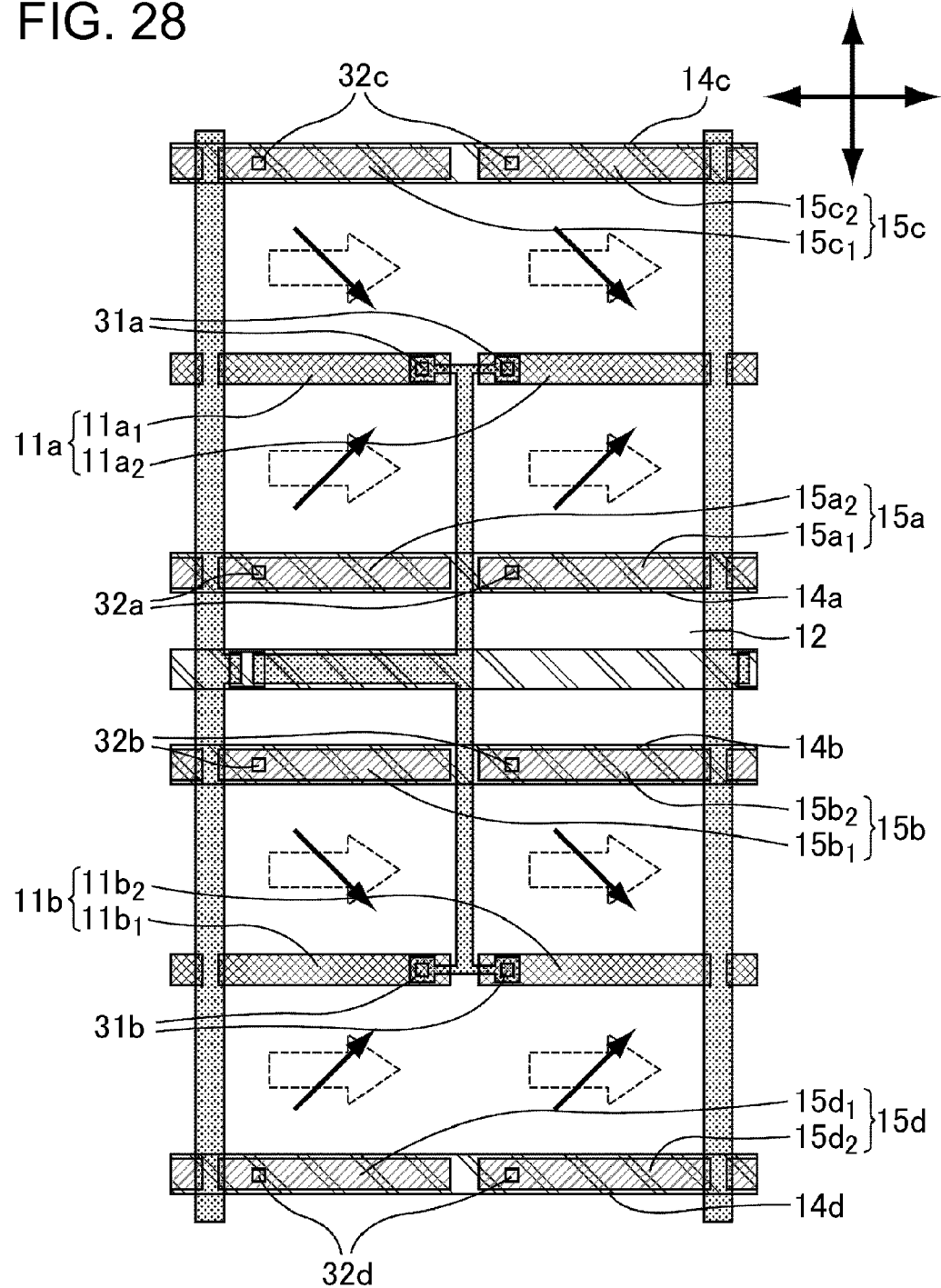
FIG. 28 is a schematic plan view of a TFT substrate of the liquid crystal display device of Embodiment 6.
Figure 29:
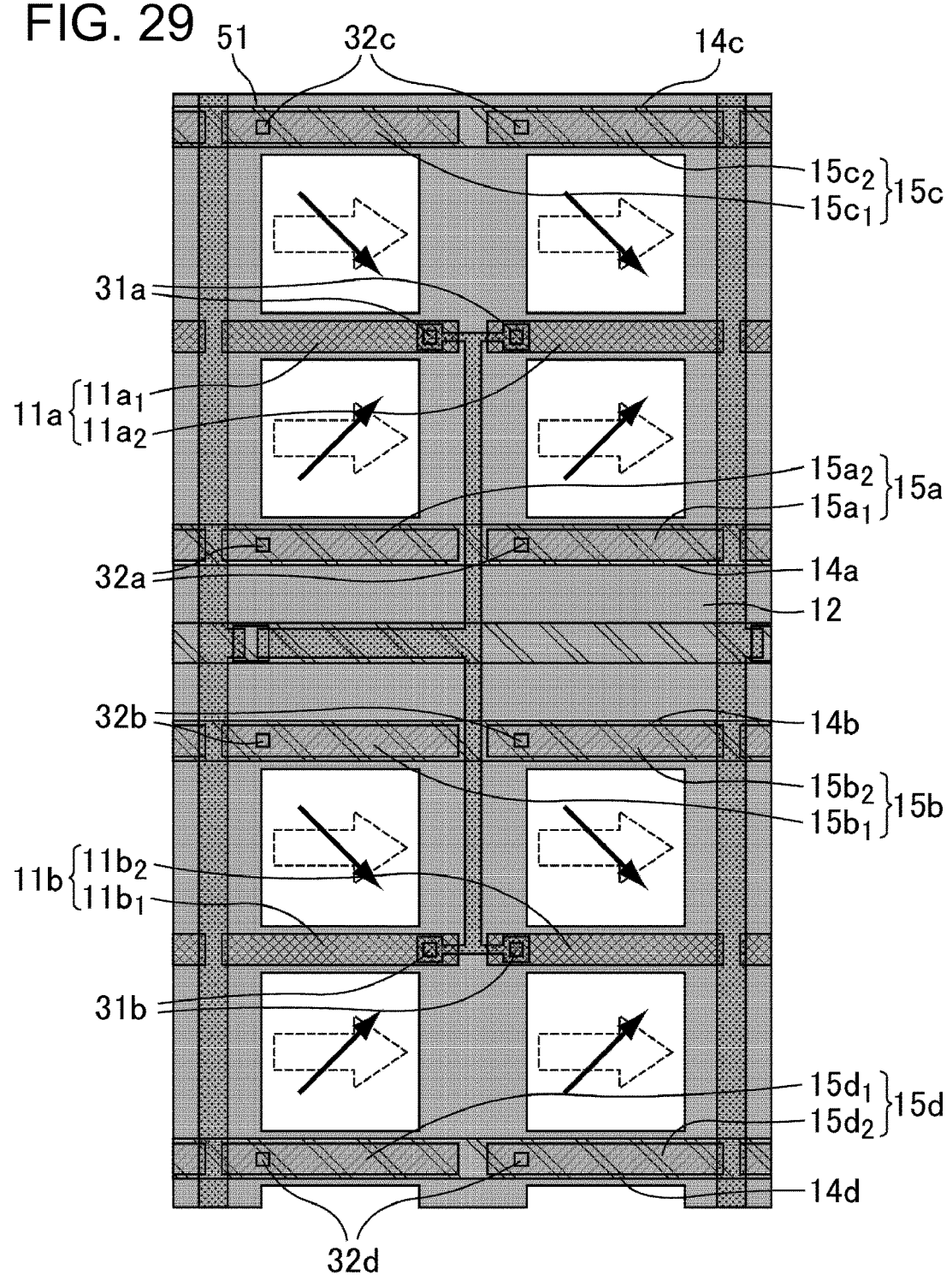
FIG. 29 is a schematic plan view in which the position of a black matrix is overlaid onto the plan view of the TFT substrate of Embodiment 6.

FIG. 28 is a schematic plan view of the TFT substrate of the liquid crystal display device of Embodiment 6, and FIG. 29 additionally shows the position of the black matrix. As shown in FIG. 28, the combination of a first TFT common electrode 15a, the first pixel electrode 11a, and a third TFT common electrode 15c and the combination of the second TFT common electrode 15b, the second pixel electrode 11b, and a fourth TFT common electrode 15d respectively form pairs of electrodes, and a plurality of such pairs of electrodes are formed on the TFT substrate. The first TFT common electrode 15a is further subdivided into two component units 15a1 and 15a2, the first pixel electrode 11a is further subdivided into two component units 11a1 and 11a2, and the third pixel electrode 15c is further subdivided into two component units 15c1 and 15c2. Similarly, the second TFT common electrode 15b is further subdivided into two component units 15b1 and 15b2, the second pixel electrode 11b is further subdivided into two component units 11b1 and 11b2, and the fourth TFT common electrode 15d is further subdivided into two component units 15d1 and 15d2.

The component units 11a1 and 11a2 of the first pixel electrode, and the component units 11b1 and 11b2 of the second pixel electrode are both connected to one TFT 53, and image signals having the same potential (pixel potential) are supplied to all of the component units.

Also, the component units 15a1 and 15a2 of the first TFT common electrode, the component units 15b1 and 15b2 of the second TFT common electrode, the component units 15c1 and 15c2 of the third TFT common electrode, the component units 15d1 and 15d2 of the fourth TFT common electrode, the component units 11a1 and 11a2 of the first pixel electrode, and the component units 11b1 and 11b2 of the second pixel electrode are arranged to exhibit linear symmetry about a line passing between the component units 15a1 and 15a2 of the first TFT common electrode and the component units 15b1 and 15b2 of the second TFT common electrode, the line being parallel thereto.

In Embodiment 5, the component units 15a1 and 15a2 of the first TFT common electrode, the component units 15b1 and 15b2 of the second TFT common electrode, the component units 15c1 and 15c2 of the third TFT common electrode, the component units 15d1 and 15d2 of the fourth TFT common electrode, the component units 11a1 and 11a2 of the first pixel electrode, and the component units 11b1 and 11b2 of the second pixel electrode are all the same length and width, and are all parallel to each other.

As shown in FIG. 29, a black matrix 51 is provided with openings matching areas where the orientation of the liquid crystal molecules is controlled by the respective electrodes. In other words, the black matrix 51 is formed such that outer edges of the openings are formed in the partitioned regions formed by the component units 15a1 and 15a2 of the first TFT common electrode, the component units 15b1 and 15b2 of the second TFT common electrode, the component units 15c1 and 15c2 of the third TFT common electrode, the component units 15d1 and 15d2 of the fourth TFT common electrode, the component units 11a1 and 11a2 of the first pixel electrode, and the component units 11b1 and 11b2 of the second pixel electrode.

In Embodiment 6, a third partitioned region D4 and a fourth partitioned region D5 are formed by the first pixel electrode 11a, the first TFT common electrode 15a, the first pixel electrode 11a, the third TFT common electrode 15c, the second TFT common electrode 15b, the second pixel electrode 11b, and the fourth TFT common electrode 15d, the third partitioned region D4 including third sub-partitioned regions d1 and d2, the fourth partitioned region D5 including fourth sub-partitioned regions d3 and d4. Unlike Embodiment 1, the first partitioned region D1 and the second partitioned region D2 are each further subdivided into four regions, but the size of each partitioned region is equal to the size of the first partitioned region D1 and the second partitioned region D2 in Embodiment 1.

The plurality of openings formed in the black matrix 51 have the role of allowing through display light.

When conducting a simulation of the liquid crystal display device of Embodiment 6, the following results were attained (Working Example 6). The conditions of the simulation of Working Example 6 were set as follows. The pixel size was 30 μm×90 μm. The width of each component unit of the pixel electrode and TFT common electrode was set to 2 μm with the length thereof being 1 μm. The length and width of each component unit of the opposite common electrode was set to be the same as the length and width of each component unit of the TFT common electrode. The distance between the component units 11a1 and 11a2 of the first pixel electrode and the component units 15a1 and 15a2 of the first TFT common electrode, the distance between the component units 11a1 and 11a2 of the first pixel electrode and the component units 15c1 and 15c2 of the third TFT common electrode, the distance between the component units 11b1 and 11b2 of the second pixel electrode and the component units 15b1 and 15b2 of the second TFT common electrode, and the distance between the component units 11b1 and 11b2 of the second pixel electrode and the component units 15d1 and 15d2 of the fourth TFT common electrode are all set to be 11 μm. In other words, the aspect ratio of each of the partitioned regions is 1:1. The openings of the black matrix were set to be 10 μm×10 μm. In other words, the aspect ratio of the openings of the black matrix is 1:1.

Figure 30:
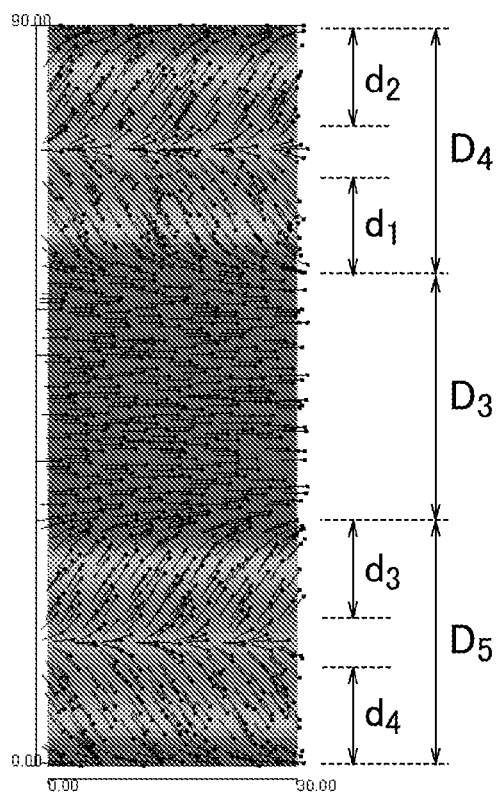
FIG. 30 is a plan view simulation image showing the behavior of liquid crystal molecules in Working Example 6.
Figure 31:
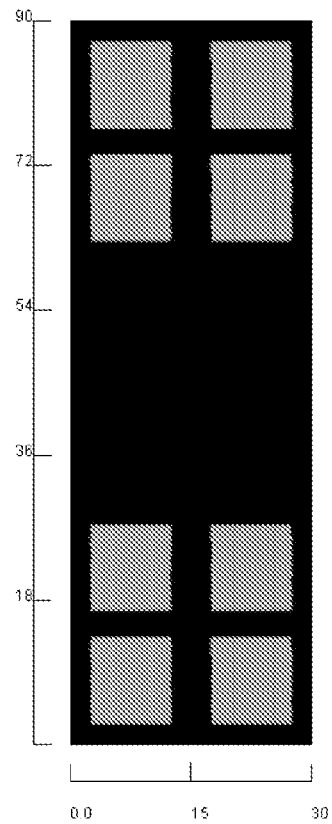
FIG. 31 is a plan view image showing the transmittance of light at a monochromatic gradation in Working Example 6.

FIG. 30 is a plan view simulation image showing the behavior of liquid crystal molecules in Working Example 6. FIG. 31 is a plan view image showing the transmittance of light at a monochromatic gradation in Working Example 6. When confirming the orientation distribution of liquid crystal molecules in Working Example 6 as shown in FIG. 30, a well-balanced diagonal orientation can be attained in a manner similar to Working Example 1 although the orientation distribution of the liquid crystal molecules differs therefrom. When confirming the transmittance in Working Example 6 as shown in FIG. 31, it can be seen that a uniform transmittance is attained for the respective partitioned regions. However, there are many regions that need to be shielded from light by the black matrix, and in reality, an equal transmittance to Working Example 1, which has a smaller pixel size, was attained. Thus, while the present invention can be applied even to a case in which the pixel size is large, when considering light usage efficiency, it can be seen that Embodiment 1 made more efficient use of light.

Thus, according to Embodiment 6, excellent viewing angle characteristics and transmittance can be attained.

Below, a table indicating the transmittance and voltage during white display for Working Examples 5 and 6 is provided.

TABLE 2

|  | Working Example 5 | Working Example 6 |
|---|---|---|
| Transmittance | 10.8% | 10.8% |
| Voltage (during white image display) | 5.8 V | 5.8 V |

Embodiment 7

Embodiment 7 is similar to Embodiment 1 except that the liquid crystal layer contains liquid crystal molecules having negative dielectric anisotropy and that the initial orientation of the liquid crystal molecules differs from that of Embodiment 1.

Figure 32:
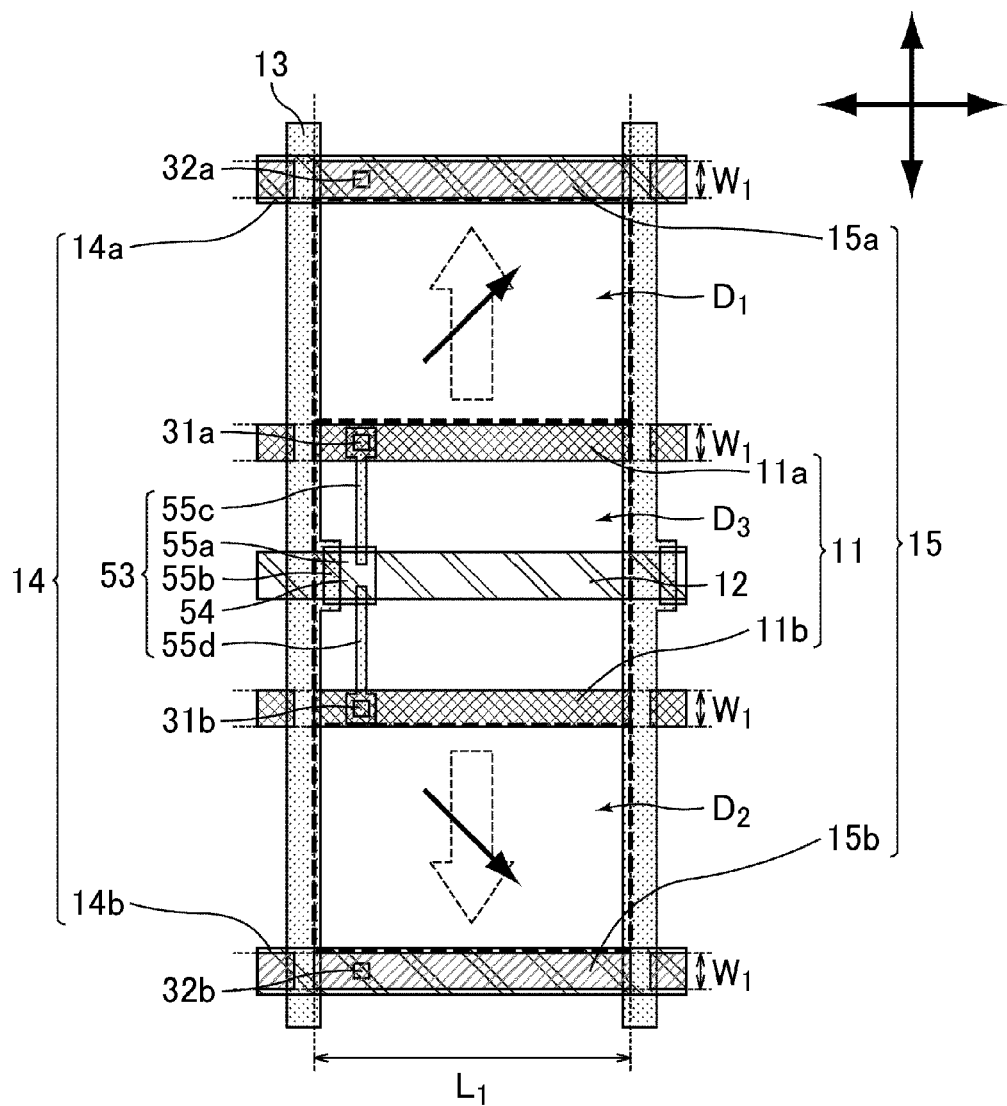
FIG. 32 is a schematic plan view of a TFT substrate of the liquid crystal display device of Embodiment 7.

FIG. 32 is a schematic plan view of a TFT substrate of the liquid crystal display device of Embodiment 7. As shown in FIG. 32, in Embodiment 7, the components and arrangement thereof in the liquid crystal display device starting with the various electrodes are similar to Embodiment 1.

As shown in FIG. 32, when no voltage is applied, the liquid crystal molecules are respectively oriented substantially perpendicular (specifically including a margin of error of 7.5° or less) to the first pixel electrode 11a, the second pixel electrode 11b, the first TFT common electrode 15a, and the second TFT common electrode 15b. The initial orientation azimuths of the liquid crystal molecules in the region D1 between the first pixel electrode 11a and the first TFT common electrode 15a and the liquid crystal molecules in the region D2 between the second pixel electrode 11b and the second TFT common electrode 15b are in reality reversed from each other (specifically includes a margin of error of 15.0° or less). The orientation of the liquid crystal molecules can be set by the alignment films on which alignment treatment has been performed, for example. The hollow dotted arrows in FIG. 32 indicate the orientation azimuths (long axis directions) of the liquid crystal molecules when no voltage is applied.

On the other hand, as shown in FIG. 32, when a voltage at or above a threshold is applied, the liquid crystal molecules are respectively oriented in a direction inclined with respect to the first pixel electrode 11a, the second pixel electrode 11b, the first TFT common electrode 15a, and the second TFT common electrode 15b. The angle of incline varies depending on the voltage applied to the liquid crystal layer. The black arrows in FIG. 32 indicate the orientation azimuth (long axis direction) of the liquid crystal molecules when a white voltage is applied.

In Embodiment 7, both the first partitioned region D1 and the second partitioned region D2 are rectangular or square. This makes it possible to achieve excellent transmittance and a wide viewing angle.

Figure 33:
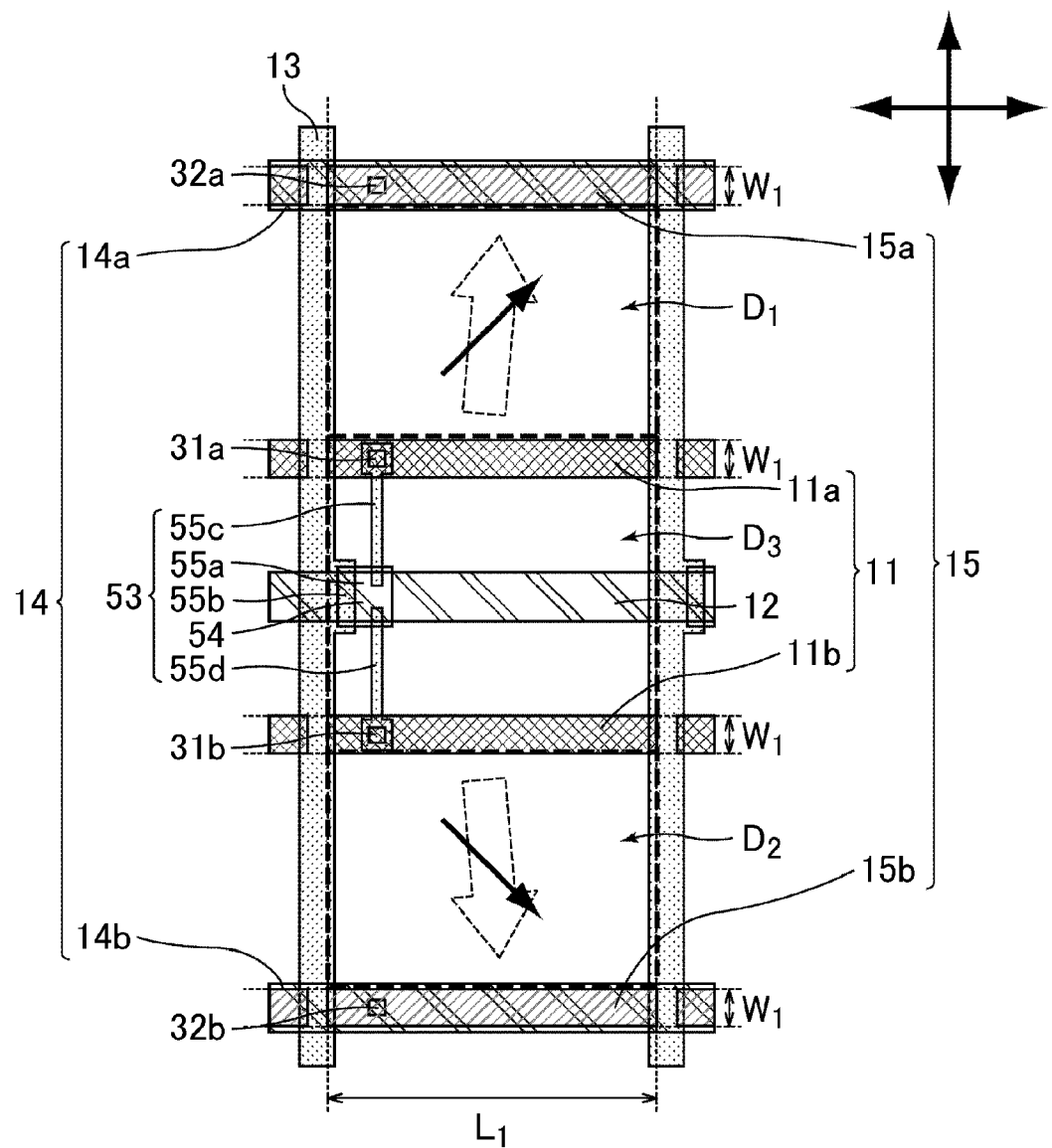
FIG. 33 is a schematic plan view of a TFT substrate of the liquid crystal display device of a preferred example of Embodiment 7.

Next, a preferred example of Embodiment 7 will be described. FIG. 33 is a schematic plan view of a TFT substrate of the liquid crystal display device of a preferred example of Embodiment 7. As shown in FIG. 33, in Embodiment 7, it is preferable that the initial orientation direction of the liquid crystal molecules not be completely perpendicular to the first pixel electrode 11a, the second pixel electrode 11b, the first TFT common electrode 15a, and the second TFT common electrode 15b, but to be offset by 5 to 7°. Also, as shown in FIG. 33, it is preferable that the liquid crystal molecules included in the region D1 between the first pixel electrode 11a and the first TFT common electrode 15a and the liquid crystal molecules included in the region D2 between the second pixel electrode 11b and the second TFT common electrode 15b be offset by 5 to 7° in the same azimuth direction.

In this manner, when a voltage at or above a threshold is applied, the liquid crystal molecules included in the regions D1 and D2 are all oriented in the direction of the black arrows in FIG. 33. This makes it possible to achieve better display characteristics.

Evaluation Test 1

Below, test results for transmittance and viewing angle characteristics in a plan view at respective aspect ratios in the regions D1 and D2 between the independent pairs of linear electrodes (more specifically, pixel electrodes and TFT common electrodes) will be described. In Evaluation Test 1, five samples were prepared: sample A where the aspect ratio is 11:11 (=1:1), sample B where the aspect ratio is 9:11, sample C where the aspect ratio is 7:11, sample D where the aspect ratio is 5:11, and sample E where the aspect ratio is 3:11. The adjustment of aspect ratio was performed by adjusting the length of the pixel electrodes (second linear electrodes). The pixel electrode is 2 μm wide. The size of each pixel is the same for all of samples A to E, the width being 15 μm, the height being 45 μm. The size of each TFT is the same for all of samples A to E. The same liquid crystal material is used for all of samples A to E.

For all of the samples A to E, the TFT common electrodes (first linear electrodes) and the opposite common electrodes (third linear electrodes) have a width of 2 μm and a length of 11 μm. The opposite common electrode is located in an area overlapping the TFT common electrode. The length of the pixel electrode is 11 μm for sample A, 9 μm for sample B, 7 μm for sample C, 5 μm for sample D, and 3 μm for sample E.

In all of samples A to E, the shape of the openings of the black matrix is square with one side being 10 μm.

Figure 34:
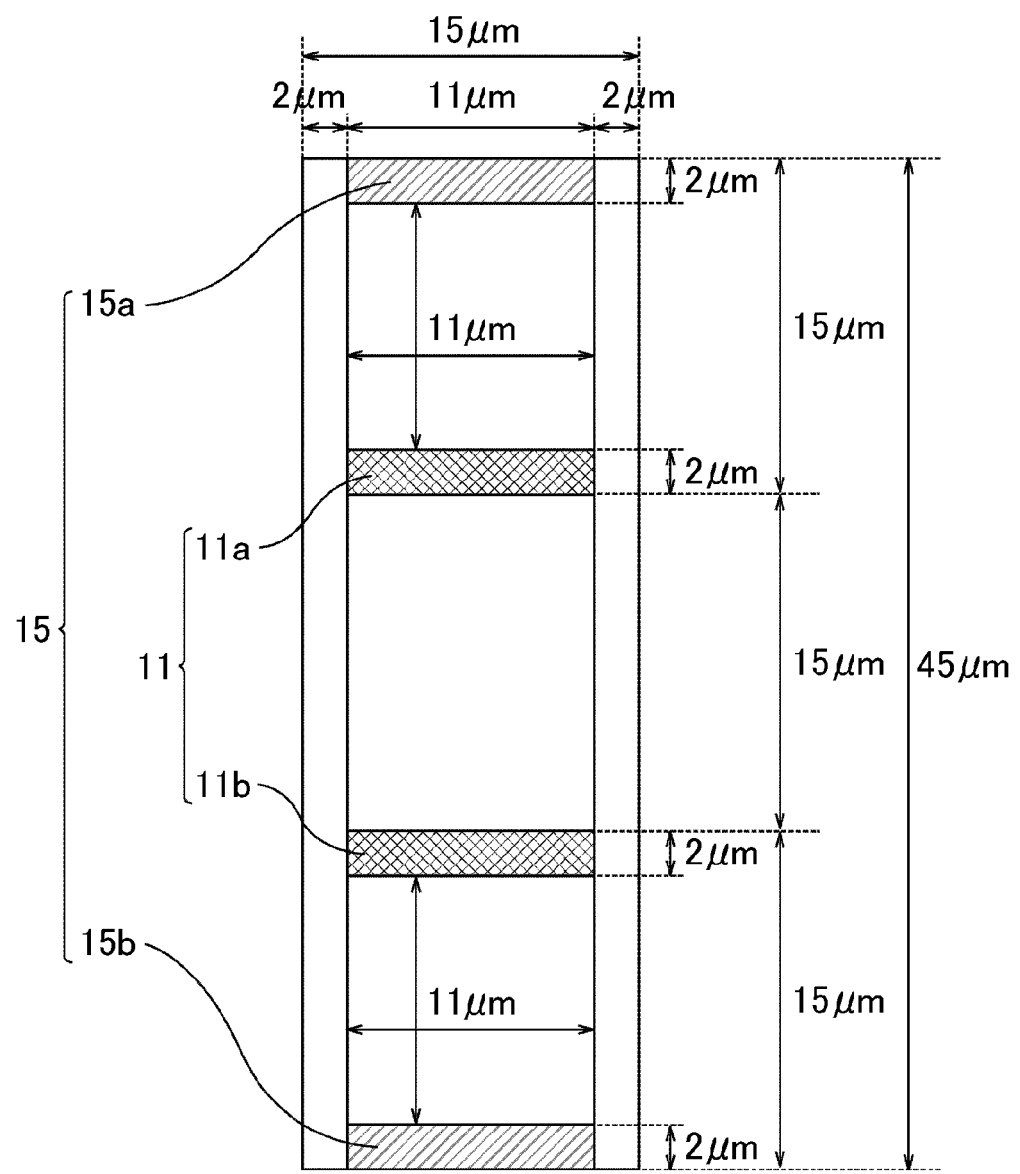
FIG. 34 is a schematic view showing a configuration of a pixel to be a reference (Ref) in each sample in Evaluation Experiments 1 to 5 on the TFT substrate side.
Figure 35:
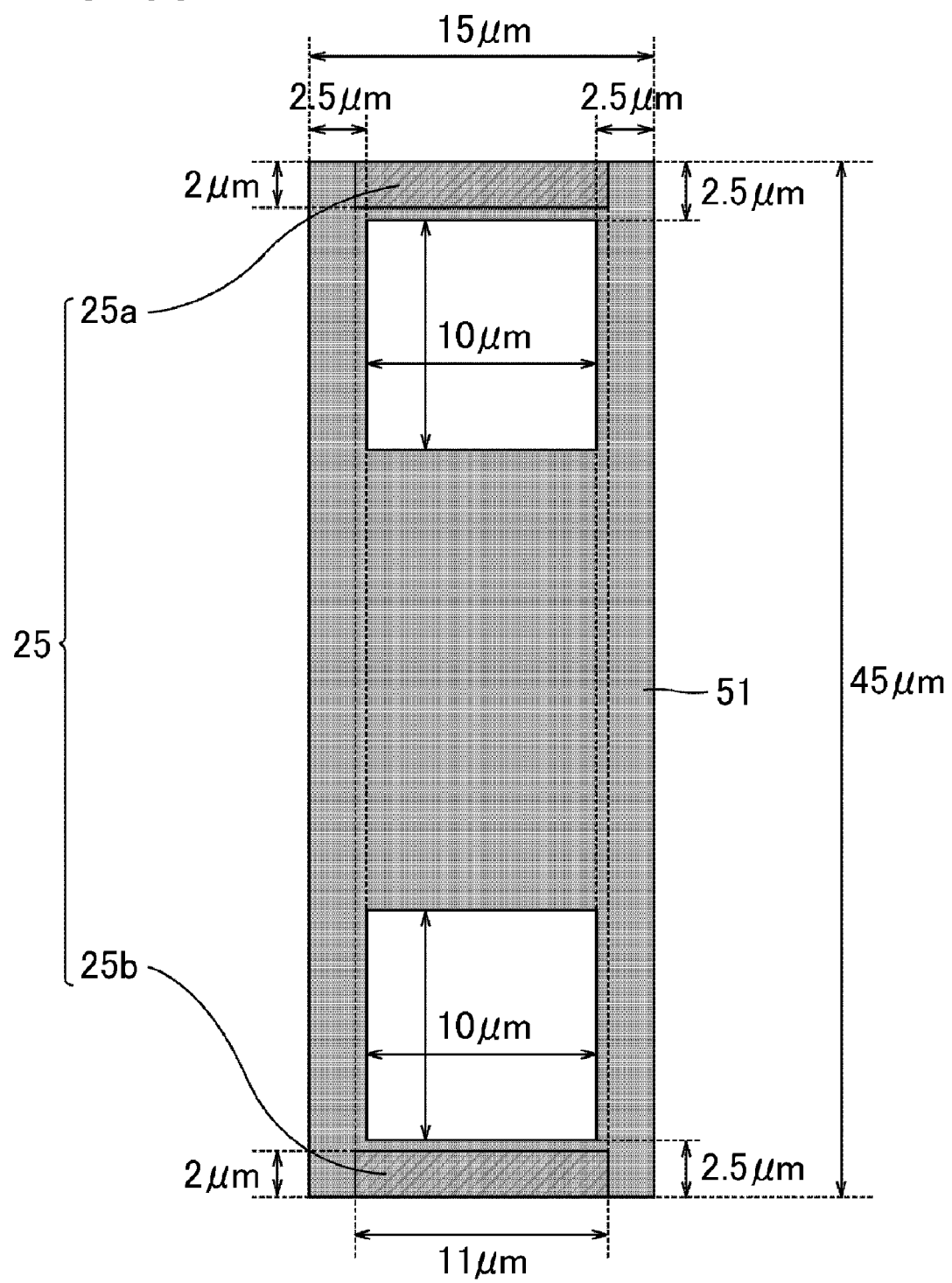
FIG. 35 is a schematic view showing a configuration of a pixel to be a reference (Ref) in each sample in Evaluation Experiments 1 to 5 on the opposite substrate side.

FIGS. 34 and 35 are schematic views showing a configuration of a pixel of a sample to be a reference (Ref) in the Evaluation Test 1 and the Evaluation Tests 2 to 5 described later; FIG. 34 shows the TFT substrate side and FIG. 35 shows the opposite substrate side. The reference (Ref) sample is the same as samples A, F, J, and T below.

Figure 36:
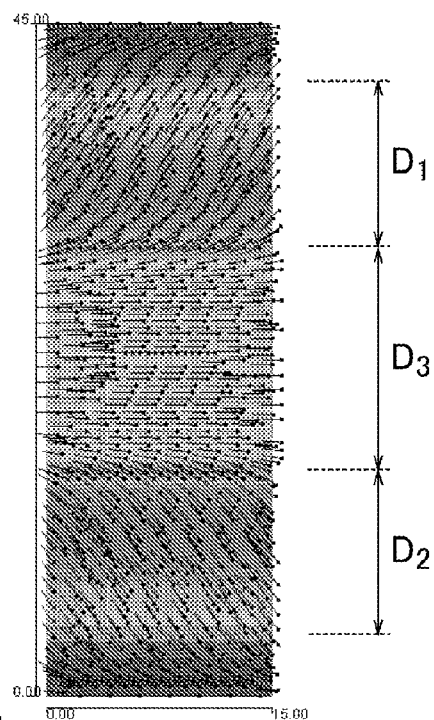
FIG. 36 is a simulation image (plan view image) showing the behavior of liquid crystal molecules when a white voltage (5.5V) is applied in sample A.
Figure 37:
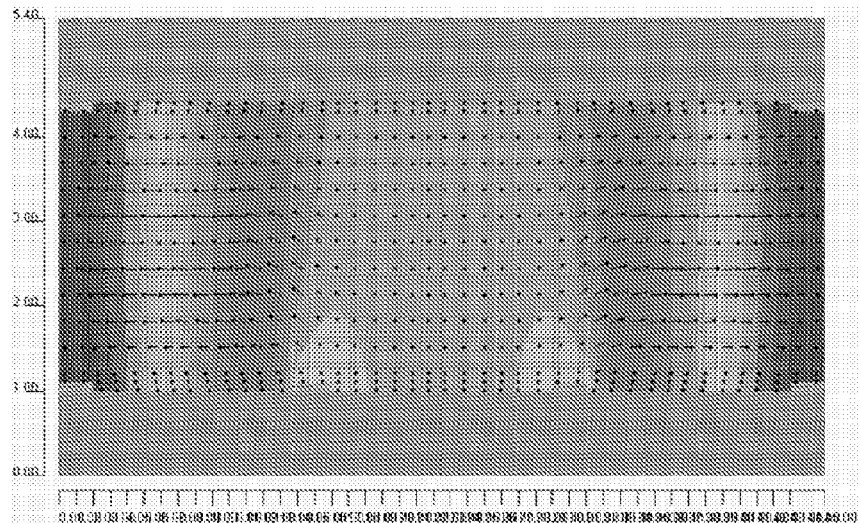
FIG. 37 is a simulation image (cross-sectional image) showing the behavior of liquid crystal molecules when a white voltage (5.5V) is applied in sample A.
Figure 38:
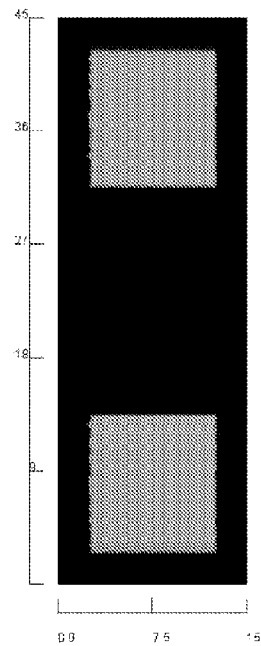
FIG. 38 is a plan view image showing the transmittance of light at a monochromatic gradation in sample A.
Figure 39:
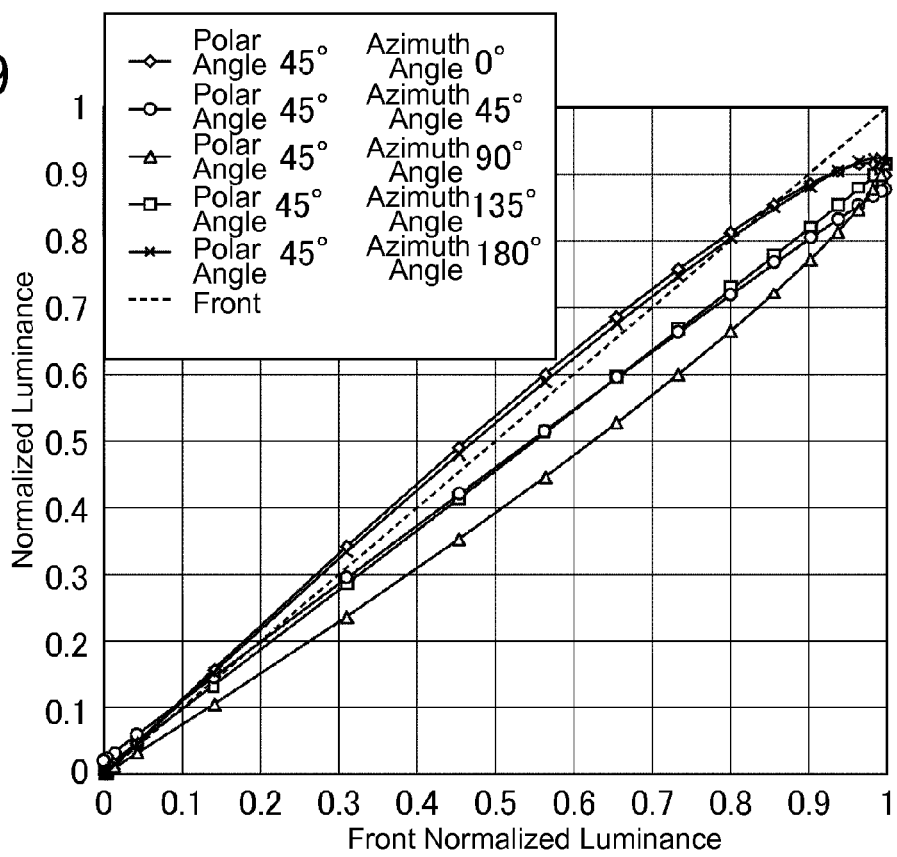
FIG. 39 is a graph showing respective luminances at various azimuth angles when the polar is fixed at 45° with the display surface being the reference surface in sample A.

FIGS. 36 and 37 are simulation images showing the behavior of liquid crystal molecules in sample A when a white voltage is being applied (5.5V); FIG. 36 is a plan view image and FIG. 37 is a cross-sectional image. FIG. 38 is a plan view showing the transmittance of light at a monochromatic gradation, and FIG. 39 is a graph showing respective luminances at various azimuths with the polar angle fixed at 45°, the display surface being the reference surface.

Figure 40:
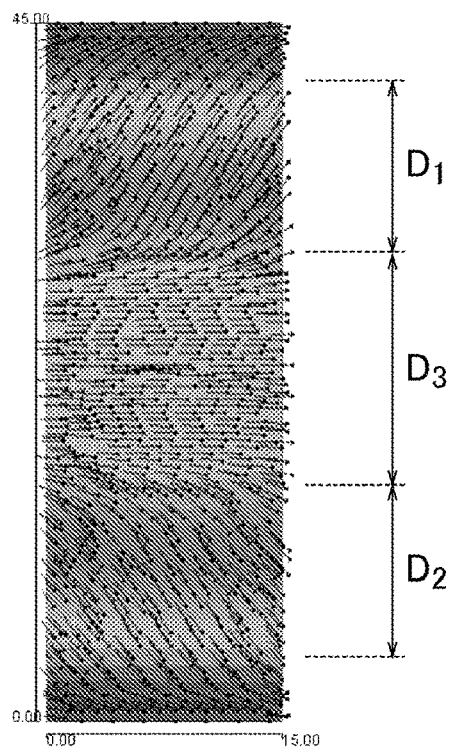
FIG. 40 is a simulation image (plan view image) showing the behavior of liquid crystal molecules when a white voltage (5.7V) is applied in sample B.
Figure 41:
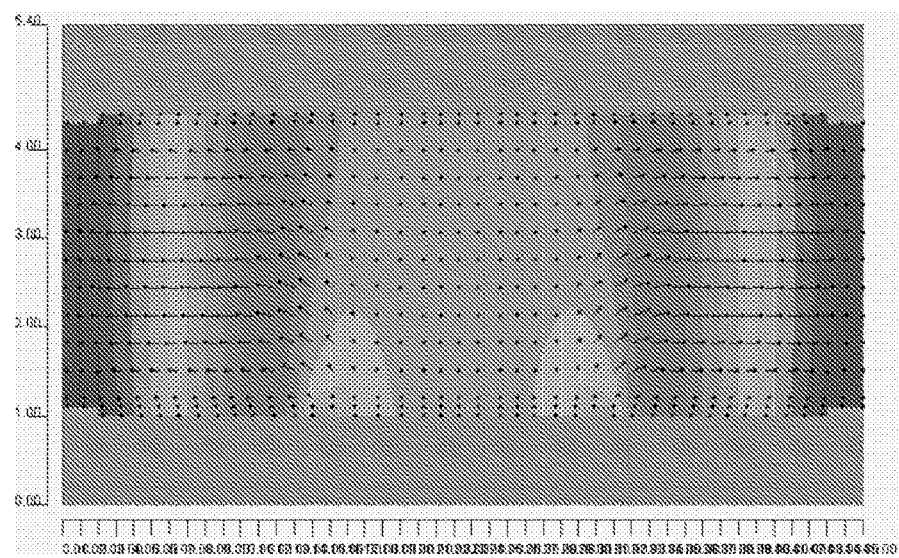
FIG. 41 is a simulation image (cross-sectional image) showing the behavior of liquid crystal molecules when a white voltage (5.7V) is applied in sample B.
Figure 42:
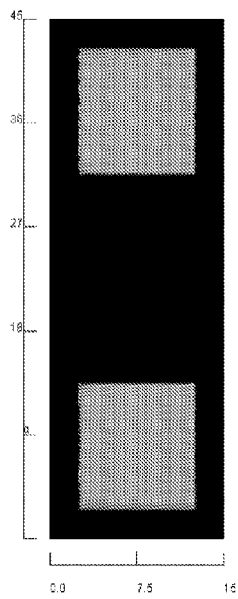
FIG. 42 is a plan view image showing the transmittance of light at a monochromatic gradation in sample B.
Figure 43:
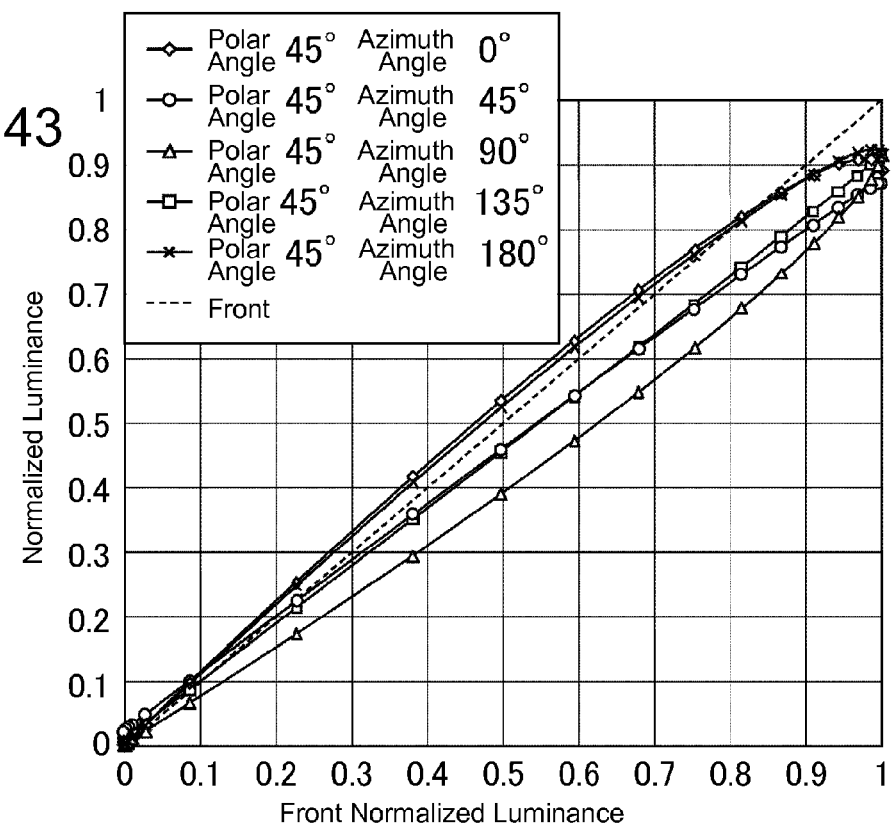
FIG. 43 is a graph showing respective luminances at various azimuth angles when the polar is fixed at 45° with the display surface being the reference surface in sample B.

FIGS. 40 and 41 are simulation images showing the behavior of liquid crystal molecules in sample B when a white voltage is being applied (5.7V); FIG. 40 is a plan view image and FIG. 41 is a cross-sectional image. FIG. 42 is a plan view showing the transmittance of light at a monochromatic gradation, and FIG. 43 is a graph showing respective luminances at various azimuths with the polar angle fixed at 45°, the display surface being the reference surface.

Figure 44:
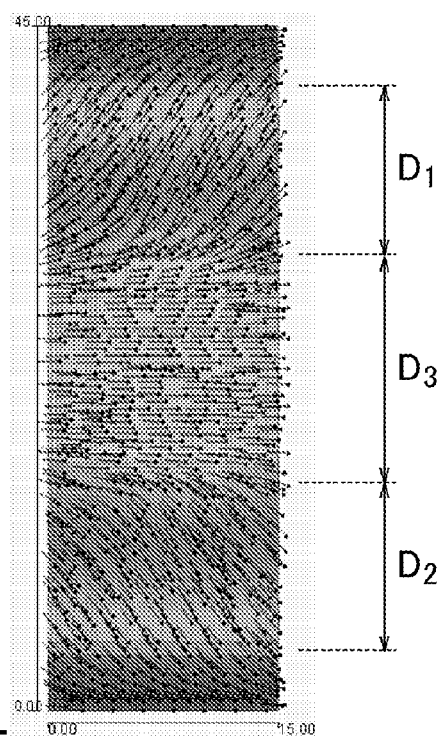
FIG. 44 is a simulation image (plan view image) showing the behavior of liquid crystal molecules when a white voltage (5.9V) is applied in sample C.
Figure 45:
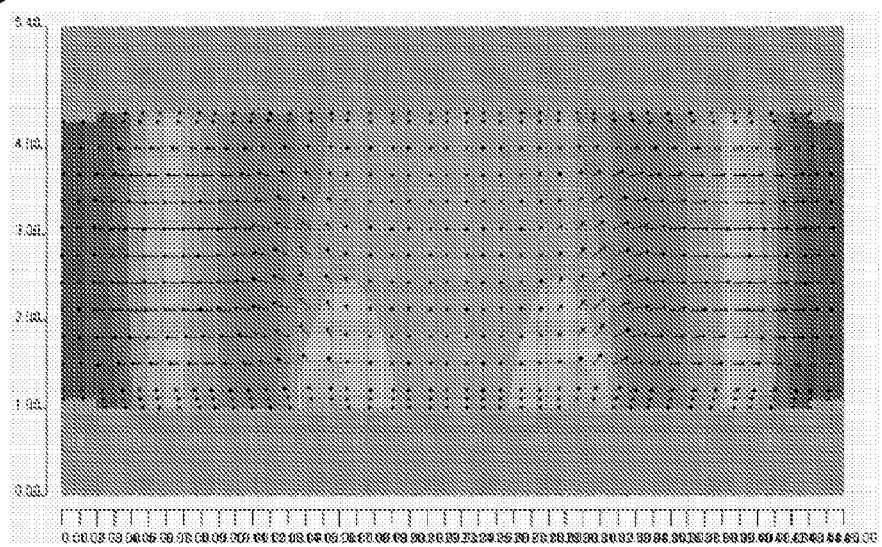
FIG. 45 is a simulation image (cross-sectional image) showing the behavior of liquid crystal molecules when a white voltage (5.9V) is applied in sample C.
Figure 46:
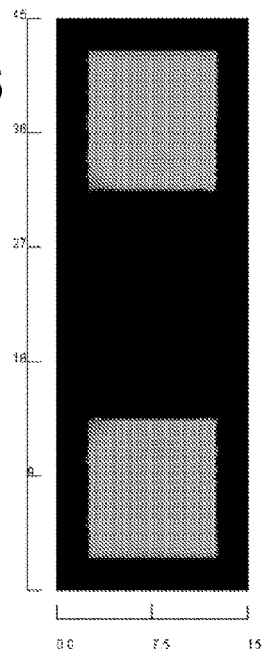
FIG. 46 is a plan view image showing the transmittance of light at a monochromatic gradation in sample C.
Figure 47:
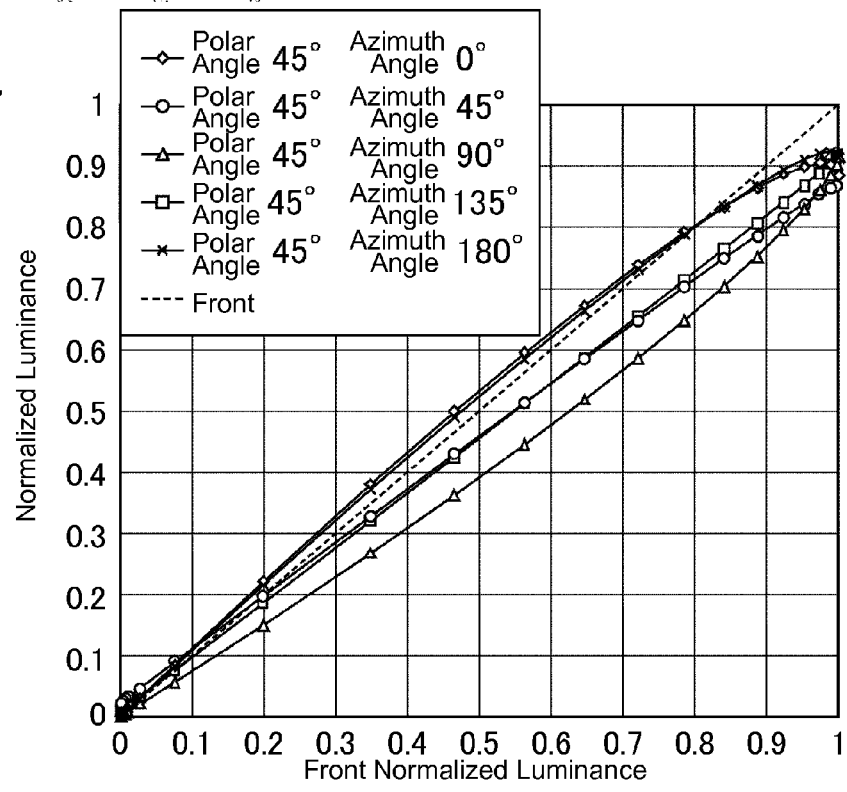
FIG. 47 is a graph showing respective luminances at various azimuth angles when the polar is fixed at 45° with the display surface being the reference surface in sample C.

FIGS. 44 and 45 are simulation images showing the behavior of liquid crystal molecules in sample C when a white voltage is being applied (5.9V); FIG. 44 is a plan view image and FIG. 45 is a cross-sectional image. FIG. 46 is a plan view showing the transmittance of light at a monochromatic gradation, and FIG. 47 is a graph showing respective luminances at various azimuths with the polar angle fixed at 45°, the display surface being the reference surface.

Figure 48:
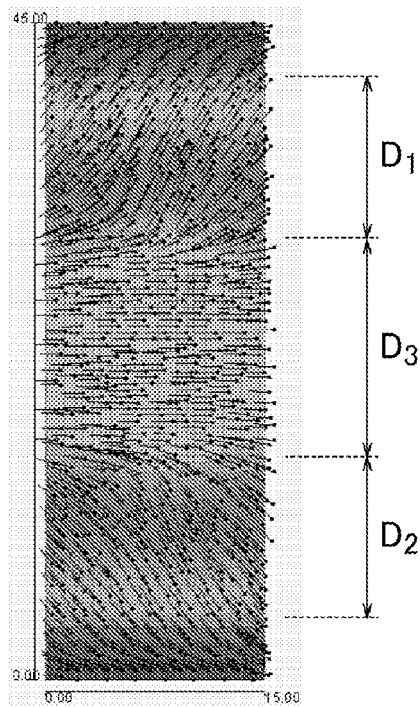
FIG. 48 is a simulation image (plan view image) showing the behavior of liquid crystal molecules when a white voltage (6.2V) is applied in sample D.
Figure 49:
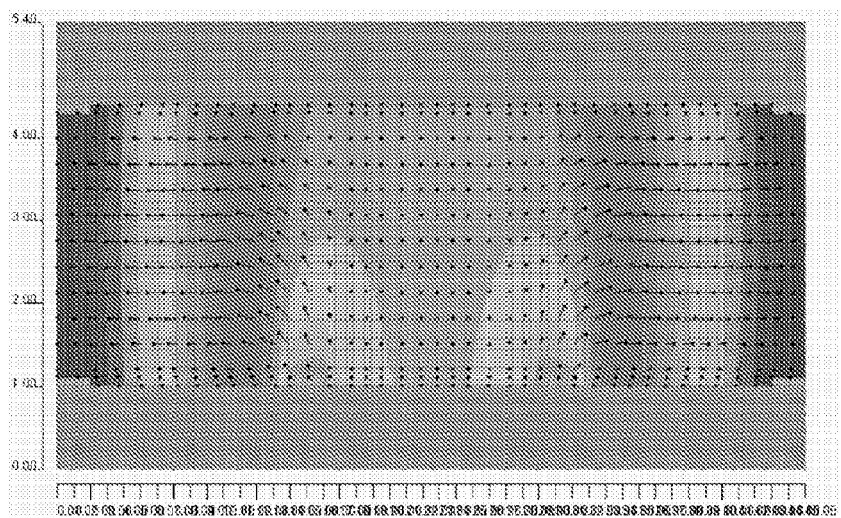
FIG. 49 is a simulation image (cross-sectional image) showing the behavior of liquid crystal molecules when a white voltage (6.2V) is applied in sample D.
Figure 50:
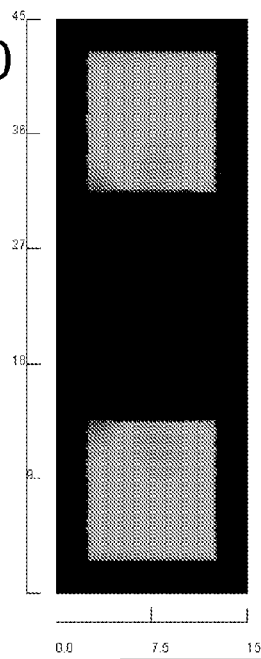
FIG. 50 is a plan view image showing the transmittance of light at a monochromatic gradation in sample D.
Figure 51:
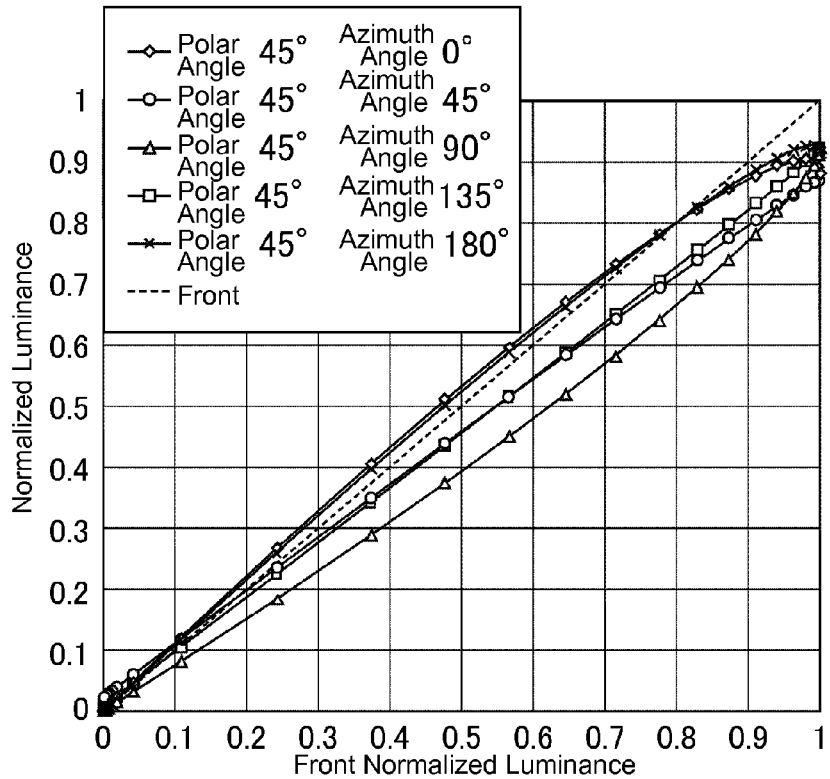
FIG. 51 is a graph showing respective luminances at various azimuth angles when the polar is fixed at 45° with the display surface being the reference surface in sample D.

FIGS. 48 and 49 are simulation images showing the behavior of liquid crystal molecules in sample D when a white voltage is being applied (6.2V); FIG. 48 is a plan view image and FIG. 49 is a cross-sectional image. FIG. 50 is a plan view showing the transmittance of light at a monochromatic gradation, and FIG. 51 is a graph showing respective luminances at various azimuths with the polar angle fixed at 45°, the display surface being the reference surface.

Figure 52:
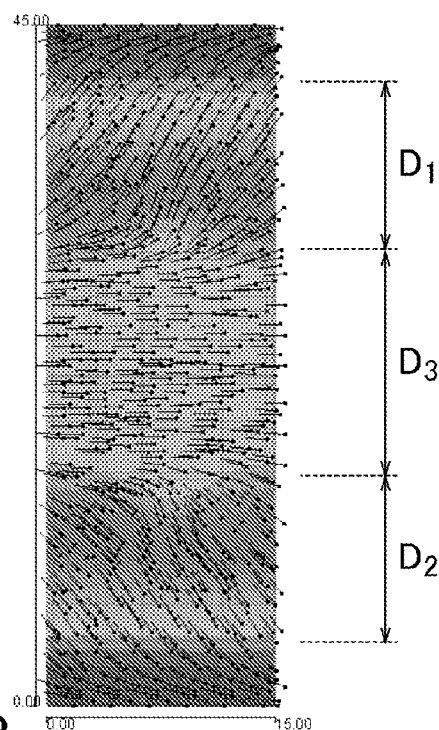
FIG. 52 is a simulation image (plan view image) showing the behavior of liquid crystal molecules when a white voltage (6.7V) is applied in sample E.
Figure 53:
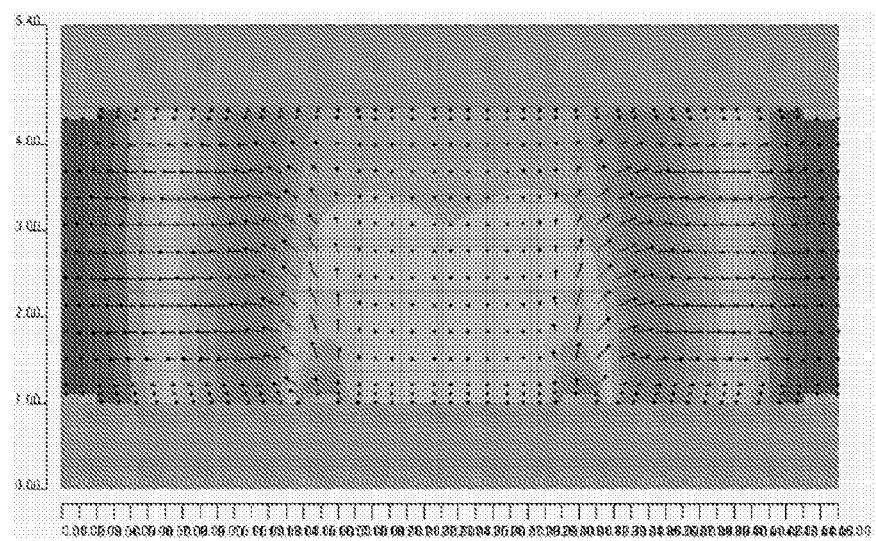
FIG. 53 is a simulation image (cross-sectional image) showing the behavior of liquid crystal molecules when a white voltage (6.7V) is applied in sample E.
Figure 54:
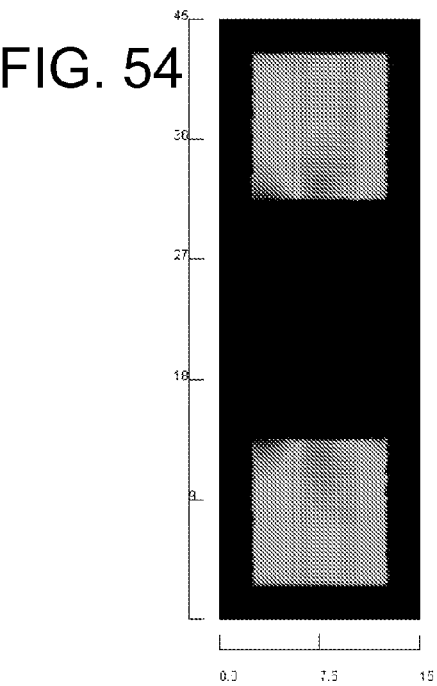
FIG. 54 is a plan view image showing the transmittance of light at a monochromatic gradation in sample E.
Figure 55:
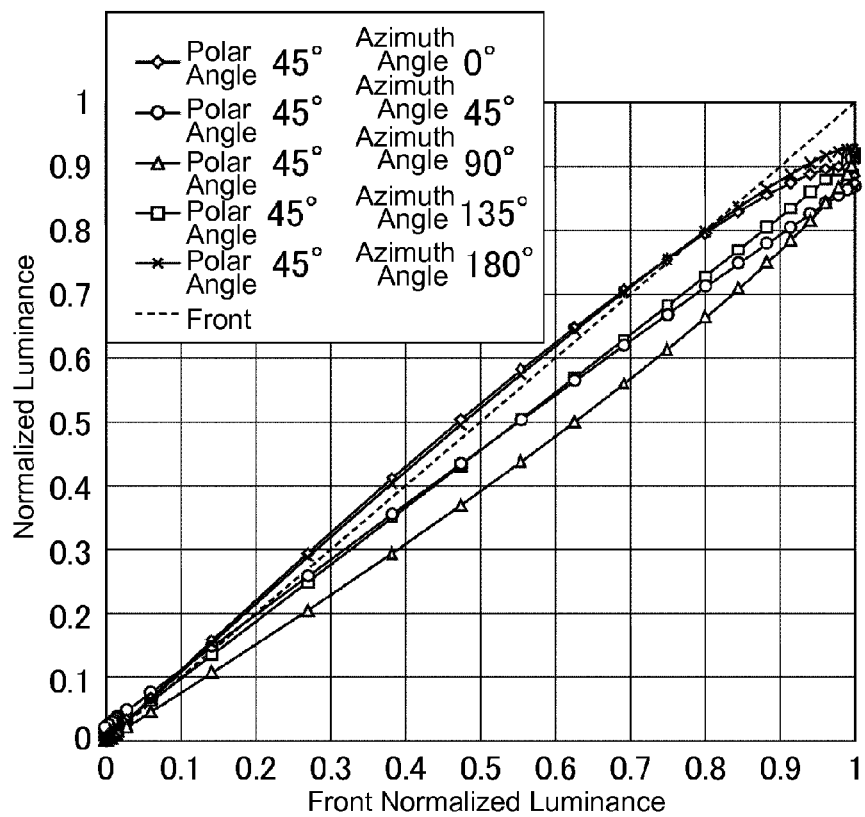
FIG. 55 is a graph showing respective luminances at various azimuth angles when the polar is fixed at 45° with the display surface being the reference surface in sample E.

FIGS. 52 and 53 are simulation images showing the behavior of liquid crystal molecules in sample E when a white voltage is being applied (6.7V); FIG. 52 is a plan view image and FIG. 53 is a cross-sectional image. FIG. 54 is a plan view showing the transmittance of light at a monochromatic gradation, and FIG. 55 is a graph showing respective luminances at various azimuths with the polar angle fixed at 45°, the display surface being the reference surface.

As shown in FIG. 36, in sample A (ref), liquid crystal molecules in the partitioned region D1 and the partitioned region D2 change orientation in a smooth and uniform manner. Also, based on the fact that the boundary between the partitioned region D1 and areas outside and the boundary between the partitioned region D2 and areas outside are clearly visible, it can be seen that the liquid crystal molecules are clearly divided into respective domains. As shown in FIG. 37, the strength of the electric field gradually changes moving from the pixel electrode towards the TFT common electrode, and the boundary between different electric fields is close to perpendicular to the direction normal to the substrate surface. As shown in FIG. 38, light is transmitted uniformly throughout the entire region corresponding to the opening of the black matrix, thereby ensuring high transmittance. As shown in FIG. 39, there is no great variation in luminance depending on the angle, and thus, a substantially uniform image can be displayed no matter the angle from which the display is viewed.

As shown in FIG. 40, in sample B, there appears to be some deviation in the boundary line between the partitioned region D1 and areas outside and the boundary line between the partitioned region D2 and areas outside compared to sample A, but as shown in FIG. 41, in a cross-sectional view, the strength of the electric field changes gradually when moving from the pixel electrode towards the TFT common electrode, and the boundary lines between different electric fields are close to perpendicular to the direction normal to the substrate surface. As shown in FIG. 42, light is transmitted uniformly throughout the entire region corresponding to the opening of the black matrix, thereby ensuring high transmittance. As shown in FIG. 43, there is no great variation in luminance depending on the angle, and thus, a substantially uniform image can be displayed no matter the angle from which the display is viewed.

As shown in FIG. 44, in sample C, there is some deviation in the boundary line between the partitioned region D1 and areas outside and the boundary line between the partitioned region D2 and areas outside compared to samples A and B, and as shown in FIG. 45, in a cross-sectional view, in the vicinity of the boundaries, there are portions of the boundary lines between different electric fields that are not perpendicular to the direction normal to the substrate surface. However, this deviation is only in a very small portion, and the strength of the electric field gradually changes when moving from the pixel electrode towards the TFT common electrode, and the boundary line between the electric field regions is substantially vertical, and thus, it can be concluded that excellent liquid crystal orientation can be achieved. As shown in FIG. 46, there are portions near the corners of the pixel electrodes where the transmittance has dropped, but this has almost no impact on display, and an excellent transmittance can be maintained. As shown in FIG. 47, there is no great variation in luminance depending on the viewing angle, and thus, a substantially uniform image can be displayed no matter the angle from which the display is viewed.

As shown in FIG. 48, in sample D, there is further deviation in the boundary line between the partitioned region D1 and areas outside and the boundary line between the partitioned region D2 and areas outside compared to samples A to C, and as shown in FIG. 49, in a cross-sectional view, in the vicinity of the boundaries, the boundary lines between different electric fields are not perpendicular to the direction normal to the substrate surface, and bulge towards the TFT common electrode. However, in common with samples A to C, the strength of the electric field gradually changes when moving from the pixel electrode towards the TFT common electrode, and no large deviation occurs in the orientation of the liquid crystal. As shown in FIG. 50, while the transmittance drops in the vicinity of the pixel electrode, this is only a portion of the entire opening, and overall, sufficient transmittance can be maintained. As shown in FIG. 51, there is no great variation in luminance depending on the viewing angle, and thus, a substantially uniform image can be displayed no matter the angle from which the display is viewed.

As shown in FIG. 52, in sample E, there is further deviation in the boundary line between the partitioned region D1 and areas outside and the boundary line between the partitioned region D2 and areas outside compared to samples A to D, and as shown in FIG. 53, in a cross-sectional view, in the vicinity of the boundaries, the boundary lines between different electric fields are not perpendicular to the direction normal to the substrate surface, and bulge further towards the TFT common electrode. However, in common with samples A to D, the strength of the electric field gradually changes when moving from the pixel electrode towards the TFT common electrode, and no large deviation occurs in the orientation of the liquid crystal. As shown in FIG. 54, while the transmittance drops in the vicinity of the pixel electrode, and while the area of transmittance drop is larger than in sample C, sufficient transmittance can be maintained overall. As shown in FIG. 55, there is no great variation in luminance depending on the viewing angle, and thus, a substantially uniform image can be displayed no matter the angle from which the display is viewed.

In summary, according to the embodiments of the present invention, regardless of the aspect ratio of the partitioned regions D1 and D2, it is possible to attain sufficient transmittance and viewing angle characteristics, but it is preferable that the aspect ratio be close to 1. Specifically, it is preferable that the aspect ratio be 1/5 or greater, more preferable that the aspect ratio be 1/3 or greater, even more preferable that the aspect ratio be 7/15 or greater, and most preferable that the aspect ratio be 3/5 or greater. According to the results of the study, it is further preferable that the aspect ratio be 11/15 or greater from the perspective of mitigating disarrayed liquid crystal orientation, but as long as the aspect ratio is 3/5 or greater, sufficient transmittance can be attained without much difference, and viewing angle characteristics are excellent regardless of aspect ratio.

Evaluation Test 2

Below, test results for transmittance and viewing angle characteristics in a plan view at respective aspect ratios in the regions D1 and D2 between the independent pairs of linear electrodes (more specifically, pixel electrodes and TFT common electrodes) will be described. In Evaluation Test 2, four samples were prepared: sample F where the aspect ratio is 11:11 (=1:1), sample G where the aspect ratio is 9:11, sample H where the aspect ratio is 7:11, and sample I where the aspect ratio is 5:11. The adjustment in aspect ratio was conducted by adjusting the lengths of the TFT common electrode (first linear electrode) and the opposite common electrode (third linear electrode). The size of each pixel is the same for all of samples F to I, the width being 15 μm, the height being 45 μm. The size of each TFT is the same for all of samples F to I. The same liquid crystal material is used for all of samples F to I.

In all of the samples F to I, the width of the pixel electrode (second linear electrode) was set at 2 μm with the length being 11 μm. The opposite common electrode is located in an area overlapping the TFT common electrode. The lengths of the TFT common electrode and the opposite common electrode are both 11 μm in sample F, both 9 μm in sample G, both 7 μm in sample H, and both 5 μm in sample I.

In all of samples F to I, the shape of the openings of the black matrix is square with one side being 10 μm.

The sample F (Ref) is identical to sample A in Evaluation Test 1 and descriptions thereof are omitted.

Figure 56:
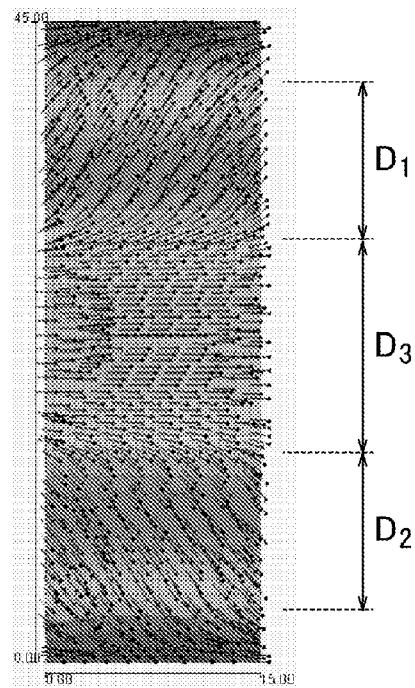
FIG. 56 is a simulation image (plan view image) showing the behavior of liquid crystal molecules when a white voltage (5.7V) is applied in sample G.
Figure 57:
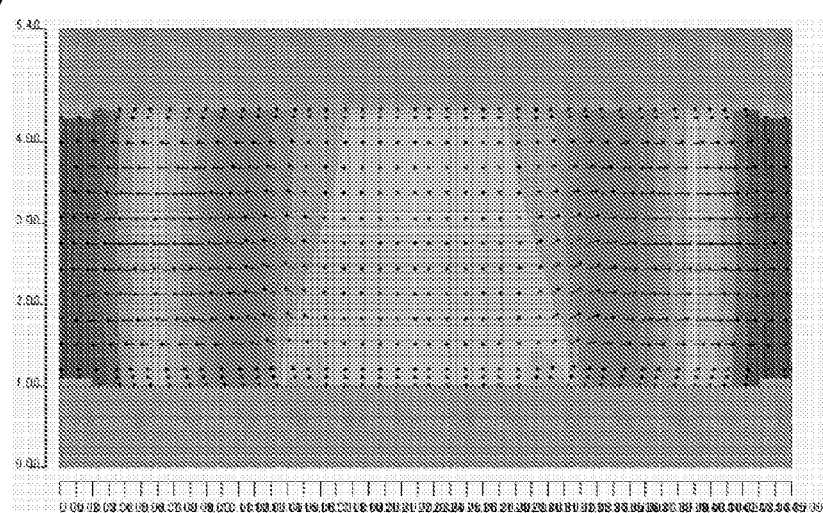
FIG. 57 is a simulation image (cross-sectional image) showing the behavior of liquid crystal molecules when a white voltage (5.7V) is applied in sample G.
Figure 58:
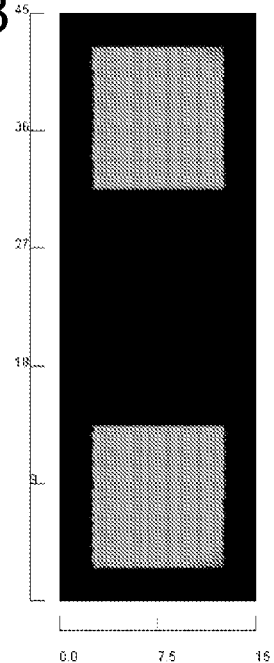
FIG. 58 is a plan view image showing the transmittance of light at a monochromatic gradation in sample G.
Figure 59:
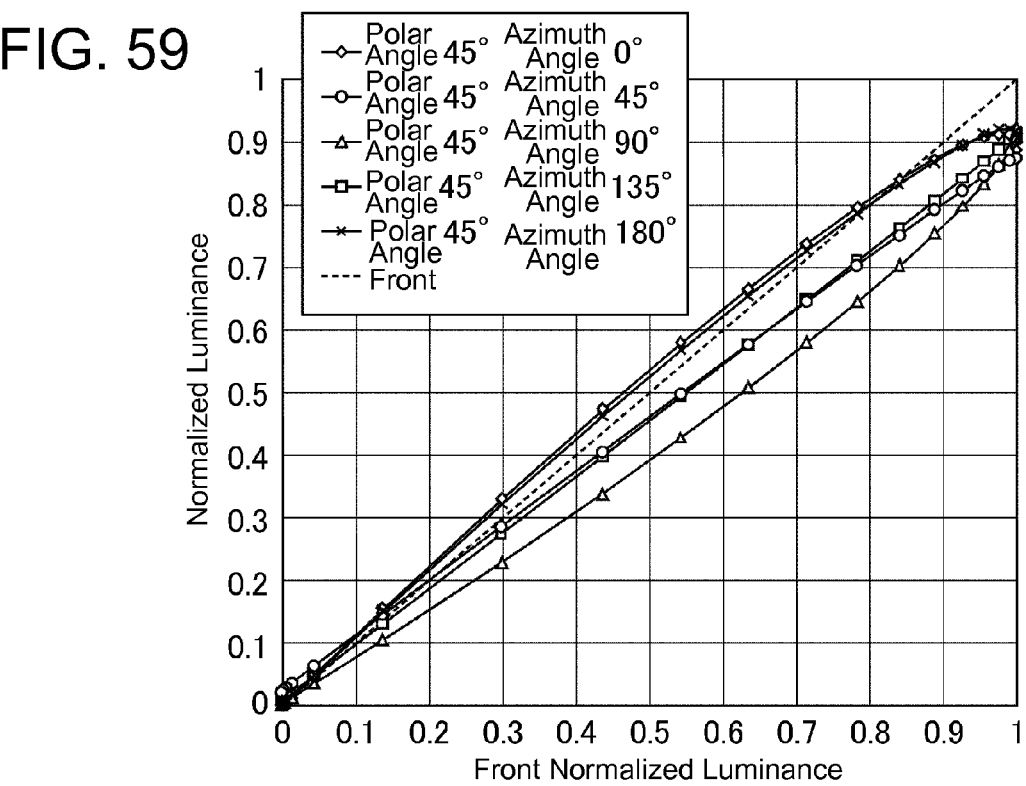
FIG. 59 is a graph showing respective luminances at various azimuth angles when the polar is fixed at 45° with the display surface being the reference surface in sample G.

FIGS. 56 and 57 are simulation images showing the behavior of liquid crystal molecules in sample G when a white voltage is being applied (5.7V); FIG. 56 is a plan view image and FIG. 57 is a cross-sectional image. FIG. 58 is a plan view showing the transmittance of light at a monochromatic gradation, and FIG. 59 is a graph showing respective luminances at various azimuths with the polar angle fixed at 45°, the display surface being the reference surface.

As shown in FIG. 56, in sample G, there appears to be some deviation in the boundary line between the partitioned region D1 and areas outside and the boundary line between the partitioned region D2 and areas outside compared to sample F, but as shown in FIG. 57, in a cross-sectional view, the strength of the electric field changes gradually when moving from the pixel electrode towards the TFT common electrode, and the boundary lines between different electric fields are close to perpendicular to the direction normal to the substrate surface. As shown in FIG. 58, light is transmitted uniformly throughout the entire region corresponding to the opening of the black matrix, thereby ensuring high transmittance. As shown in FIG. 59, there is no great variation in luminance depending on the viewing angle, and thus, a substantially uniform image can be displayed no matter the angle from which the display is viewed.

Figure 60:
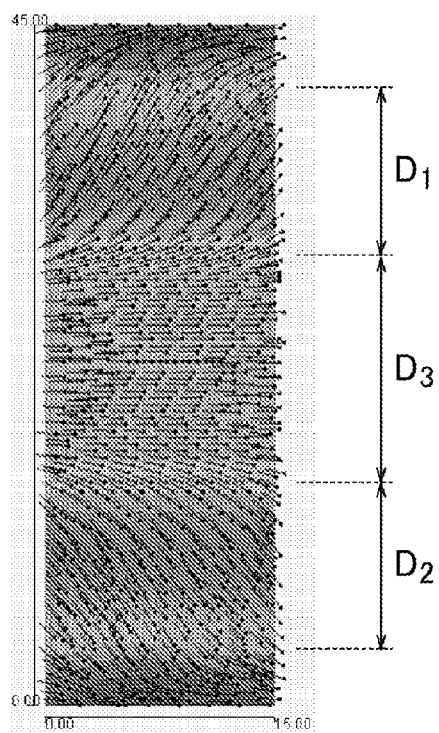
FIG. 60 is a simulation image (plan view image) showing the behavior of liquid crystal molecules when a white voltage (5.8V) is applied in sample H.
Figure 61:
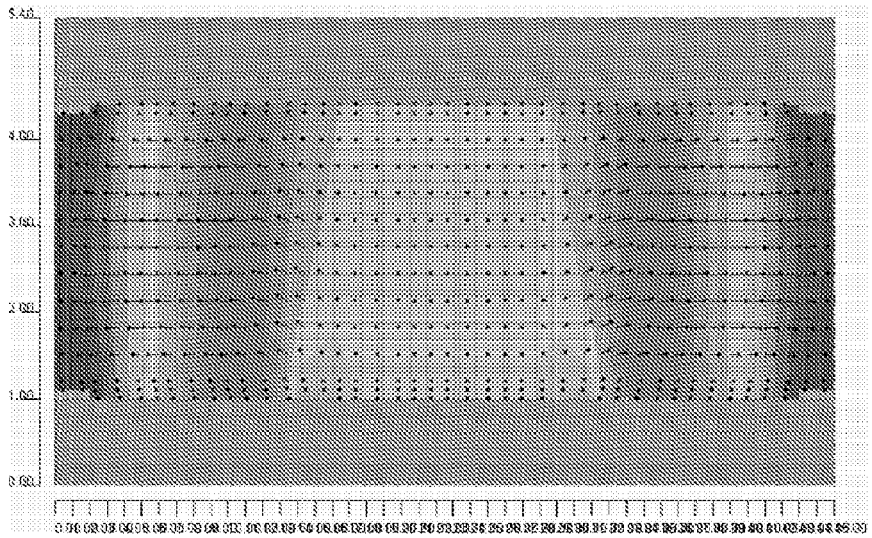
FIG. 61 is a simulation image (cross-sectional image) showing the behavior of liquid crystal molecules when a white voltage (5.8V) is applied in sample H.
Figure 62:
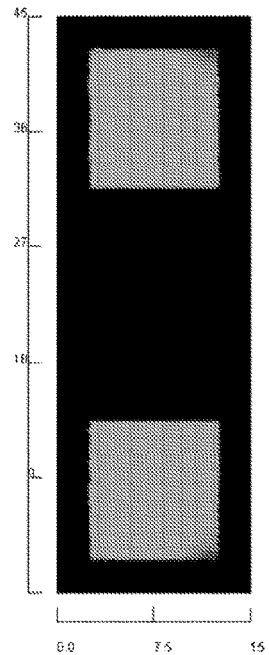
FIG. 62 is a plan view image showing the transmittance of light at a monochromatic gradation in sample H.
Figure 63:
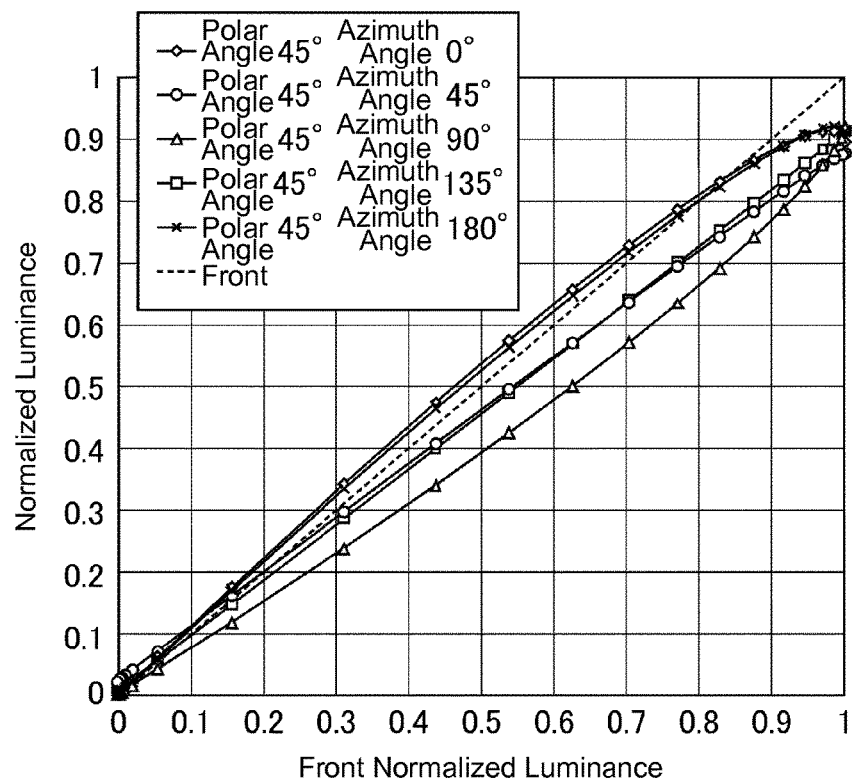
FIG. 63 is a graph showing respective luminances at various azimuth angles when the polar is fixed at 45° with the display surface being the reference surface in sample H.

FIGS. 60 and 61 are simulation images showing the behavior of liquid crystal molecules in sample H when a white voltage is being applied (5.8V); FIG. 60 is a plan view image and FIG. 61 is a cross-sectional image. FIG. 62 is a plan view showing the transmittance of light at a monochromatic gradation, and FIG. 63 is a graph showing respective luminances at various azimuths with the polar angle fixed at 45°, the display surface being the reference surface.

As shown in FIG. 60, in sample H, there is some deviation in the boundary line between the partitioned region D1 and areas outside and the boundary line between the partitioned region D2 and areas outside compared to sample F, and as shown in FIG. 61, in a cross-sectional view, in the vicinity of the boundaries, there are portions of the boundary lines between different electric fields that are not perpendicular to the direction normal to the substrate surface. However, this deviation is only in a very small portion, and the strength of the electric field gradually changes when moving from the pixel electrode towards the TFT common electrode, and the boundary line between the electric field regions is substantially vertical, and thus, it can be concluded that excellent liquid crystal orientation can be achieved. As shown in FIG. 62, there are portions near the corners of the TFT common electrodes where the transmittance has dropped, but this has almost no impact on display, and an excellent transmittance can be maintained. As shown in FIG. 63, there is no great variation in luminance depending on the viewing angle, and thus, a substantially uniform image can be displayed no matter the angle from which the display is viewed.

Figure 64:
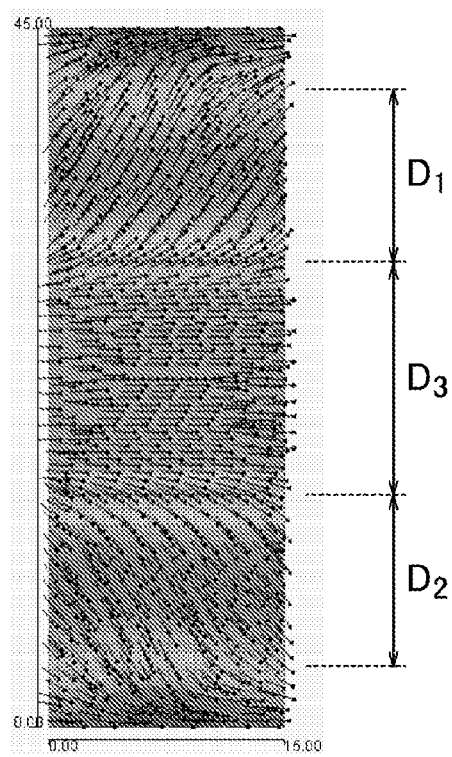
FIG. 64 is a simulation image (plan view image) showing the behavior of liquid crystal molecules when a white voltage (6.1V) is applied in sample I.
Figure 65:
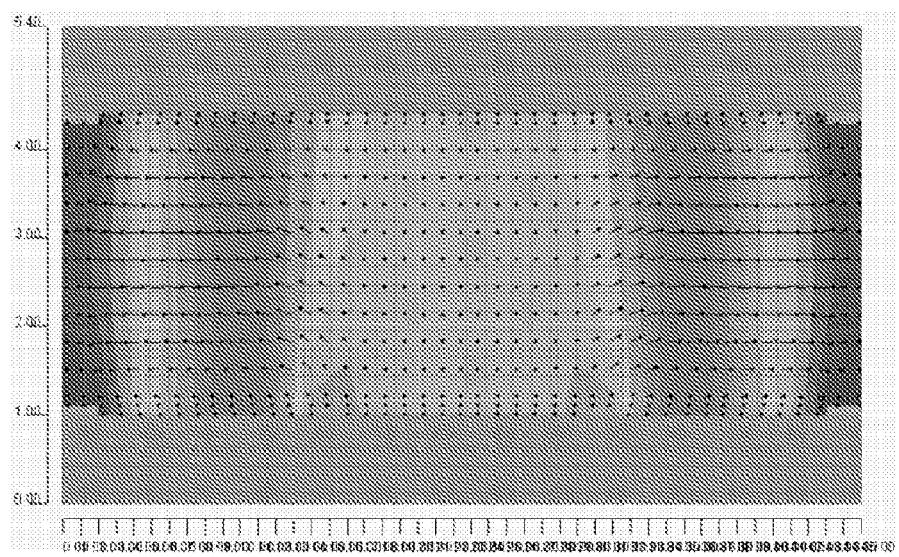
FIG. 65 is a simulation image (cross-sectional image) showing the behavior of liquid crystal molecules when a white voltage (6.1V) is applied in sample I.
Figure 66:
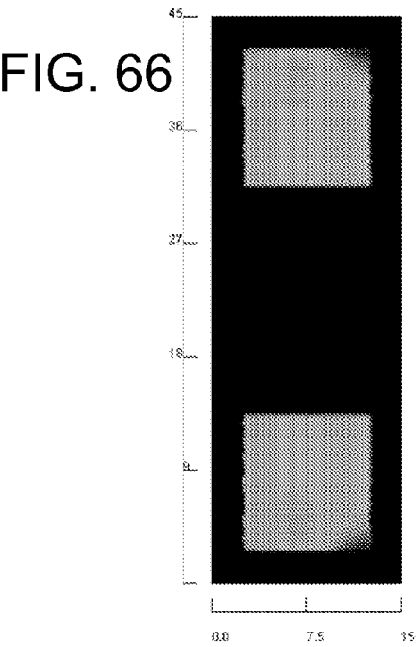
FIG. 66 is a plan view image showing the transmittance of light at a monochromatic gradation in sample I.
Figure 67:
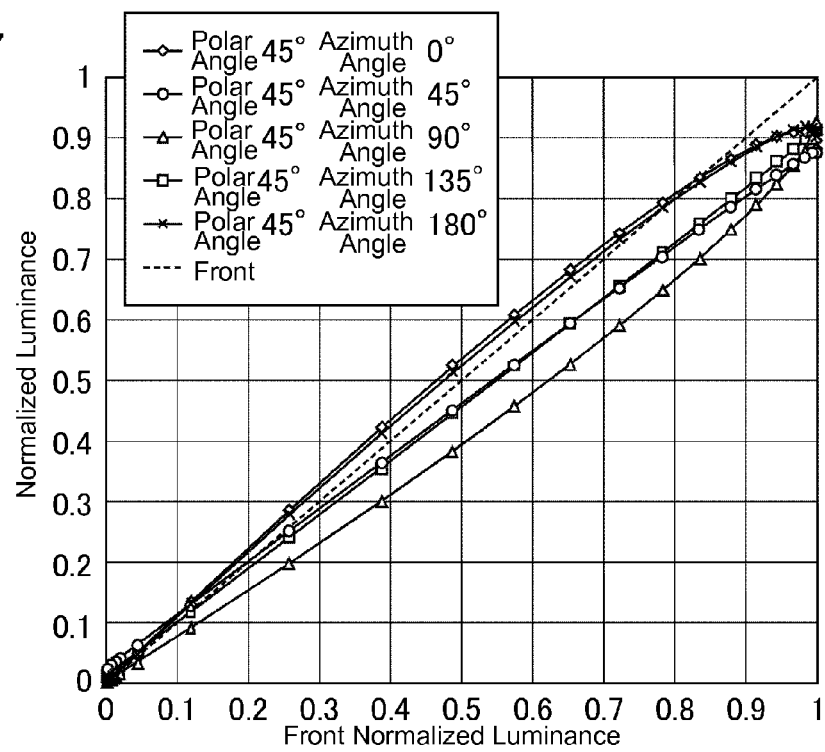
FIG. 67 is a graph showing respective luminances at various azimuth angles when the polar is fixed at 45° with the display surface being the reference surface in sample I.

FIGS. 64 and 65 are simulation images showing the behavior of liquid crystal molecules in sample I when a white voltage is being applied (6.1V); FIG. 64 is a plan view image and FIG. 65 is a cross-sectional image. FIG. 66 is a plan view showing the transmittance of light at a monochromatic gradation, and FIG. 67 is a graph showing respective luminances at various azimuths with the polar angle fixed at 45°, the display surface being the reference surface.

As shown in FIG. 64, in sample I, there is further deviation in the boundary line between the partitioned region D1 and areas outside and the boundary line between the partitioned region D2 and areas outside compared to samples F to H, and as shown in FIG. 65, in a cross-sectional view, in the vicinity of the boundaries, the boundary lines between different electric fields are not perpendicular to the direction normal to the substrate surface, and bulge towards the TFT common electrode. However, in common with samples F to H, the strength of the electric field gradually changes when moving from the pixel electrode towards the TFT common electrode, and no large deviation occurs in the orientation of the liquid crystal. As shown in FIG. 66, while the transmittance drops in the vicinity of the pixel electrode, this is only a portion of the entire opening, and overall, sufficient transmittance can be maintained. As shown in FIG. 67, there is no great variation in luminance depending on the viewing angle, and thus, a substantially uniform image can be displayed no matter the angle from which the display is viewed.

Thus, even if the aspect ratio were adjusted by adjusting the length of not the pixel electrode but the TFT common electrode and the opposite common electrode, similar results can be attained to when the length of the pixel electrode was adjusted, and the same conclusion can be made as Evaluation Test 1 for the relation between the aspect ratio, and the transmittance and viewing angle characteristics.

Evaluation Test 3

Below, test results for transmittance and viewing angle characteristics in a plan view at respective aspect ratios in the regions D1 and D2 between the independent pairs of linear electrodes (more specifically, pixel electrodes and TFT common electrodes) will be described. In Evaluation Test 3, five samples were prepared: sample J where the aspect ratio is 11:11 (=1:1), sample K where the aspect ratio is 9:11, sample L where the aspect ratio is 7:11, sample M where the aspect ratio is 5:11, and sample N where the aspect ratio is 3:11. The adjustment of the aspect ratio was made by adjusting the length in a plan view of the pixel electrode (second linear electrode), the TFT common electrode (first linear electrode), and the opposite common electrode (third linear electrode) simultaneously. The size of each pixel is the same for all of samples J to N, the width being 15 µm, the height being 45 µm. The size of each TFT is the same for all of samples J to N. The same liquid crystal material is used for all of samples J to N.

For all of the samples J to N, the pixel electrodes, the TFT common electrodes, and the opposite common electrodes have a width of 2 µm. The opposite common electrode is located in an area overlapping the TFT common electrode. The lengths of the pixel electrode, the TFT common electrode, and the opposite common electrode are all 11 µm in sample J, all 9 µm in sample K, all 7 µm in sample L, all 5 µm in sample M, and all 3 µm in sample N.

In all of samples J to N, the shape of the openings of the black matrix is square with one side being 10 µm.

The sample J (Ref) is identical to sample A in Evaluation Test 1 and descriptions thereof are omitted.

Figure 68:
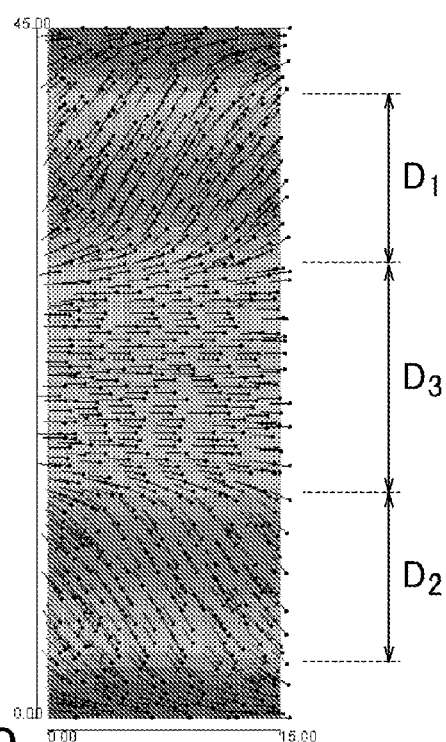
FIG. 68 is a simulation image (plan view image) showing the behavior of liquid crystal molecules when a white voltage (5.9V) is applied in sample K.
Figure 69:
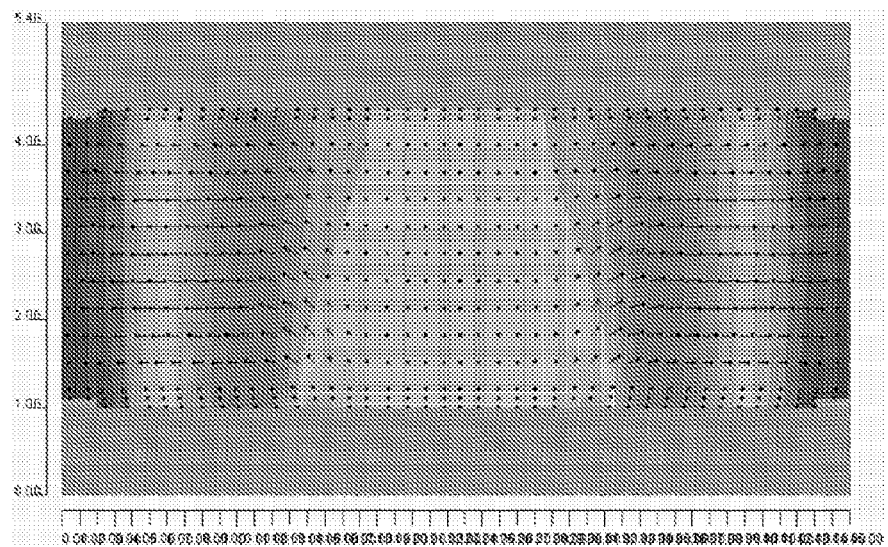
FIG. 69 is a simulation image (cross-sectional image) showing the behavior of liquid crystal molecules when a white voltage (5.9V) is applied in sample K.
Figure 70:
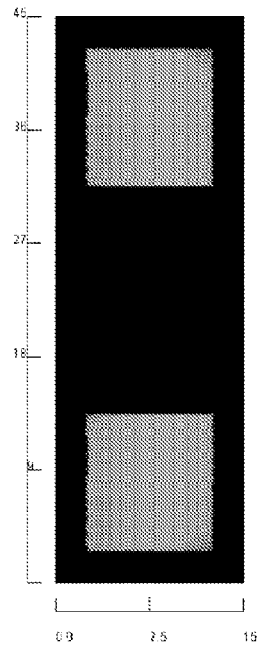
FIG. 70 is a plan view image showing the transmittance of light at a monochromatic gradation in sample K.
Figure 71:
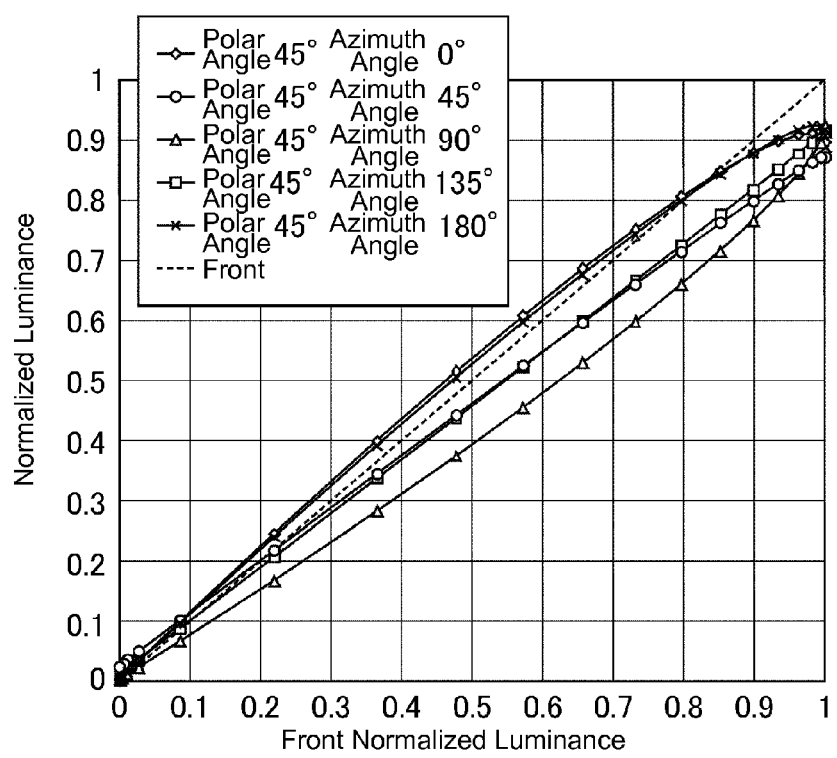
FIG. 71 is a graph showing respective luminances at various azimuth angles when the polar is fixed at 45° with the display surface being the reference surface in sample K.

FIGS. 68 and 69 are simulation images showing the behavior of liquid crystal molecules in sample K when a white voltage is being applied (5.9V); FIG. 68 is a plan view image and FIG. 69 is a cross-sectional image. FIG. 70 is a plan view showing the transmittance of light at a monochromatic gradation, and FIG. 71 is a graph showing respective luminances at various azimuths with the polar angle fixed at 45°, the display surface being the reference surface.

Figure 72:
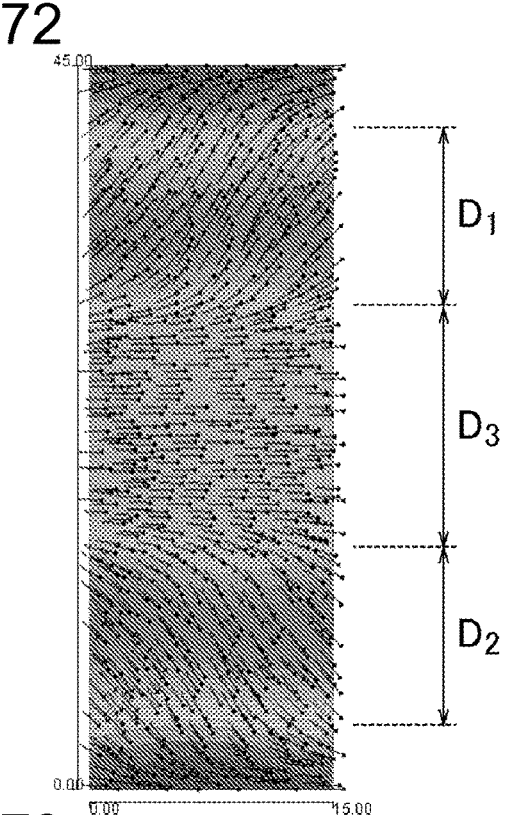
FIG. 72 is a simulation image (plan view image) showing the behavior of liquid crystal molecules when a white voltage (6.2V) is applied in sample L.
Figure 73:
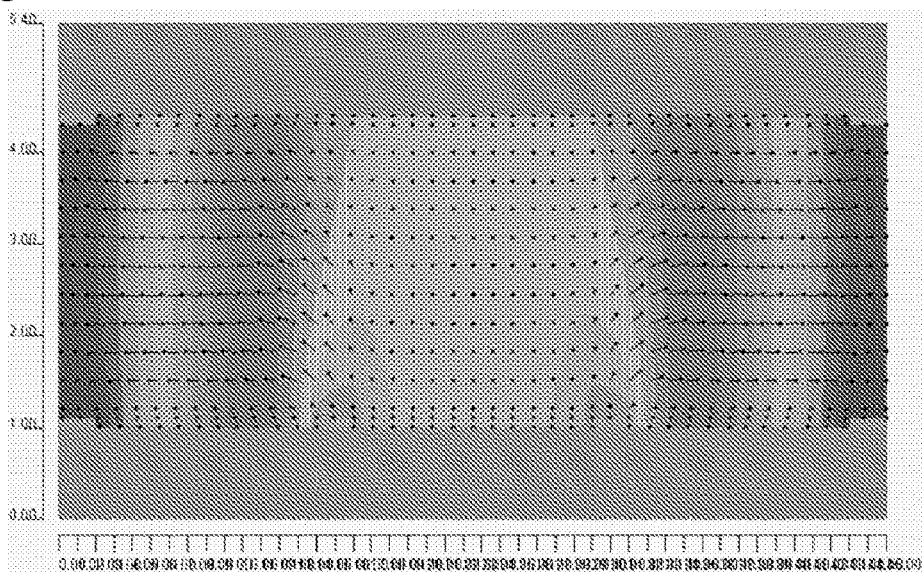
FIG. 73 is a simulation image (cross-sectional image) showing the behavior of liquid crystal molecules when a white voltage (6.2V) is applied in sample L.
Figure 74:
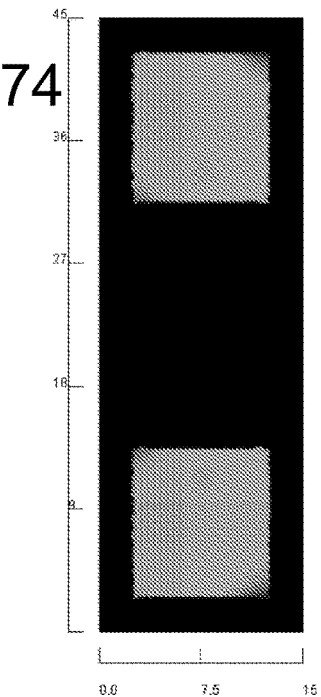
FIG. 74 is a plan view image showing the transmittance of light at a monochromatic gradation in sample L.
Figure 75:
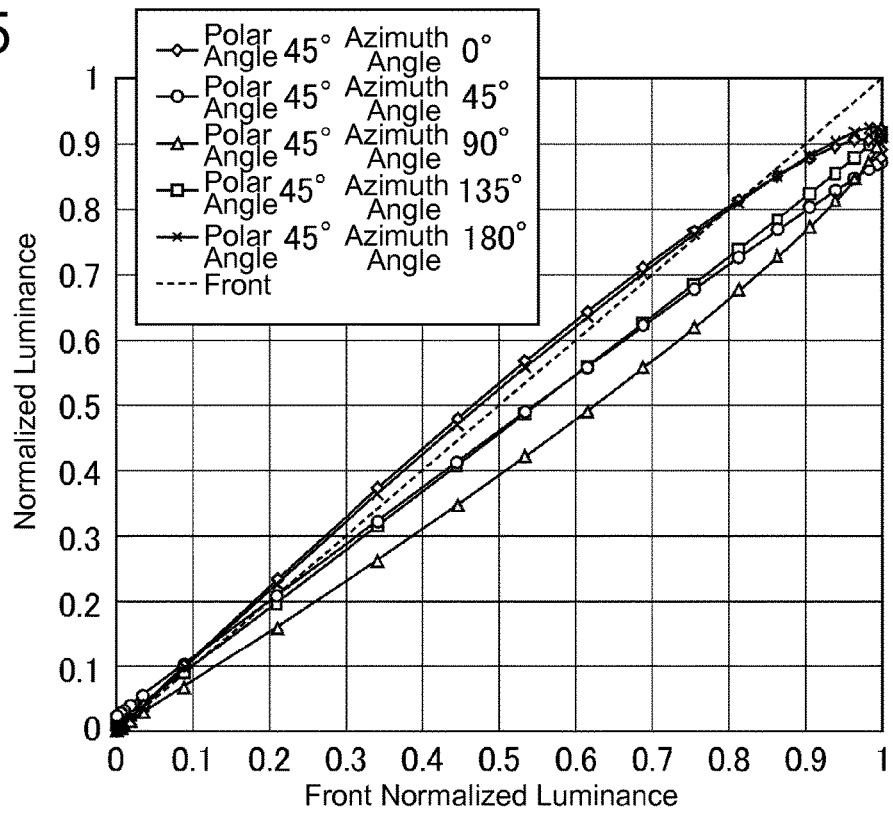
FIG. 75 is a graph showing respective luminances at various azimuth angles when the polar is fixed at 45° with the display surface being the reference surface in sample L.

FIGS. 72 and 73 are simulation images showing the behavior of liquid crystal molecules in sample L when a white voltage is being applied (6.2V); FIG. 72 is a plan view image and FIG. 73 is a cross-sectional image. FIG. 74 is a plan view showing the transmittance of light at a monochromatic gradation, and FIG. 75 is a graph showing respective luminances at various azimuths with the polar angle fixed at 45°, the display surface being the reference surface.

Figure 76:
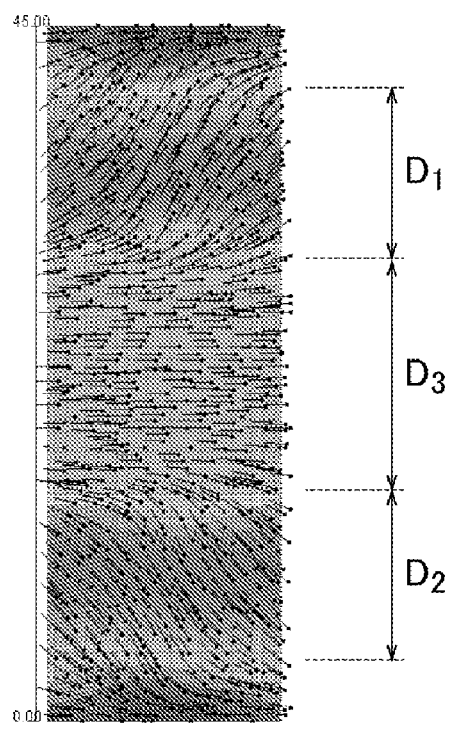
FIG. 76 is a simulation image (plan view image) showing the behavior of liquid crystal molecules when a white voltage (6.6V) is applied in sample M.
Figure 77:
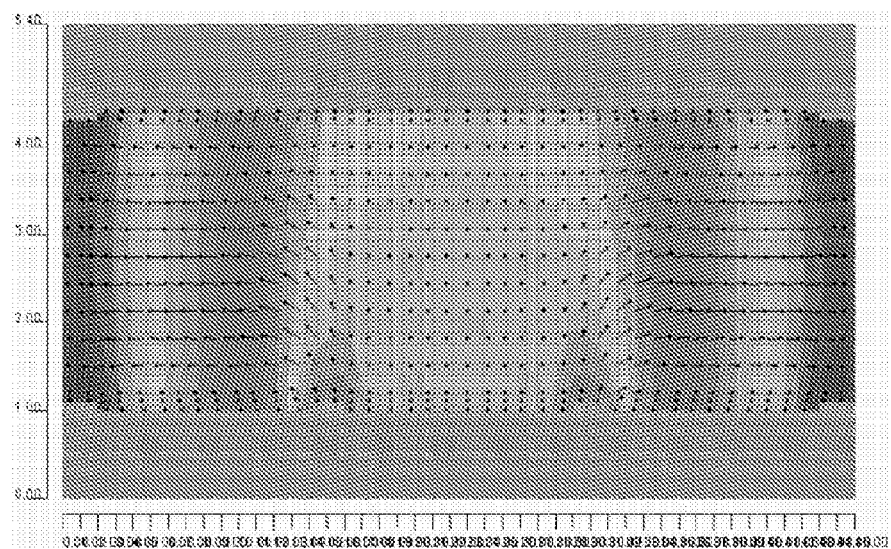
FIG. 77 is a simulation image (cross-sectional image) showing the behavior of liquid crystal molecules when a white voltage (6.6V) is applied in sample M.
Figure 78:
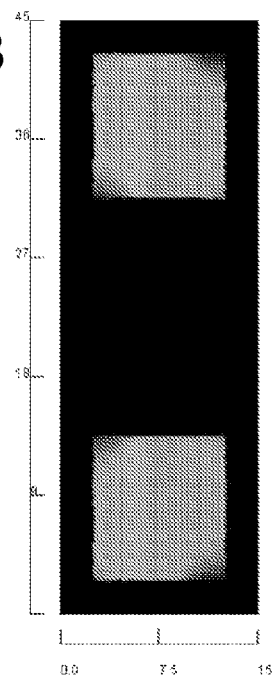
FIG. 78 is a plan view image showing the transmittance of light at a monochromatic gradation in sample M.
Figure 79:
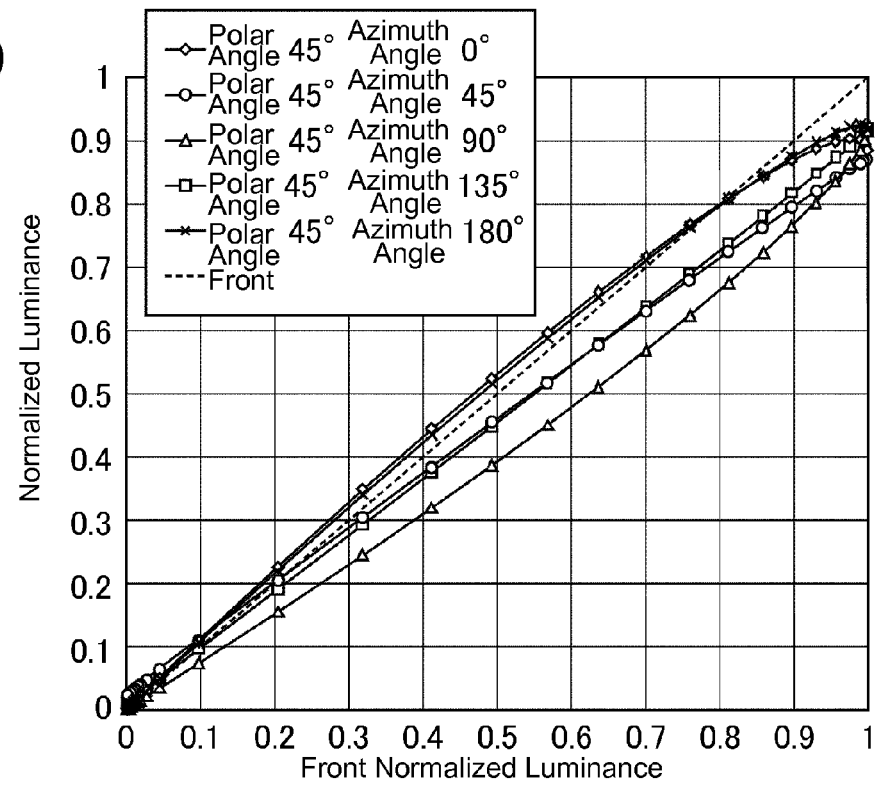
FIG. 79 is a graph showing respective luminances at various azimuth angles when the polar is fixed at 45° with the display surface being the reference surface in sample M.

FIGS. 76 and 77 are simulation images showing the behavior of liquid crystal molecules in sample M when a white voltage is being applied (6.6V); FIG. 76 is a plan view image and FIG. 77 is a cross-sectional image. FIG. 78 is a plan view showing the transmittance of light at a monochromatic gradation, and FIG. 79 is a graph showing respective luminances at various azimuths with the polar angle fixed at 45°, the display surface being the reference surface.

Figure 80:
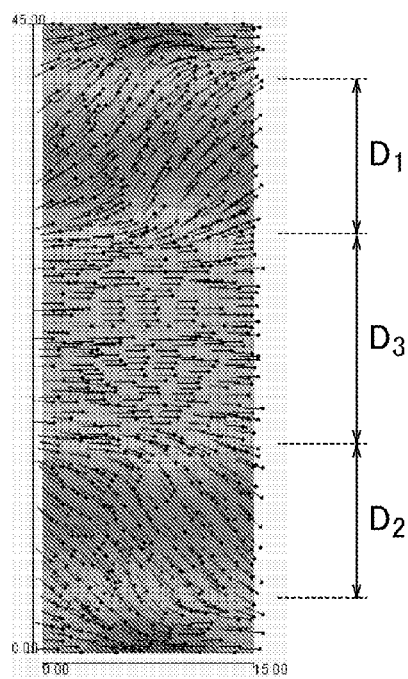
FIG. 80 is a simulation image (plan view image) showing the behavior of liquid crystal molecules when a white voltage (7.0V) is applied in sample N.
Figure 81:
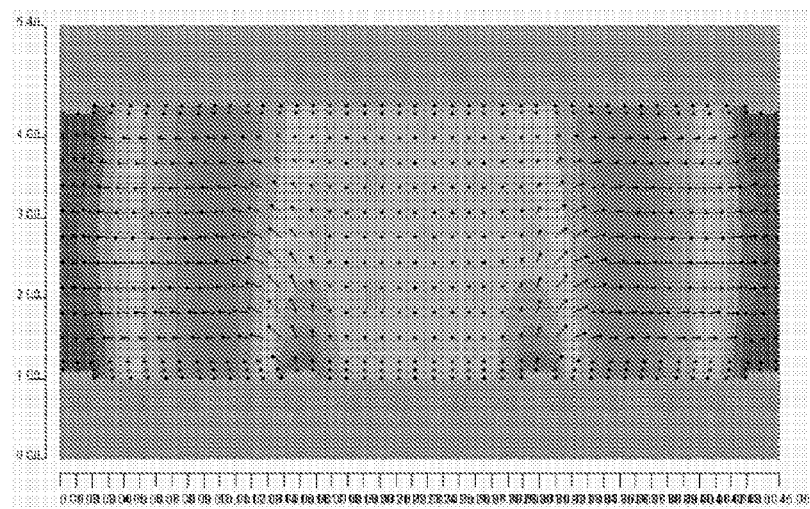
FIG. 81 is a simulation image (cross-sectional image) showing the behavior of liquid crystal molecules when a white voltage (7.0V) is applied in sample N.
Figure 82:
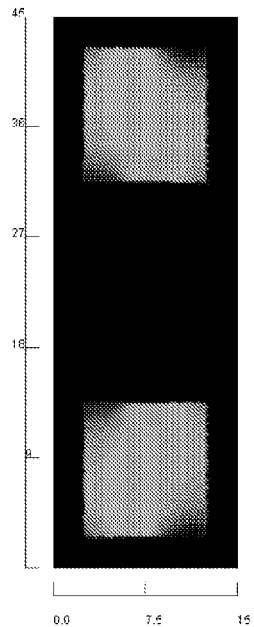
FIG. 82 is a plan view image showing the transmittance of light at a monochromatic gradation in sample N.
Figure 83:
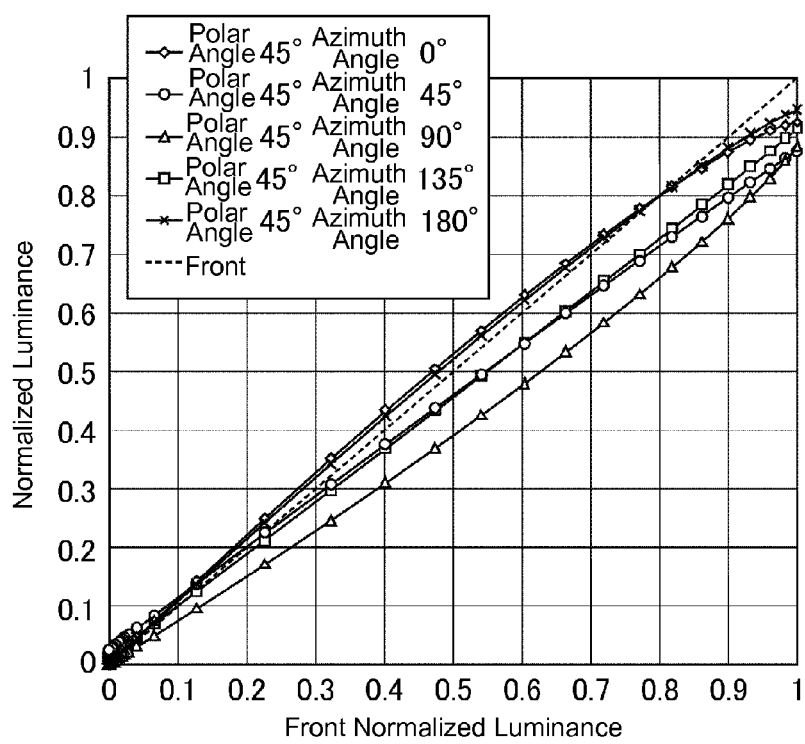
FIG. 83 is a graph showing respective luminances at various azimuth angles when the polar is fixed at 45° with the display surface being the reference surface in sample N.

FIGS. 80 and 81 are simulation images showing the behavior of liquid crystal molecules in sample N when a white voltage is being applied (7.0V); FIG. 80 is a plan view image and FIG. 81 is a cross-sectional image. FIG. 82 is a plan view showing the transmittance of light at a monochromatic gradation, and FIG. 83 is a graph showing respective luminances at various azimuths with the polar angle fixed at 45°, the display surface being the reference surface.

As shown in FIG. 68, in sample K, there appears to be some deviation in the boundary line between the partitioned region D1 and areas outside and the boundary line between the partitioned region D2 and areas outside compared to sample J, but as shown in FIG. 69, in a cross-sectional view, the strength of the electric field changes gradually when moving from the pixel electrode towards the TFT common electrode, and the boundary lines between different electric fields are close to perpendicular to the direction normal to the substrate surface. As shown in FIG. 70, light is transmitted uniformly throughout the entire region corresponding to the opening of the black matrix, thereby ensuring high transmittance. As shown in FIG. 71, there is no great variation in luminance depending on the viewing angle, and thus, a substantially uniform image can be displayed no matter the angle from which the display is viewed.

As shown in FIG. 72, in sample L, there is some deviation in the boundary line between the partitioned region D1 and areas outside and the boundary line between the partitioned region D2 and areas outside compared to sample K, and as shown in FIG. 73, in a cross-sectional view, in the vicinity of the boundaries, there are portions of the boundary lines between different electric fields that are not perpendicular to the direction normal to the substrate surface. However, this deviation is only in a very small portion, and the strength of the electric field gradually changes when moving from the pixel electrode towards the TFT common electrode, and the boundary line between the electric field regions is substantially vertical, and thus, it can be concluded that excellent liquid crystal orientation can be achieved. As shown in FIG. 74, there are portions near the corners of the pixel electrodes and portions near the corners of the TFT common electrodes where the transmittance has dropped, but this has almost no impact on display, and an excellent transmittance can be maintained. As shown in FIG. 75, there is no great variation in luminance depending on the viewing angle, and thus, a substantially uniform image can be displayed no matter the angle from which the display is viewed.

As shown in FIG. 76, in sample M, there is further deviation in the boundary line between the partitioned region D1 and areas outside and the boundary line between the partitioned region D2 and areas outside compared to sample L, and as shown in FIG. 77, in a cross-sectional view, in the vicinity of the boundaries, the boundary lines between different electric fields are not perpendicular to the direction normal to the substrate surface, and bulge towards the TFT common electrode. However, in common with samples J to L, the strength of the electric field gradually changes when moving from the pixel electrode towards the TFT common electrode, and no large deviation occurs in the orientation of the liquid crystal. As shown in FIG. 78, while the transmittance drops in the vicinity of the pixel electrode and the TFT common electrode, this is only a portion of the entire opening, and overall, sufficient transmittance can be maintained. As shown in FIG. 79, there is no great variation in luminance depending on the viewing angle, and thus, a substantially uniform image can be displayed no matter the angle from which the display is viewed.

As shown in FIG. 80, in sample N, there is further deviation in the boundary line between the partitioned region D1 and areas outside and the boundary line between the partitioned region D2 and areas outside compared to samples J to M, and as shown in FIG. 81, in a cross-sectional view, the boundary lines between different electric fields are not perpendicular to the direction normal to the substrate surface in the vicinity of the boundaries, and bulge further towards the TFT common electrode. However, in common with samples J to M, the strength of the electric field gradually changes when moving from the pixel electrode towards the TFT common electrode, and no large deviation occurs in the orientation of the liquid crystal. As shown in FIG. 82, while the transmittance drops in the vicinity of the pixel electrode, and while the area of transmittance drop is larger than in sample J, sufficient transmittance can be maintained overall. As shown in FIG. 83, there is no great variation in luminance depending on the viewing angle, and thus, a substantially uniform image can be displayed no matter the angle from which the display is viewed.

Thus, even if the aspect ratio were adjusted by adjusting not the length of the electrodes but the distance between the electrodes, similar results can be attained to when the lengths of the electrodes were adjusted, and the same conclusion can be made as Evaluation Tests 1 and 2 for the relation between the aspect ratio, and the transmittance and viewing angle characteristics.

Evaluation Test 4

Below, test results for transmittance and viewing angle characteristics in a plan view at respective angles formed in the regions D1 and D2 between the independent pairs of linear electrodes (more specifically, pixel electrodes and TFT common electrodes) will be described. When performing Evaluation Test 4, five samples were prepared: a sample O in which the angle formed between the pair of linear electrodes is 0°, a sample P in which the angle formed between the pair of linear electrodes is 3.8° (antiparallel), a sample Q in which the angle formed between the pair of linear electrodes is 7.6° (antiparallel), a sample R in which the angle formed between the pair of linear electrodes is 3.8° (parallel), and a sample S in which the angle formed between the pair of linear electrodes is 7.6° (antiparallel). The adjustment of the angles was made by keeping constant the direction of the pixel electrode (second linear electrode) and adjusting the direction of the TFT common electrode (first linear electrode) and the opposite common electrode (third linear electrode). "Antiparallel" refers to a case in which the TFT common electrode and the opposite common electrode are angled in different direction with respect to the pixel electrode (for example, 3.8° (antiparallel) refers to a case in which, if the angle of the pixel electrode is 0°, then one of the TFT common electrode and the opposite common electrode is +3.8° with respect to the pixel electrode and the other is −3.8° with respect to the pixel electrode).

The pixel electrode, the TFT common electrode, and the opposite common electrode all have a width of 2 µm and a length of 11 µm. The size of each pixel is the same for all of samples O to S, the width being 15 µm, the height being 45 µm. The size of each TFT is the same for all of samples O to S. The same liquid crystal material is used for all of samples O to S.

In all of samples O to S, the shape of the openings of the black matrix is square with one side being 10 µm.

The sample O (Ref) is identical to sample A in Evaluation Test 1 and descriptions thereof are omitted.

Figure 84:
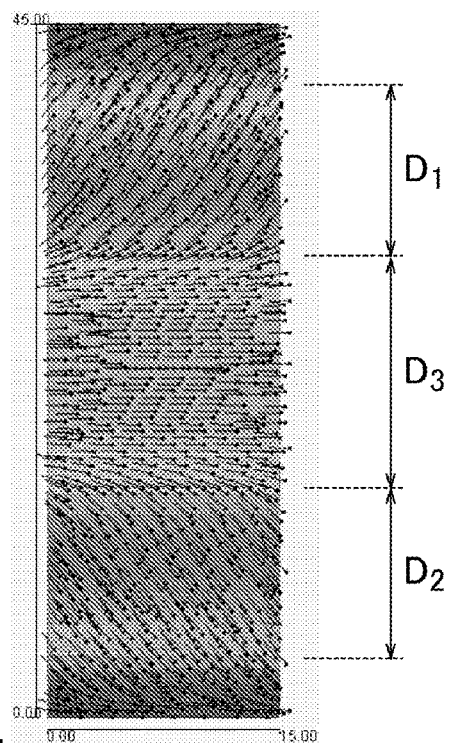
FIG. 84 is a simulation image (plan view image) showing the behavior of liquid crystal molecules when a white voltage (5.7V) is applied in sample P.
Figure 85:
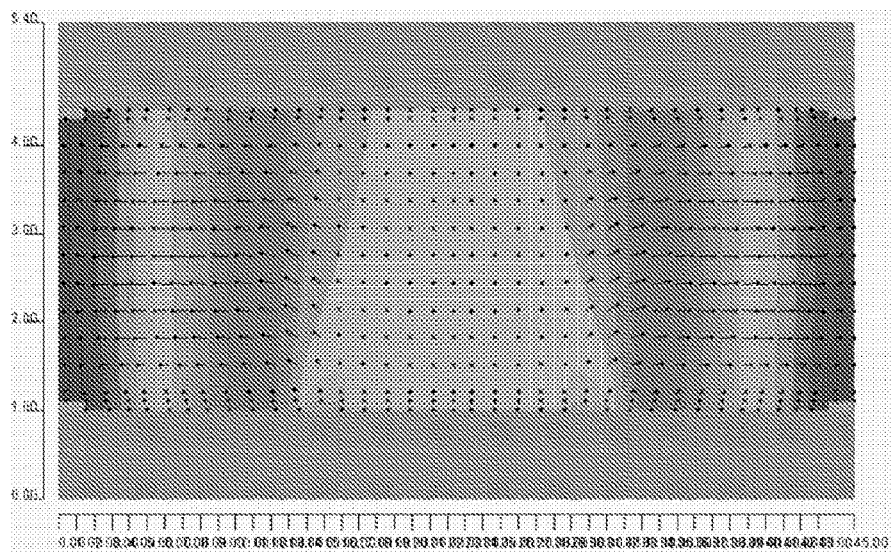
FIG. 85 is a simulation image (cross-sectional image) showing the behavior of liquid crystal molecules when a white voltage (5.7V) is applied in sample P.
Figure 86:
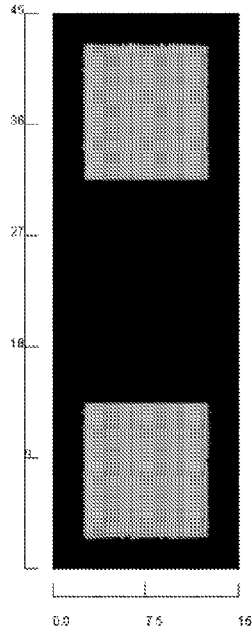
FIG. 86 is a plan view image showing the transmittance of light at a monochromatic gradation in sample P.
Figure 87:
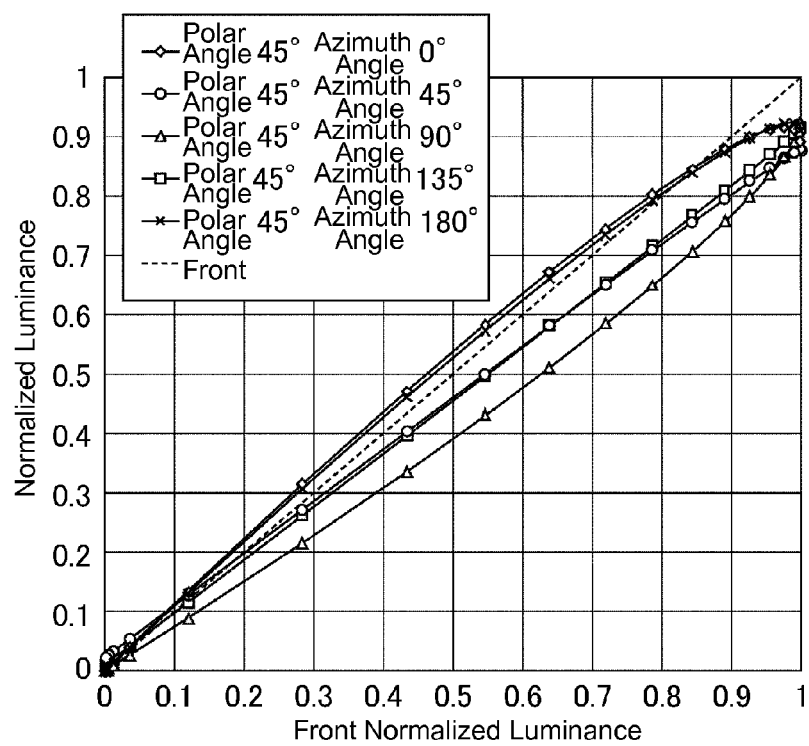
FIG. 87 is a graph showing respective luminances at various azimuth angles when the polar is fixed at 45° with the display surface being the reference surface in sample P.

FIGS. 84 and 85 are simulation images showing the behavior of liquid crystal molecules in sample P when a white voltage is being applied (5.7V); FIG. 84 is a plan view image and FIG. 85 is a cross-sectional image. FIG. 86 is a plan view showing the transmittance of light at a monochromatic gradation, and FIG. 87 is a graph showing respective luminances at various azimuths with the polar angle fixed at 45°, the display surface being the reference surface.

Figure 88:
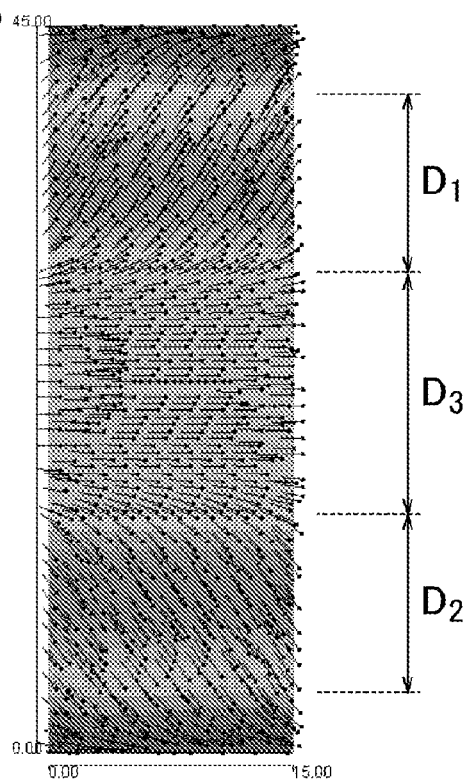
FIG. 88 is a simulation image (plan view image) showing the behavior of liquid crystal molecules when a white voltage (5.9V) is applied in sample Q.
Figure 89:
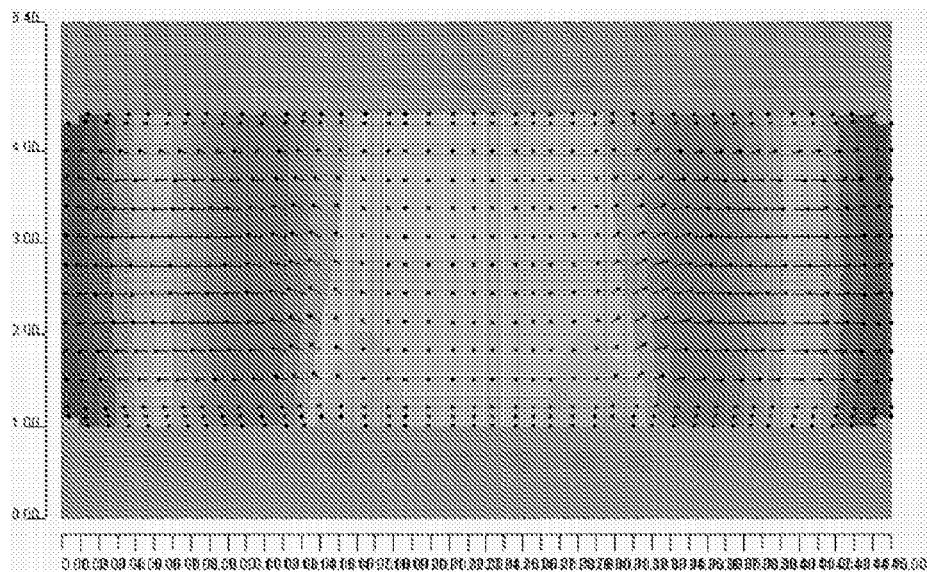
FIG. 89 is a simulation image (cross-sectional image) showing the behavior of liquid crystal molecules when a white voltage (5.9V) is applied in sample Q.
Figure 90:
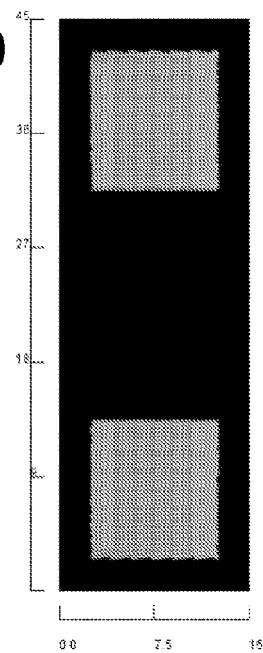
FIG. 90 is a plan view image showing the transmittance of light at a monochromatic gradation in sample Q.
Figure 91:
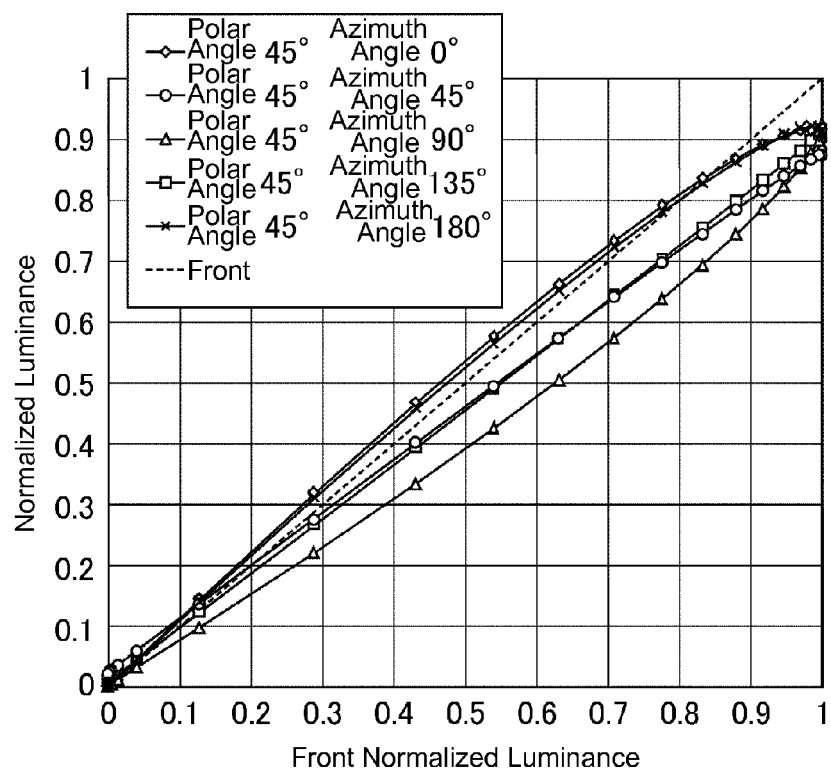
FIG. 91 is a graph showing respective luminances at various azimuth angles when the polar is fixed at 45° with the display surface being the reference surface in sample Q.

FIGS. 88 and 89 are simulation images showing the behavior of liquid crystal molecules in sample Q when a white voltage is being applied (5.9V); FIG. 88 is a plan view image and FIG. 89 is a cross-sectional image. FIG. 90 is a plan view showing the transmittance of light at a monochromatic gradation, and FIG. 91 is a graph showing respective luminances at various azimuths with the polar angle fixed at 45°, the display surface being the reference surface.

Figure 92:
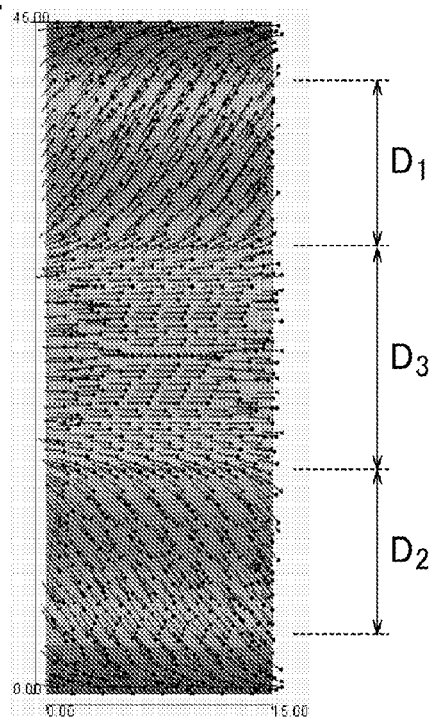
FIG. 92 is a simulation image (plan view image) showing the behavior of liquid crystal molecules when a white voltage (5.7V) is applied in sample R.
Figure 93:
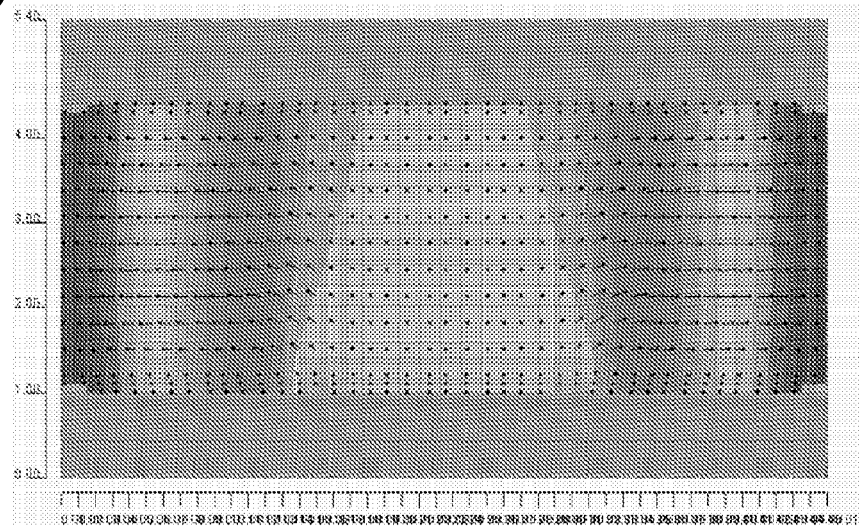
FIG. 93 is a simulation image (cross-sectional image) showing the behavior of liquid crystal molecules when a white voltage (5.7V) is applied in sample R.
Figure 94:
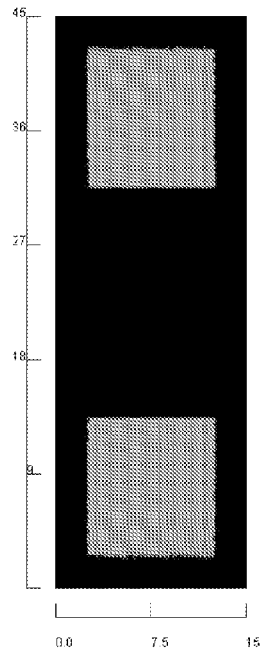
FIG. 94 is a plan view image showing the transmittance of light at a monochromatic gradation in sample R.
Figure 95:
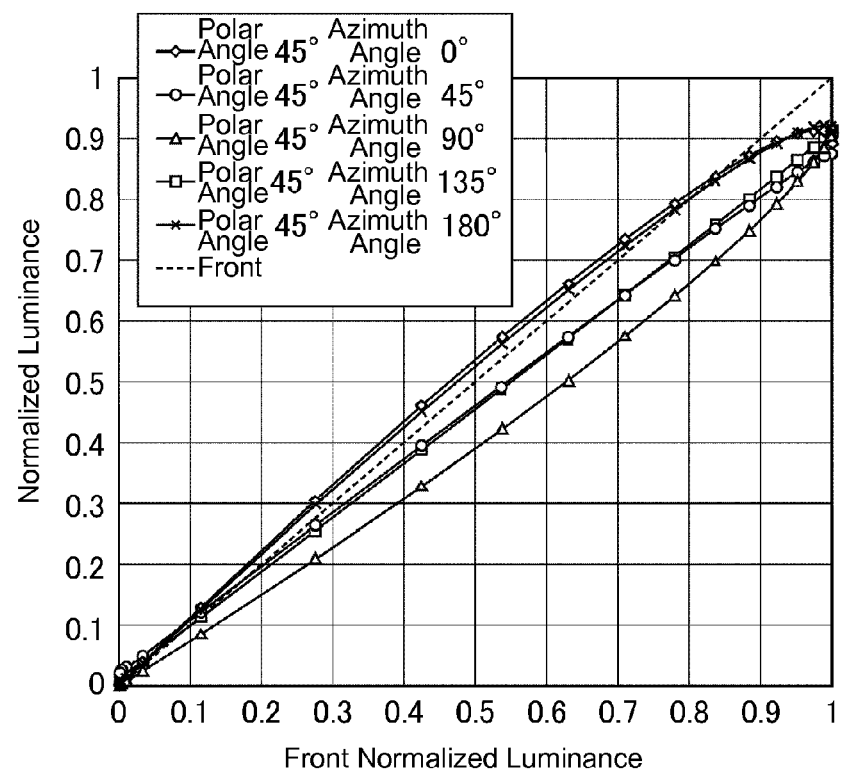
FIG. 95 is a graph showing respective luminances at various azimuth angles when the polar is fixed at 45° with the display surface being the reference surface in sample R.

FIGS. 92 and 93 are simulation images showing the behavior of liquid crystal molecules in sample R when a white voltage is being applied (5.7V); FIG. 92 is a plan view image and FIG. 93 is a cross-sectional image. FIG. 94 is a plan view showing the transmittance of light at a monochromatic gradation, and FIG. 95 is a graph showing respective luminances at various azimuths with the polar angle fixed at 45°, the display surface being the reference surface.

Figure 96:
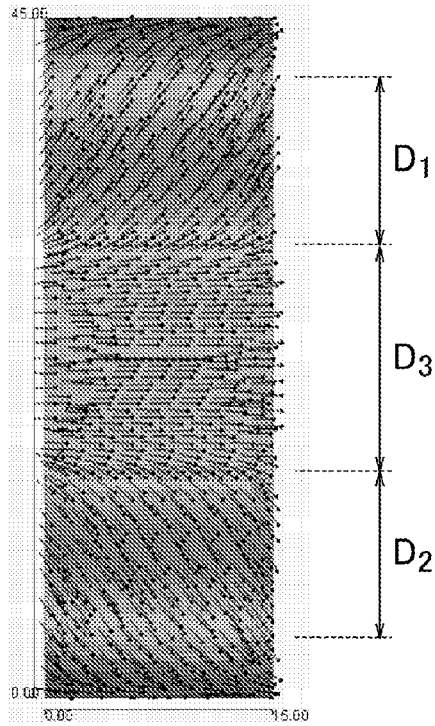
FIG. 96 is a simulation image (plan view image) showing the behavior of liquid crystal molecules when a white voltage (5.9V) is applied in sample S.
Figure 97:
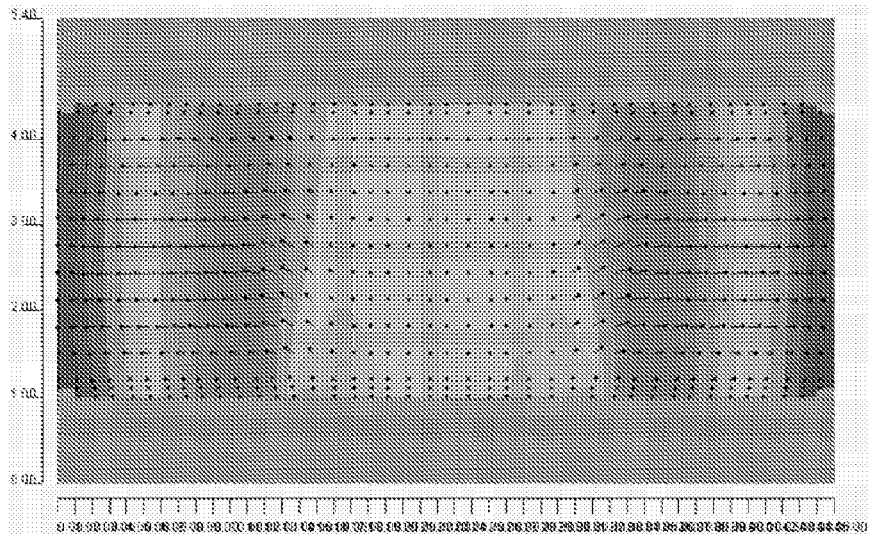
FIG. 97 is a simulation image (cross-sectional image) showing the behavior of liquid crystal molecules when a white voltage (5.9V) is applied in sample S.
Figure 98:
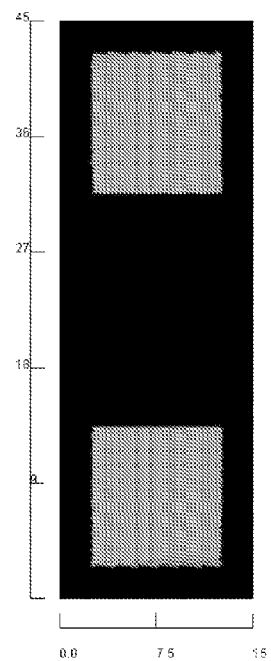
FIG. 98 is a plan view image showing the transmittance of light at a monochromatic gradation in sample S.
Figure 99:
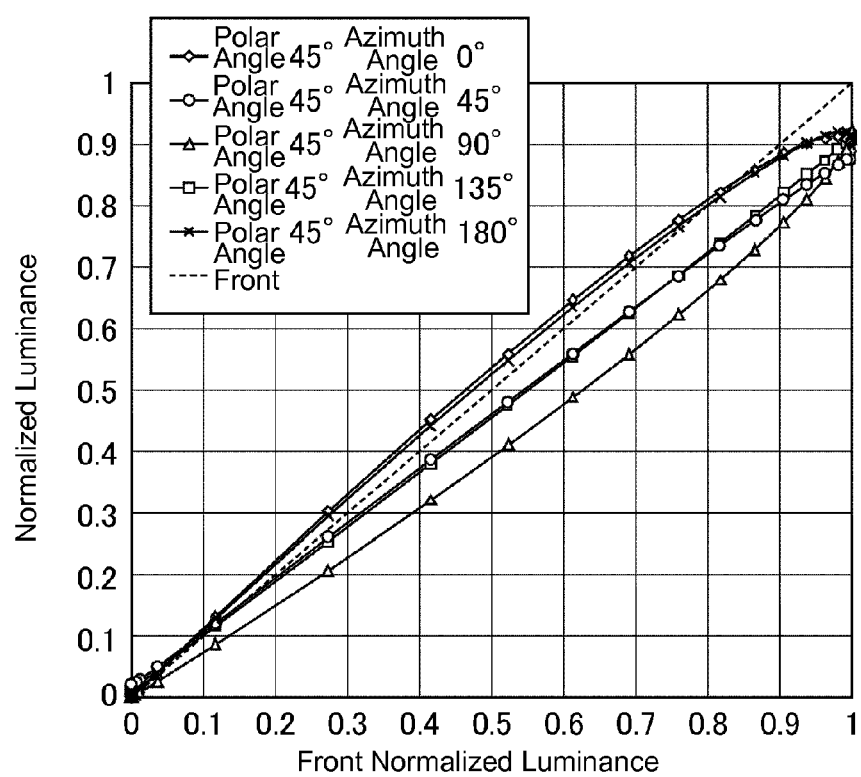
FIG. 99 is a graph showing respective luminances at various azimuth angles when the polar is fixed at 45° with the display surface being the reference surface in sample S.

FIGS. 96 and 97 are simulation images showing the behavior of liquid crystal molecules in sample S when a white voltage is being applied (5.9V); FIG. 96 is a plan view image and FIG. 97 is a cross-sectional image. FIG. 98 is a plan view showing the transmittance of light at a monochromatic gradation, and FIG. 99 is a graph showing respective luminances at various azimuths with the polar angle fixed at 45°, the display surface being the reference surface.

As can be seen from FIGS. 84, 88, 92, and 96 (plan view images), in none of samples P to S does the behavior of the liquid crystal molecules when a white voltage is applied greatly differ from that of sample O. Also, when viewing FIGS. 85, 89, 93, and 97 (cross-sectional views), there is no great difference in the behavior of the liquid crystal molecules compared to when a white voltage is applied to the sample O.

As shown in FIGS. 86, 90, 94, and 98, there is also no great difference in transmittance from sample L.

As shown in FIGS. 87, 91, 95, and 99, there is also no great difference in viewing angle characteristics from sample L.

Thus, it was found that sufficient transmittance and viewing angle characteristics can be attained even if the pixel electrode and the TFT common electrode are not completely parallel to each other as long as the angle therebetween is within a certain range. It was found that as long as the angle between the pixel electrode and the TFT common electrode is 7.5° or less, similar transmittance and viewing angle characteristics can be attained as when the pixel electrode and TFT common electrode are completely parallel to each other (that is, the angle therebetween is 0°).

Evaluation Test 5

Below, test results for transmittance and viewing angle characteristics in a plan view at respective aspect ratios in the regions D1 and D2 between the independent pairs of linear electrodes (more specifically, pixel electrodes and TFT common electrodes) will be described. In Evaluation Test 5, five samples were prepared: sample T where the aspect ratio is 11:11 (=1:1), sample U where the aspect ratio is 9:11, sample V where the aspect ratio is 7:11, sample W where the aspect ratio is 5:11, and sample X where the aspect ratio is 3:11. The adjustment of the aspect ratio was made by adjusting the distance in a plan view between the pixel electrode (second linear electrode), and the TFT common electrode (first linear electrode) or the opposite common electrode (third linear electrode) simultaneously. The adjustment of the angles was made by keeping constant the position of the pixel electrode (second linear electrode) and adjusting the position of the TFT common electrode (first linear electrode) and the opposite common electrode (third linear electrode). The size of each pixel in the samples T to X is set such that the horizontal length for all samples is 15 μm, but the vertical length differs among the samples: the vertical length is 45 μm in sample T, 39 μm in sample U, 33 μm in sample V, 27 μm in sample W, and 21 μm in sample X. The size of each TFT is the same for all of samples T to X. The same liquid crystal material is used for all of samples T to X.

For all of the samples T to X, the pixel electrodes, the TFT common electrodes, and the opposite common electrodes have a width of 2 μm and a length of 11 μm. The opposite common electrode is located in an area overlapping the TFT common electrode. The distances between the pixel electrode, and the TFT common electrode or the opposite common electrode are all 1 μm in sample T, all 9 μm in sample U, all 7 μm in sample V, all 5 μm in sample W, and all 3 μm in sample X.

In all of samples T to X, the shape of the openings of the black matrix changes depending on the regions surrounded by the pixel electrodes, the TFT common electrodes, and the opposite common electrodes. The length of the opening of the black matrix in a direction parallel to each electrode is 10 μm, and the length of the opening in the direction perpendicular to each electrode is 10 μm in sample T, 8 μm in sample U, 6 μm in sample V, 4 μm in sample W, and 2 μm in sample X.

The sample T (Ref) is identical to sample A in Evaluation Test 1 and descriptions thereof are omitted.

Figure 100:
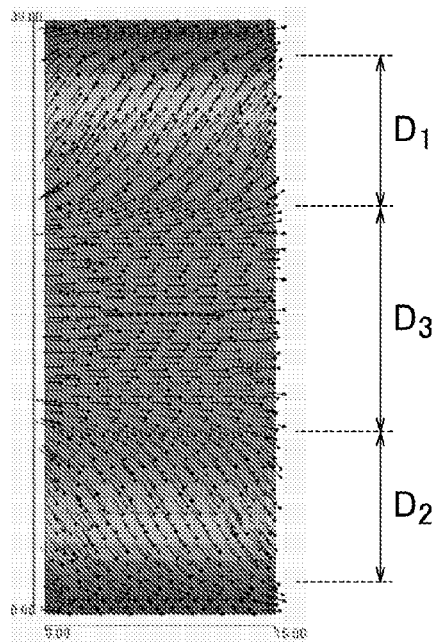
FIG. 100 is a simulation image (plan view image) showing the behavior of liquid crystal molecules when a white voltage (4.5V) is applied in sample U.
Figure 101:
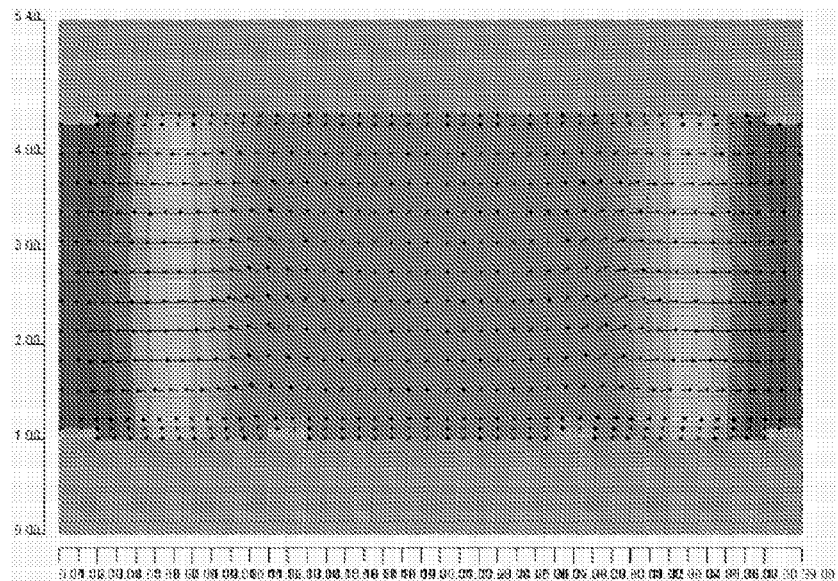
FIG. 101 is a simulation image (cross-sectional image) showing the behavior of liquid crystal molecules when a white voltage (4.5V) is applied in sample U.
Figure 102:
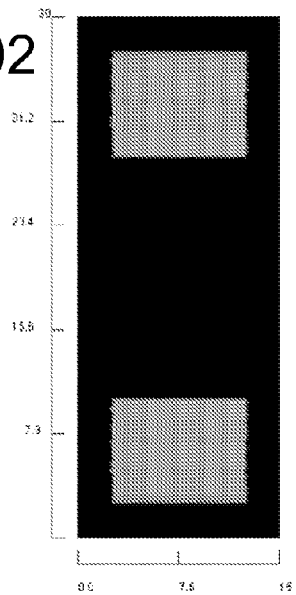
FIG. 102 is a plan view image showing the transmittance of light at a monochromatic gradation in sample U.
Figure 103:
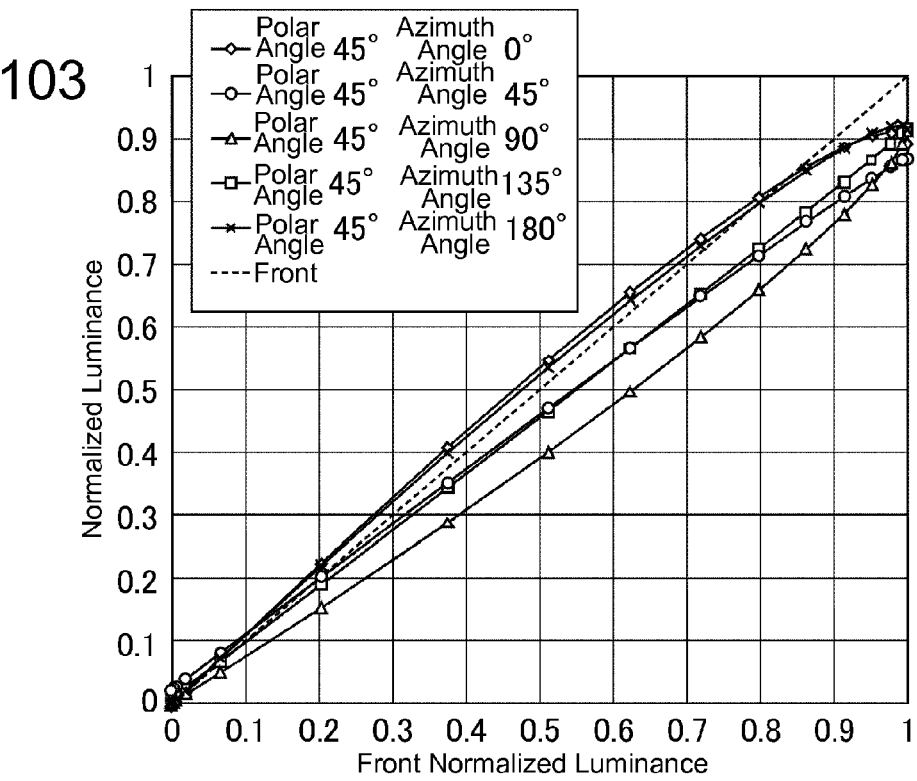
FIG. 103 is a graph showing respective luminances at various azimuth angles when the polar is fixed at 45° with the display surface being the reference surface in sample U.

FIGS. 100 and 101 are simulation images showing the behavior of liquid crystal molecules in sample U when a white voltage is being applied (4.5V); FIG. 100 is a plan view image and FIG. 101 is a cross-sectional image. FIG. 102 is a plan view showing the transmittance of light at a monochromatic gradation, and FIG. 103 is a graph showing respective luminances at various azimuths with the polar angle fixed at 45°, the display surface being the reference surface.

Figure 104:
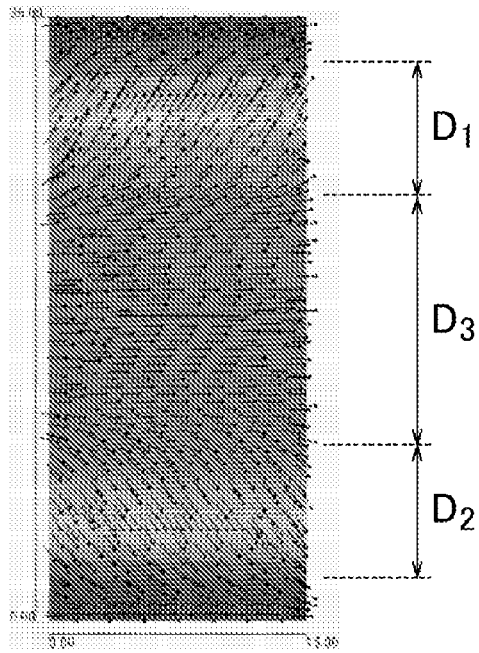
FIG. 104 is a simulation image (plan view image) showing the behavior of liquid crystal molecules when a white voltage (3.9V) is applied in sample V.
Figure 105:
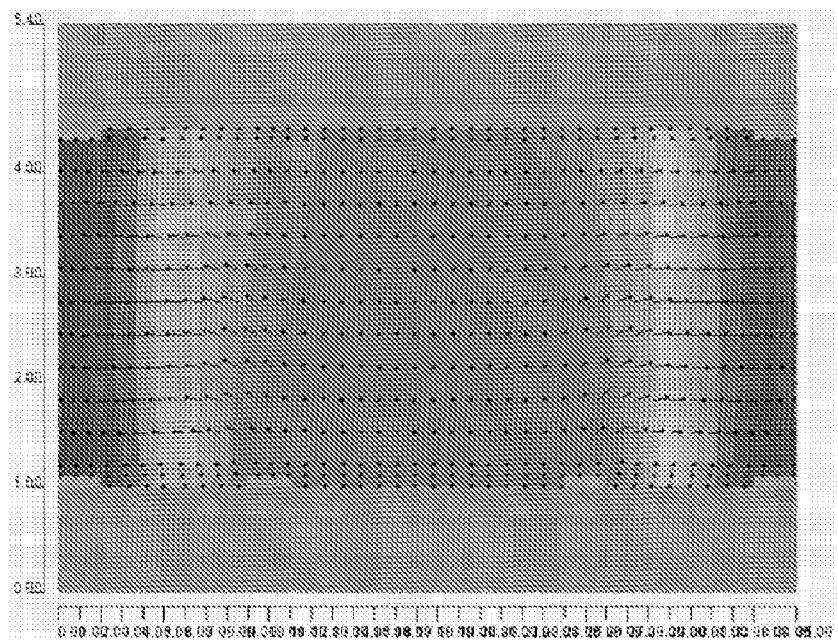
FIG. 105 is a simulation image (cross-sectional image) showing the behavior of liquid crystal molecules when a white voltage (3.9V) is applied in sample V.
Figure 106:
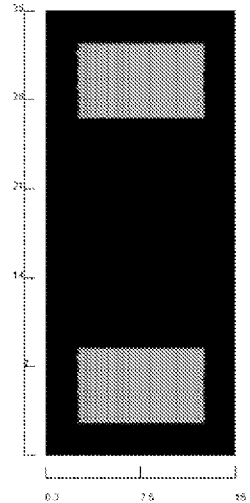
FIG. 106 is a plan view image showing the transmittance of light at a monochromatic gradation in sample V.
Figure 107:
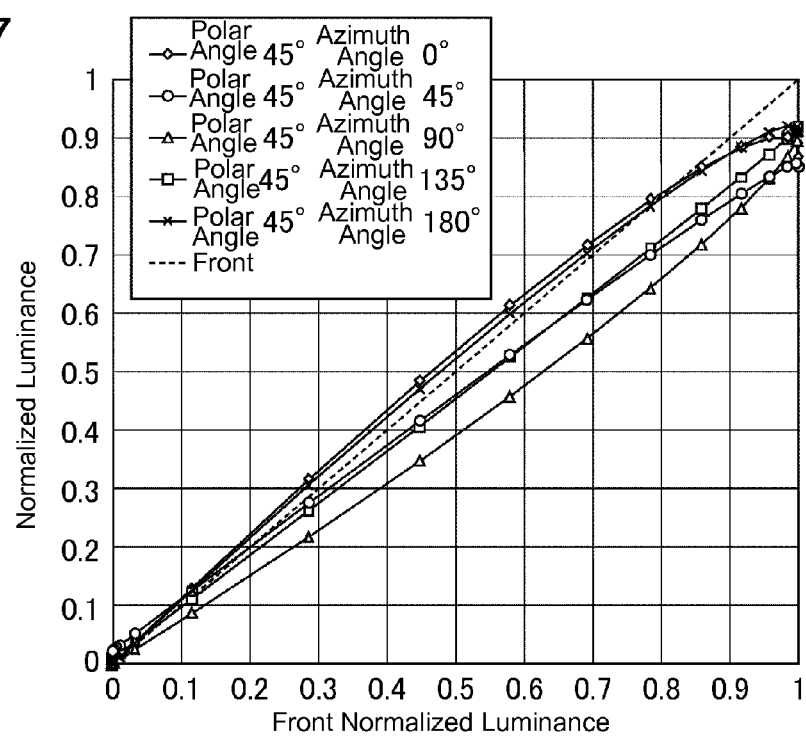
FIG. 107 is a graph showing respective luminances at various azimuth angles when the polar is fixed at 45° with the display surface being the reference surface in sample V.

FIGS. 104 and 105 are simulation images showing the behavior of liquid crystal molecules in sample V when a white voltage is being applied (3.9V); FIG. 104 is a plan view image and FIG. 105 is a cross-sectional image. FIG. 106 is a plan view showing the transmittance of light at a monochromatic gradation, and FIG. 107 is a graph showing respective luminances at various azimuths with the polar angle fixed at 45°, the display surface being the reference surface.

Figure 108:
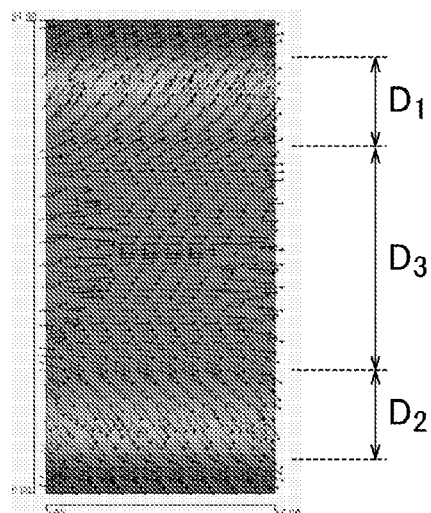
FIG. 108 is a simulation image (plan view image) showing the behavior of liquid crystal molecules when a white voltage (3.2V) is applied in sample W.
Figure 109:
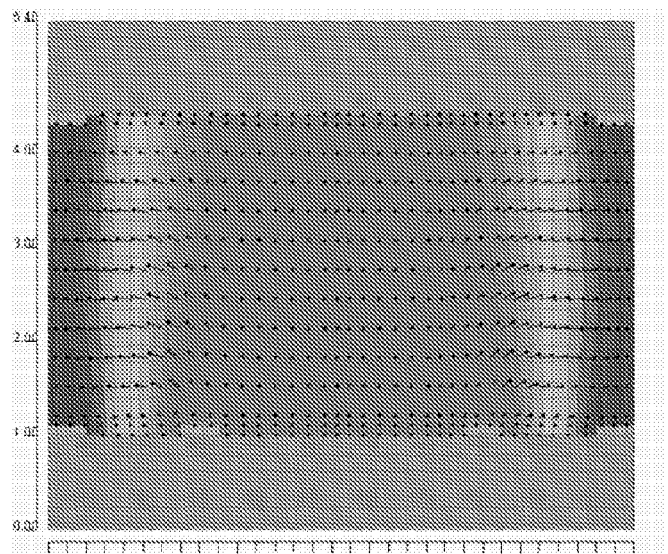
FIG. 109 is a simulation image (cross-sectional image) showing the behavior of liquid crystal molecules when a white voltage (3.2V) is applied in sample W.
Figure 110:
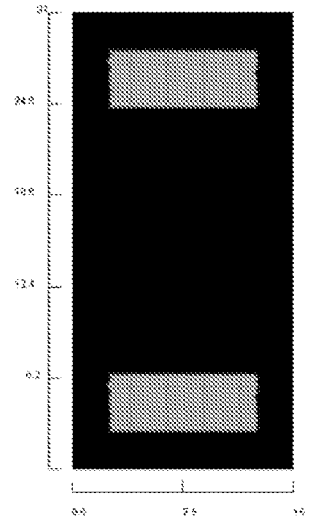
FIG. 110 is a plan view image showing the transmittance of light at a monochromatic gradation in sample W.
Figure 111:
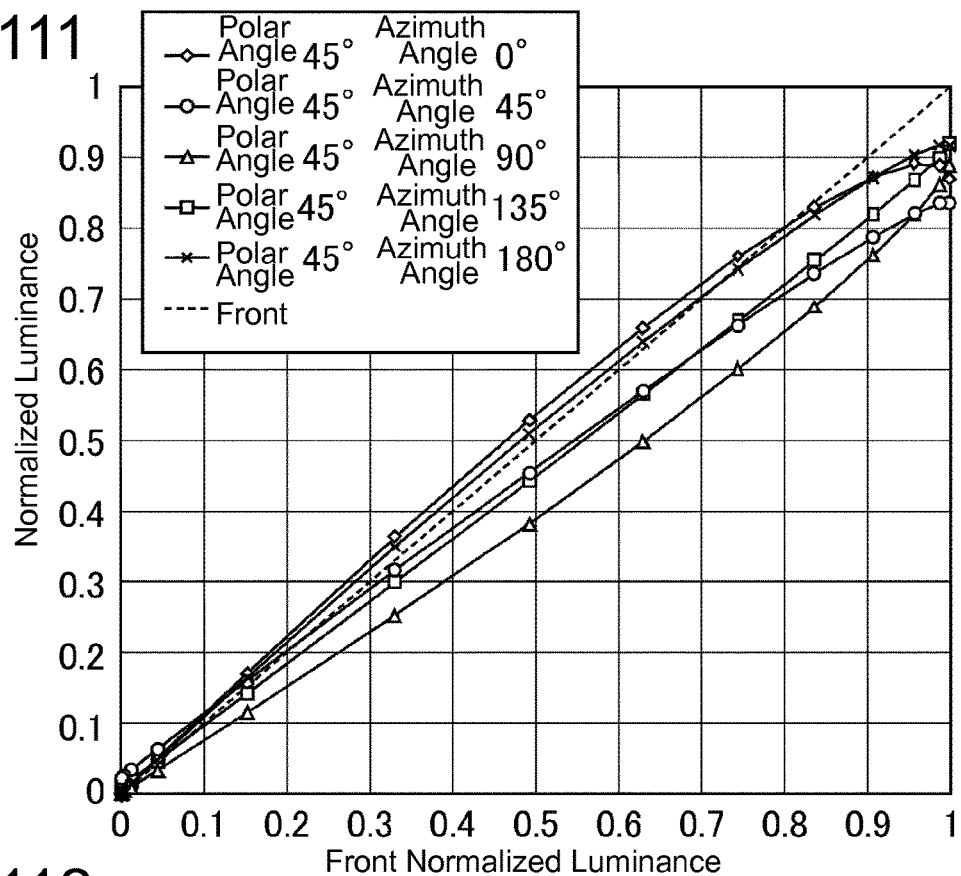
FIG. 111 is a graph showing respective luminances at various azimuth angles when the polar is fixed at 45° with the display surface being the reference surface in sample W.

FIGS. 108 and 109 are simulation images showing the behavior of liquid crystal molecules in sample W when a white voltage is being applied (3.2V); FIG. 108 is a plan view image and FIG. 109 is a cross-sectional image. FIG. 110 is a plan view showing the transmittance of light at a monochromatic gradation, and FIG. 111 is a graph showing respective luminances at various azimuths with the polar angle fixed at 45°, the display surface being the reference surface.

Figure 112:
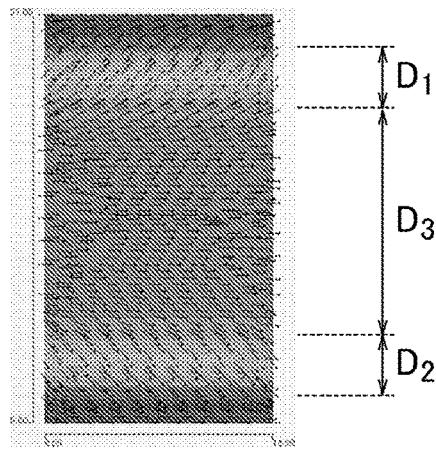
FIG. 112 is a simulation image (plan view image) showing the behavior of liquid crystal molecules when a white voltage (2.7V) is applied in sample X.
Figure 113:
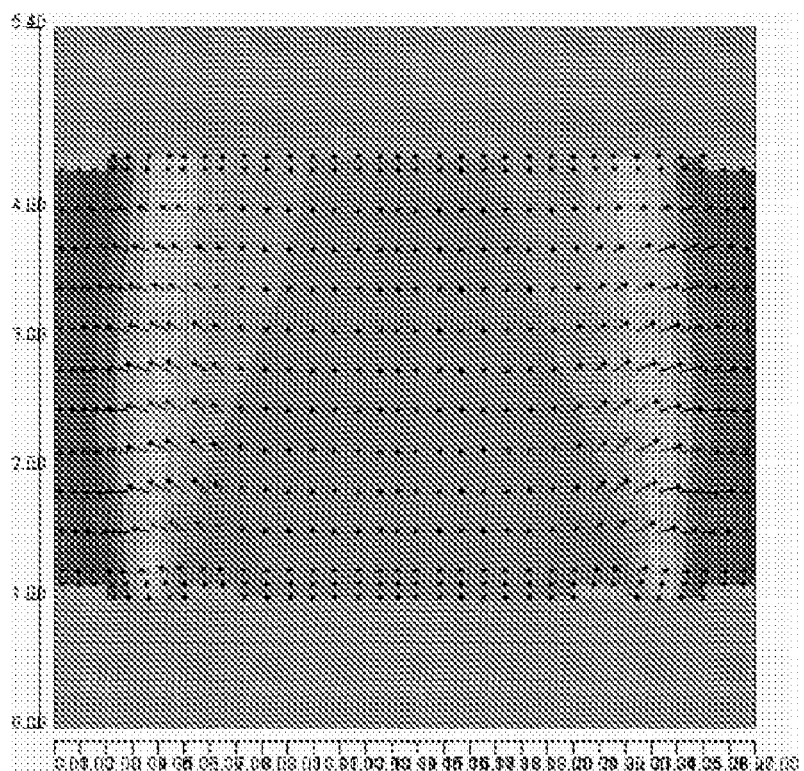
FIG. 113 is a simulation image (cross-sectional image) showing the behavior of liquid crystal molecules when a white voltage (2.7V) is applied in sample X.
Figure 114:
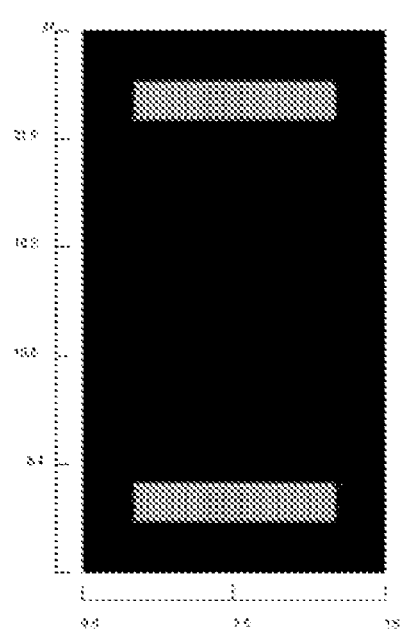
FIG. 114 is a plan view image showing the transmittance of light at a monochromatic gradation in sample X.
Figure 115:
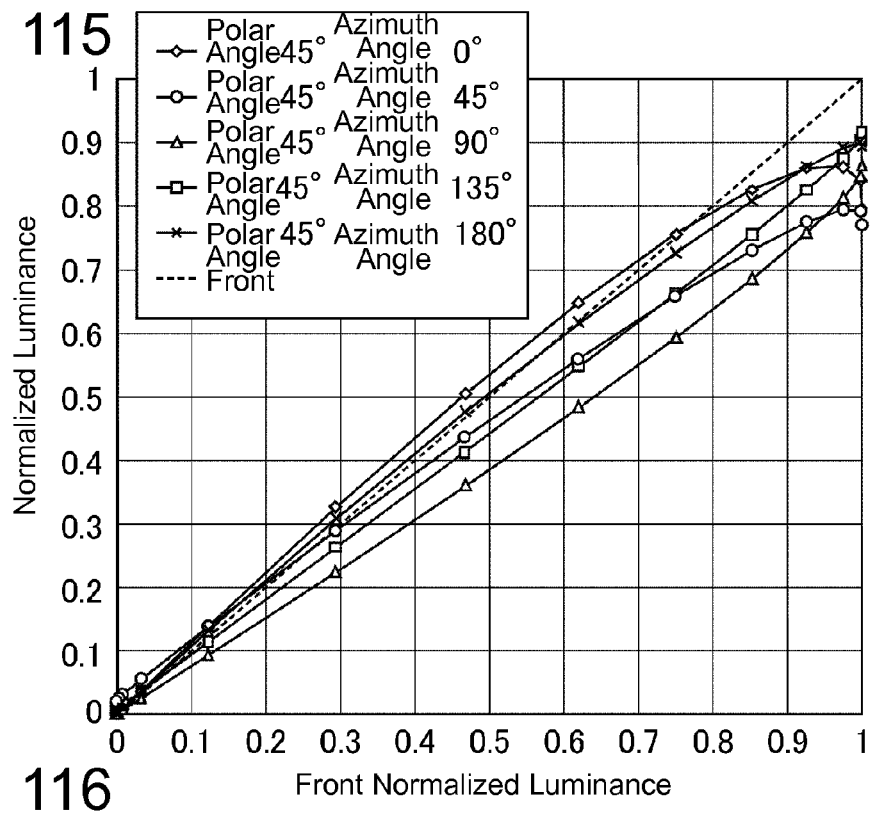
FIG. 115 is a graph showing respective luminances at various azimuth angles when the polar is fixed at 45° with the display surface being the reference surface in sample X.
Figure 116:
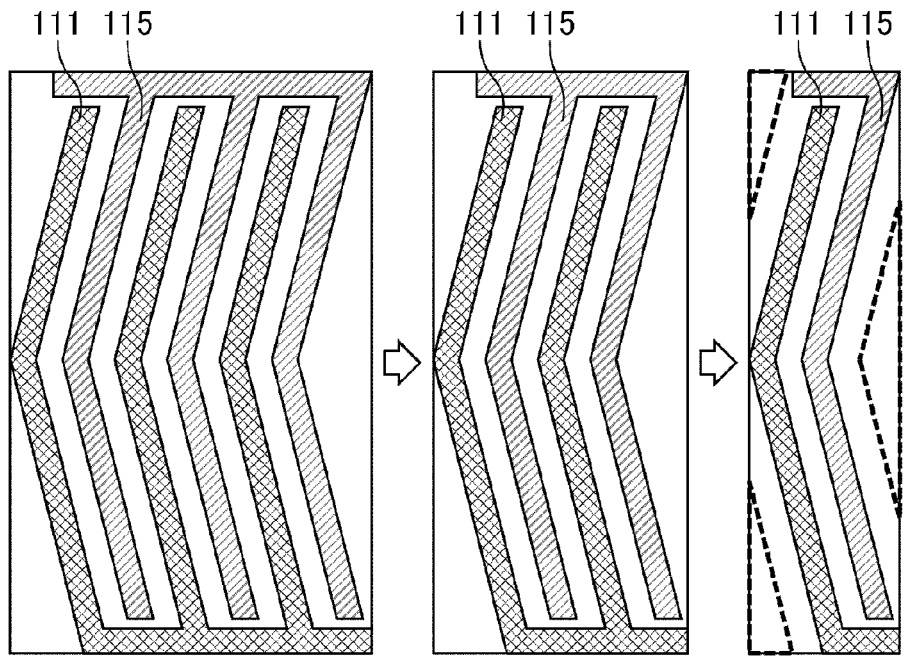
FIG. 116 is a schematic plan view showing an example of an arrangement of electrodes in a conventional IPS mode liquid crystal display device.

FIGS. 112 and 113 are simulation images showing the behavior of liquid crystal molecules in sample X when a white voltage is being applied (2.7V); FIG. 112 is a plan view image and FIG. 113 is a cross-sectional image. FIG. 114 is a plan view showing the transmittance of light at a monochromatic gradation, and FIG. 115 is a graph showing respective luminances at various azimuths with the polar angle fixed at 45°, the display surface being the reference surface.

As shown in FIG. 100, in sample U, there appears to be some deviation in the boundary line between the partitioned region D1 and areas outside and the boundary line between the partitioned region D2 and areas outside compared to sample T, but as shown in FIG. 101, in a cross-sectional view, the strength of the electric field changes gradually when moving from the pixel electrode towards the TFT common electrode, and the boundary lines between different electric fields are close to perpendicular to the direction normal to the substrate surface. As shown in FIG. 102, light is transmitted uniformly throughout the entire region corresponding to the opening of the black matrix, thereby ensuring high transmittance. However, as the area of the openings of the black matrix decreases, the aperture ratio decreases. As shown in FIG. 103, there is no great variation in luminance depending on the viewing angle, and thus, a substantially uniform image can be displayed no matter the angle from which the display is viewed.

As shown in FIG. 104, in sample V, there is some deviation in the boundary line between the partitioned region D1 and areas outside and the boundary line between the partitioned region D2 and areas outside compared to samples T and U, and as shown in FIG. 105, in a cross-sectional view, there are portions of the boundary lines between different electric fields that are not perpendicular to the direction normal to the substrate surface in the vicinity of the boundaries. However, this deviation is only in a very small portion, and the strength of the electric field gradually changes when moving from the pixel electrode towards the TFT common electrode, and the boundary line between the electric field regions is substantially vertical, and thus, it can be concluded that excellent liquid crystal orientation can be achieved. As shown in FIG. 106, light is transmitted uniformly throughout the entire region corresponding to the opening of the black matrix, thereby ensuring high transmittance. However, as the area of the openings of the black matrix decreases, the aperture ratio decreases. As shown in FIG. 107, there is no great variation in luminance depending on the viewing angle, and thus, a substantially uniform image can be displayed no matter the angle from which the display is viewed.

As shown in FIG. 108, in sample W, there is further deviation in the boundary line between the partitioned region D1 and areas outside and the boundary line between the partitioned region D2 and areas outside compared to samples T to V, and as shown in FIG. 109, in a cross-sectional view, the boundary lines between different electric fields are not perpendicular to the direction normal to the substrate surface in the vicinity of the boundaries, and bulge towards the TFT common electrode. However, in common with samples T to U, the strength of the electric field gradually changes when moving from the pixel electrode towards the TFT common electrode, and no large deviation occurs in the orientation of the liquid crystal. As shown in FIG. 110, light is transmitted uniformly throughout the entire region corresponding to the opening of the black matrix, thereby ensuring high transmittance. However, as the area of the openings of the black matrix decreases, the aperture ratio decreases. As shown in FIG. 111, there is some variation in luminance in portions depending on the viewing angle, but this is not a great variation, and thus, the minimum requirement for a uniform image is satisfied no matter the angle from which the display is viewed.

As shown in FIG. 112, in sample X, there is further deviation in the boundary line between the partitioned region D1 and areas outside and the boundary line between the partitioned region D2 and areas outside compared to samples T to W, and as shown in FIG. 113, in a cross-sectional view, the boundary lines between different electric fields are not perpendicular to the direction normal to the substrate surface in the vicinity of the boundaries, and further bulge towards the TFT common electrode. However, in common with samples T to V, the strength of the electric field gradually changes when moving from the pixel electrode towards the TFT common electrode, and no large deviation occurs in the orientation of the liquid crystal. As shown in FIG. 114, light is transmitted uniformly throughout the entire region corresponding to the opening of the black matrix, thereby ensuring high transmittance. However, as the area of the openings of the black matrix decreases, the aperture ratio decreases. As shown in FIG. 115, there is some variation in luminance in portions depending on the viewing angle, but this is not a great variation, and thus, the minimum requirement for a uniform image is satisfied no matter the angle from which the display is viewed.

Thus, similar to Evaluation Test 3, even if the aspect ratio were adjusted by adjusting not the length of the electrodes but the distance between the electrodes, similar results can be attained to when the lengths of the electrodes were adjusted, and the same conclusion can be made as Evaluation Tests 1 to 3 for the relation between the aspect ratio, and the transmittance and viewing angle characteristics.

Also, by adjusting the shape of the openings of the black matrix, it is possible to cover up areas where disarrayed liquid crystal orientation occurs, and thus, it was found that adjusting the shape of the openings of the black matrix as necessary is also effective, even though this comes at the expense of aperture ratio.

DESCRIPTION OF REFERENCE CHARACTERS

10 TFT substrate
11 pixel electrode (second linear electrode)
11a first pixel electrode
11a1, 11a2 component unit of first pixel electrode
11b second pixel electrode
11b1, 11b2 component unit of second pixel electrode
11c third pixel electrode
11c1, 11c2 component unit of third pixel electrode
11d fourth pixel electrode
11d1, 11d2 component unit of fourth pixel electrode
12 scan signal line
13 data signal line
14 common signal line
14a first common signal line
14b second common signal line
15 TFT common electrode (first linear electrode)
15a first TFT common electrode
15a1, 15a2 component unit of first TFT common electrode
15b second TFT common electrode
15b1, 15b2 component unit of second TFT common electrode
15c third TFT common electrode
15c1, 15c2 component unit of third TFT common electrode
15d fourth TFT common electrode
15d1, 15d2 component unit of fourth TFT common electrode
20 opposite substrate
25 opposite common electrode (third linear electrode)
25a first opposite common electrode
25a1, 25a2 component unit of first opposite common electrode
25b second opposite common electrode
25b1, 25b2 component unit of second opposite common electrode
31, 32 contact part
31a, 32a first contact section
31b, 32b second contact section
31c, 32c third contact section
31d, 32d fourth contact section 40 liquid crystal layer
41 liquid crystal molecules
51 black matrix
53 TFT
54 semiconductor layer
55a gate electrode
55b source electrode
55c first drain electrode
55d second drain electrode
61, 62 support substrate
111 pixel electrode (teeth)
115 common electrode (teeth)
D1 first partitioned region
D2 second partitioned region
D3 middle region
D4 third partitioned region
D5 fourth partitioned region

What is claimed is:

1. A liquid crystal display device, comprising:
a first substrate;
a second substrate; and
a liquid crystal layer sandwiched between the first substrate and the second substrate,
wherein the first substrate has a plurality of pairs of electrodes, each including a first linear electrode and a second linear electrode that are independent of each other,
wherein the first linear electrodes and the second linear electrodes included in two adjacent pairs of electrodes are disposed to exhibit line symmetry about a reference axis that is a line passing between the pairs of electrodes,
wherein the linear electrodes positioned farther from the reference axis are the first linear electrodes,
wherein the linear electrodes positioned closer to the reference axis are the second linear electrodes, and
wherein the second substrate has third linear electrodes formed along the first linear electrodes or the second linear electrodes.

2. The liquid crystal display device according to claim 1, wherein a potential supplied to the third linear electrodes is equal to a potential supplied to the first linear electrodes or the second linear electrodes formed along the third linear electrodes.

3. The liquid crystal display device according to claim 2, wherein the potential supplied to the third linear electrodes and the potential supplied to the first linear electrodes or the second linear electrodes formed along the third linear electrodes is a common potential.

4. The liquid crystal display device according to claim 1, wherein the third linear electrodes are formed along the first linear electrodes.

5. The liquid crystal display device according to claim 1, wherein the first linear electrodes and the second linear electrodes are formed in the same layer.

6. The liquid crystal display device according to claim 1, further comprising:
a scan signal line passing between the second linear electrodes of the two adjacent pairs of electrodes.

7. The liquid crystal display device according to claim 1, further comprising:
switching elements connected respectively to the second linear electrodes of the two adjacent pairs of electrodes.

8. The liquid crystal display device according to claim 1,
wherein the first substrate further has a first polarizing plate and the second substrate further has a second polarizing plate,
wherein a polarizing axis of the first polarizing plate is perpendicular to a polarizing axis of the second polarizing plate,
wherein the first linear electrode is disposed to be parallel or perpendicular to the polarizing axis of the first polarizing plate and the polarizing axis of the second polarizing plate, and
wherein the second linear electrode is disposed to be parallel or perpendicular to the polarizing axis of the first polarizing plate and the polarizing axis of the second polarizing plate.

9. The liquid crystal display device according to claim 1, wherein the first linear electrodes and the second linear electrodes are equal in length.

10. The liquid crystal display device according to claim 9,
wherein, when viewing the first substrate in a plan view, a region surrounded by two lines respectively connecting closer respective ends of the first linear electrode and the second linear electrode, a side of the first linear electrode closer to the second linear electrode, and a side of the second linear electrode closer to the first linear electrode is a rectangle, and
wherein an aspect ratio of said rectangle is greater than or equal to 0.75 and less than 1.00.

11. The liquid crystal display device according to claim 9, wherein, when viewing the first substrate in a plan view, a region surrounded by two lines respectively connecting closer respective ends of the first linear electrode and the second linear electrode, a side of the first linear electrode closer to the second linear electrode, and a side of the second linear electrode closer to the first linear electrode is a square.

12. The liquid crystal display device according to claim 1, wherein the first linear electrodes and the second linear electrodes have different lengths.

13. The liquid crystal display device according to claim 12,
wherein, when viewing the first substrate in a plan view, a region surrounded by two lines respectively drawn vertically downward from ends of whichever of the first linear electrode and the second linear electrode is shorter towards whichever of the first linear electrode and the second linear electrode is longer, a side of the first linear electrode closer to the second linear electrode, and a side of the second linear electrode closer to the first linear electrode is a rectangle, and
wherein an aspect ratio of said rectangle is greater than or equal to 0.75 and less than 1.00.

14. The liquid crystal display device according to claim 12, wherein, when viewing the first substrate in a plan view, a region surrounded by two lines respectively drawn vertically downward from ends of whichever of the first linear electrode and the second linear electrode is shorter towards whichever of the first linear electrode and the second linear electrode is longer, a side of the first linear electrode closer to the second linear electrode, and a side of the second linear electrode closer to the first linear electrode is a square.

* * * * *